United States Patent
Kobashi et al.

(10) Patent No.: US 8,521,396 B2
(45) Date of Patent: Aug. 27, 2013

(54) CONTROL DEVICE OF INVERTED PENDULUM TYPE VEHICLE

(75) Inventors: Shinichiro Kobashi, Saitama (JP); Kazushi Akimoto, Saitama (JP); Toru Takenaka, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 44 days.

(21) Appl. No.: 13/395,503

(22) PCT Filed: Sep. 23, 2009

(86) PCT No.: PCT/JP2009/004784
§ 371 (c)(1),
(2), (4) Date: Mar. 12, 2012

(87) PCT Pub. No.: WO2011/036693
PCT Pub. Date: Mar. 31, 2011

(65) Prior Publication Data
US 2012/0173043 A1 Jul. 5, 2012

(51) Int. Cl.
*G06F 19/00* (2011.01)
(52) U.S. Cl.
USPC .............. 701/99; 701/93; 701/49; 701/123
(58) Field of Classification Search
USPC ............... 701/1, 49, 70, 93, 99, 124, 22
See application file for complete search history.

(56) References Cited

U.S. PATENT DOCUMENTS

| | | | | |
|---|---|---|---|---|
| 2009/0107240 A1* | 4/2009 | Senba et al. | | 73/514.36 |
| 2010/0038163 A1 | 2/2010 | Oikawa | | |

FOREIGN PATENT DOCUMENTS

| | | |
|---|---|---|
| JP | 4-201793 A | 7/1992 |
| JP | 2008-120347 A | 5/2008 |
| JP | 2009-101760 A | 5/2009 |
| WO | 2008/081815 A1 | 7/2008 |
| WO | 2008/132778 A1 | 11/2008 |
| WO | 2008/132779 A1 | 11/2008 |
| WO | 2008/139740 A1 | 11/2008 |

* cited by examiner

*Primary Examiner* — Thomas Black
*Assistant Examiner* — Luke Huynh
(74) *Attorney, Agent, or Firm* — Carrier Blackman & Associates, P.C.; Joseph P. Carrier; William D. Blackman

(57) ABSTRACT

To provide a control device of an inverted pendulum type vehicle capable of making an occupant perform boarding action or dismounting action easily. A traveling motion unit controlling element 50 of an inverted pendulum type vehicle 1 controls a traveling motion of a traveling motion unit 5 so that, in a mode for transition period at the time when the occupant intends to board or dismount from vehicle, a sensitivity of change of a traveling velocity or a sensitivity of change of a traveling acceleration of the traveling motion unit 5 with respect to a change in the actual tilt angle of a payload supporting part 3 (at least a tilt angle about an axis in one direction), at least in a part of the period, to be smaller than that in the during-boarding mode when the occupant is aboard.

6 Claims, 17 Drawing Sheets

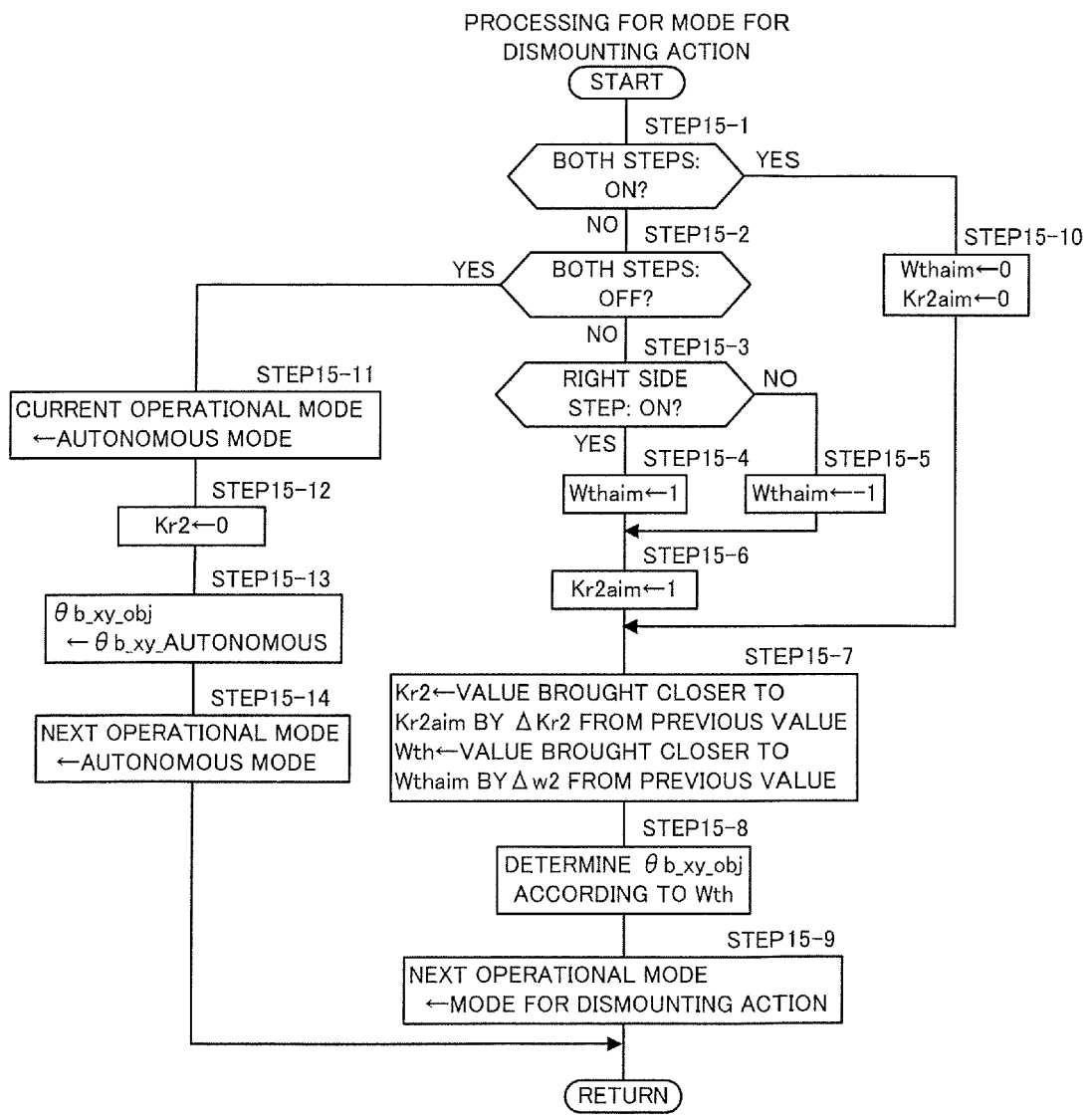

CONTROL DEVICE OF INVERTED PENDULUM TYPE VEHICLE

TECHNICAL FIELD

The present invention relates to a control device of an inverted pendulum type vehicle capable of moving in all directions on a floor surface.

BACKGROUND ART

An inverted pendulum type vehicle is a vehicle in which a base body assembled with a traveling motion unit which travels on a floor surface and an actuator unit which drives the traveling motion unit, is also assembled with a payload supporting part of an occupant which is capable of freely tilting with respect to the perpendicular direction, and is a vehicle with a necessity to move the traveling motion unit in a manner to move a fulcrum of the inverted pendulum, so as to maintain a tilt angle of the payload supporting part to a desired tilt angle (so as to prevent the payload supporting part from fall due to tilting).

As a control technology of this type of the inverted pendulum type vehicle, for example, the one found in Patent Document 1 had been proposed by the present applicant.

In the Patent Document 1, there is disclosed a control technology of an inverted pendulum type vehicle in which a base body of a vehicle assembled with the payload supporting part of an occupant is provided so as to be freely tiltable about two axes, specifically about one axis in a longitudinal direction and about the other axis in a lateral direction, with respect to the ball-shaped traveling motion unit. In this technology, a torque command value of an electric motor as the actuator is determined so as to make a measured value of a tilt angle of the payload supporting part (a tilt angle about the two axes of the longitudinal direction and the lateral direction) to a predetermined desired tilt angle, and also to make a measured value of a traveling velocity in the longitudinal direction and the lateral direction of the vehicle converge to a desired velocity. The vehicle is made to travel by carrying out an operation control of the electric motor according to the torque command value.

As a vehicle which is capable of functioning as an inverted pendulum type vehicle, for example, the one disclosed in Patent Documents 2 and 3 have been proposed by the present applicant.

PRIOR ART REFERENCES

Patent Documents

Patent document 1: U.S. Pat. No. 3,070,015
Patent document 2: Published PCT International Applications WO/2008/132778
Patent document 3: Published PCT International Applications WO/2008/132779

SUMMARY OF THE INVENTION

Problems to be Solved by the Invention

In the inverted pendulum type vehicle such as the one shown in Patent Documents 1 through 3, when the occupant intends to board the vehicle or dismount from the vehicle, it is desirable that the payload supporting part is made tiltable to a tilted state suitable for the boarding action or the dismounting action of the occupant, in the state where the traveling motion unit does not move or is difficult to move.

However, in the conventional technique such as the one shown in Patent Document 1, no consideration is given to such demand. Therefore, when the occupant changes the tilt angle of the payload supporting part during boarding action or dismounting action, the tilt angle may deviate from a desired tilt angle upon control. And, in such case, the traveling motion unit moves similarly to the state where the occupant is aboard the payload supporting part.

The present invention has been made in view of such background, and aims to provide a control device of an inverted pendulum type vehicle capable of making the occupant perform boarding action or dismounting action easily.

Means for Solving the Problems

In order to achieve the object, a control device of an inverted pendulum type vehicle of the present invention is a control device of an inverted pendulum type vehicle having a traveling motion unit capable of moving on a floor surface, an actuator which drives the traveling motion unit, a base body on which the traveling motion unit and the actuator are mounted, and a payload supporting part of an occupant which is attached to the base body so as to be tiltable with respect to vertical direction at least about an axis in one direction, comprising: a traveling motion unit controlling element which includes as operational modes of the vehicle for controlling the traveling motion unit, a mode for transition period comprising at least one mode of a mode for boarding action which is a transitory operational mode at the time the occupant intends to board the payload supporting part and a mode for dismounting action which is a transitory operational mode at the time the occupant intends to dismount from the payload supporting part, and a during-boarding mode which is the operational mode in the state where the occupant is aboard the payload supporting part, and which controls the traveling motion of the traveling motion unit in each operational mode via the actuator; wherein the traveling motion unit controlling element controls, in the during-boarding mode, the traveling motion of the traveling motion unit so as to bring at least the actual tilt angle of the payload supporting part close to a predetermined first desired tilt angle, and controls, in the mode for transition period, at least in a part of a period in the period from start until end of the operational mode for transition period, the traveling motion of the traveling motion unit so that a sensitivity of change of traveling velocity of the traveling motion unit or sensitivity of change of traveling acceleration of the traveling motion unit with respect to change of at least the tilt angle about the axis in the one direction out of the actual tilt angle of the payload supporting part in the mode for transition period to be smaller than that in the during-boarding mode (a first aspect of the invention).

Further, in the present invention, the term "floor" will be used to include an outdoor ground surface or a road surface rather than meaning only a floor in an ordinary sense (e.g., an indoor floor).

According to the first aspect of the invention, in the during-boarding mode, the traveling motion unit controlling element controls the traveling motion of the traveling motion unit so as to bring at least the actual tilt angle of the payload supporting part closer to the predetermined first desired tilt angle. Therefore, if the actual tilt angle of the payload supporting part deviate from the first desired tilt angle, the traveling motion of the traveling motion unit is controlled so as to make the deviation smaller.

On the other hand, in the mode for transition period, the traveling motion unit controlling element controls the traveling motion of the traveling motion unit, in at least a part of the period in the period from the start to the end of the mode for transition period, so that the sensitivity of change of traveling velocity of the traveling motion unit or the sensitivity of change of traveling acceleration of the traveling motion unit with respect to at least the tilt angle about the axis in the one direction out of the actual tilt angle of the payload supporting part to be smaller than that in the during-boarding mode.

Therefore, in the at least a part of the period in the mode for transition period (hereinafter sometimes referred to as a specific period), even when the occupant changes the tilt angle of the payload supporting part about the axis in the one direction for the boarding action or the dismounting action, the traveling velocity or the traveling acceleration of the traveling motion unit does not change, or is difficult to change.

As a result, according to the first aspect of the invention, the boarding action or the dismounting action of the occupant with respect to the vehicle is made easier.

In the first aspect of the invention, the specific period may be the whole period of the period from the start until the end of the mode for transition period. Further, the specific period may be a period which is determined automatically, but may be a period which the occupant may set artificially.

Further, as the first desired tilt angle, it is preferable that a tilt angle of the payload supporting part in which an overall center-of-gravity point of a part capable of tilting integrally with the payload supporting part (including the occupant), of a system combining the vehicle and the occupant, is positioned above in the vertical position of a tilt fulcrum of the payload supporting part is adopted.

Supplementarily, as an example of the control manner of the traveling motion unit by the traveling motion unit control element in the during-boarding mode, for example, the following manner may be given. That is, the traveling motion unit controlling element determines the manipulated variable for control which defines the driving force to be imparted to the traveling motion unit according to a tilt error which is an error between at least the measured value of the actual tilt angle of the payload supporting part and the first desired tilt angle, so as to bring the tilt error close to 0. Alternatively, for example, the traveling motion unit controlling element determines the manipulated variable for control according to at least the tilt error and a velocity error which is an error between the measured value of the traveling velocity of the predetermined representative point of the vehicle and the desired traveling velocity, so as to bring the tilt error close to 0 and also to bring the velocity error close to 0. Thereafter, the traveling motion unit controlling element controls the traveling motion of the traveling motion unit according to the determined manipulated variable for control, via the actuator.

Also, as an example of the control manner of the traveling motion unit in the mode for transition period, for example, it is conceivable that the traveling motion of the traveling motion unit is controlled by determining the manipulated variable for control similarly to that of the during-boarding mode. In this case, the desired tilt angle of the payload supporting part in the specific period in the mode for transition period may be made to differ from the desired tilt angle in the during-boarding mode (the first desired tilt angle).

In this case, the traveling motion unit controlling element is capable of making the sensitivity smaller than that in the during-boarding mode, for example, by determining the manipulated variable for control by appropriately changing a feedback gain for making the tilt error close to 0 (for example, a proportional gain), and a feedback gain for making the velocity error close to 0 (for example, a proportional gain) from the during-boarding mode in the specific period of the mode for transition period.

However, the control manner of the traveling motion unit in the mode for transition period may not be a similar control manner to the during-boarding mode. For example, in the specific period in the mode for transition period, the traveling motion unit controlling element may control the traveling motion of the traveling motion unit, so that the traveling motion unit is constantly maintained at a stopped state (a state where the traveling velocity is maintained to 0), without relying on the measured value of the tilt angle of the payload supporting part. Various manners may be adopted as the control manner of the traveling motion unit in the mode for transition period.

In the inverted pendulum type vehicle according to the first aspect of the invention, the payload supporting part may be configured to be capable of tilting with respect to the vertical direction about an axis in one direction, and traveling motion unit may be capable of moving on a floor in a direction perpendicular to the one direction.

Alternatively, the traveling motion unit may be configured to be movable in all directions including a first direction and a second direction which are orthogonal to each other on a floor surface, the payload supporting part is assembled to the base body so as to be tiltable with respect to vertical direction about two axes, about the axis in the first direction and about the axis in the second direction. In this case, the traveling motion unit controlling element controls, in the during-boarding mode, the traveling motion of the traveling motion unit so as to bring at least the actual tilt angle of the payload supporting part about the two axes close to the predetermined first desired tilt angle, and controls, in the at least a part of the period in the mode for transition period (the specific period), the traveling motion of the traveling motion unit so that the sensitivity with respect to change in at least the tilt angle about the axis in one direction out of the first direction and the second direction becomes smaller than that in the during-boarding mode (a second aspect of the invention).

In the second aspect of the invention, in the specific period in the mode for transition period, the traveling motion of the traveling motion unit is controlled so that the sensitivity with respect to change in the tilt angle about the axis in either one direction of the first direction and the second direction becomes smaller than that in the during-boarding mode.

Therefore, in the specific period, even when the occupant changes the tilt angle of the payload supporting part about the axis in the either one direction for the boarding action or the dismounting action, the traveling velocity or the traveling acceleration of the traveling motion unit does not change or is difficult to change. Therefore, in the specific period in the mode for transition period, the occupant is capable of performing the boarding action or the dismounting action easily, in the state where the tilt angle of the payload supporting part about the axis in the either one direction is tilted appropriately.

In the second aspect of the invention, the sensitivity with respect to the change of the tilt angle about the axis in the other direction of the first direction and the second direction may not be made smaller than that in the during-boarding mode.

Supplementarily, the traveling motion unit "being capable of moving in all directions", including the first direction and the second direction" means that the orientation of the velocity vector of the traveling motion unit at each instant observed in an axial direction orthogonal to the first direction and the second direction could take an orientation of an arbitrary angular orientation about the aforesaid axial direction when the traveling motion unit is driven by the actuator. In this case, the aforesaid axial direction is approximately a vertical direction or a direction perpendicular to a floor surface. Further, the term "orthogonal" in the present invention does not have to be orthogonal in a strict sense, and may slightly deviate from being orthogonal in the strict sense as long as it does not deviate from the nature of the present invention.

As the configuration of the payload supporting part, the following configuration may be adopted. That is, the payload supporting part includes a foot mount unit for mounting both feet of the occupant so that both feet are aligned spaced apart with a gap in the lateral direction of the occupant, and is configured so that the occupant is capable of boarding on the foot mount unit in a standing posture with the fore-and-aft direction and the lateral direction of the occupant facing the first direction and the second direction, respectively.

And, in the case where the payload supporting part is configured as is explained above in the second aspect of the invention, preferably, the traveling motion unit controlling element controls, in the at least a part of the period in the mode for transition period (the specific period), the traveling motion of the traveling motion unit so that the sensitivity with respect to at least the change in the tilt angle about the axis in the first direction to be smaller than that in the during-boarding mode (a third aspect of the invention).

That is, in the case where the payload supporting part is of a configuration including the foot mount unit, then in the mid-course of the boarding action or the dismounting action of the occupant, generally a state where the occupant is mounting only one foot on the foot mount unit occurs. In this case, the position of the load acting on the foot mount unit is shifted to one side in the lateral direction of the occupant, from the weight of the occupant, so that the payload supporting part tends to tilt about the axis in the fore-and-aft direction of the occupant (the first direction). Therefore, in such case, it is desirable that the sensitivity is low. Therefore, in the third aspect of the invention, in the specific period, the traveling motion unit controlling element controls the traveling motion of the traveling motion unit so that the sensitivity with respect to the change in the tilt angle at least about the axis in the first direction becomes smaller than that in the during-boarding mode. By doing so, it becomes possible to appropriately tilt the payload supporting part about the axis in the first direction, which is the fore-and-aft direction of the occupant, in the state where the traveling motion unit does not move or is difficult to move in the specific period of the mode for transition period. Consequently, the boarding action or the dismounting action of the occupant is made easy.

In the third aspect of the invention, preferably, the vehicle is equipped with a foot mount detecting element which generates an output according to whether or not each foot of the occupant is mounted on the foot mount unit, and the at least a part of the period (the specific period) includes a period in the mode for transition period in which the output of the foot mount detecting element becomes an output indicating only one foot of the occupant is mounted on the foot mount unit (a fourth aspect of the invention).

According to the fourth aspect of the invention, it becomes possible to automatically realize the condition where the traveling motion unit does not move or is difficult to move, even when at least the tilt angle of the payload supporting part about the axis in the first direction (the fore-and-aft direction of the occupant) changes, in the state where the occupant is mounting only one of the foot on the foot mount unit in the mid-course of the boarding action or the dismounting action.

Further, in the third aspect or the fourth aspect of the invention, the base body may be assembled with a grip, which the occupant landing at least one foot on the floor is capable of gripping, so as to be tiltable integrally with the payload supporting unit. In this case, the traveling motion unit controlling element controls, in the at least a part of the period in the mode for transition period (the specific period), the traveling motion of the traveling motion unit so as to make the sensitivity with respect to the change of the tilt angle about the axis in the first direction smaller than that in the during-boarding mode, and also to bring at least the tilt angle about the axis in the first direction closer to a desired tilt angle for transition period, which is a predetermined angle having a larger degree of tilt with respect to the vertical direction than a component about the axis in the first direction out of the first desired tilt angle (a fifth aspect of the invention).

According to the fifth aspect of the invention, in the specific period in the mode for transition period, it becomes possible to easily maintain at least the tilt angle of the payload supporting part about the axis in the first direction to the desired tilt angle for transition period in the state where the traveling motion unit is difficult to move, that is, to easily maintain the actual tilt angle of the payload supporting part to the tilt angle in which the occupant may easily perform the boarding action or the dismounting action. Here, in this case, when the actual tilt angle of the payload supporting part about the axis in the first direction deviates from the desired tilt angle for transition period, the driving force is imparted to the traveling motion unit so as to reduce the deviation. However, in this case, it is also possible to restrain the traveling motion unit to travel by gripping the grip in the state where the occupant is landing at least one of the foot on the floor.

In the fifth aspect of the invention, preferably, the grip is provided with an operator for instructing the change of the operational mode to the traveling motion unit controlling element (a sixth aspect of the invention).

According to the sixth aspect of the invention, the occupant is capable of changing the operational mode, while gripping the grip. As such, it becomes possible to prevent the posture of the payload supporting part from changing abruptly and the like, at the time of switching of the operational mode.

BRIEF DESCRIPTION OF THE DRAWINGS

FIG. 19 is a flowchart illustrating the subroutine processing in STEP15 of FIG. 14.

MODE FOR CARRYING OUT THE INVENTION

First Embodiment

The following will describe a first embodiment of the present invention. First, referring to FIG. 1 to FIG. 6, the structure of an inverted pendulum type vehicle in the present embodiment will be described.

Figure 1:
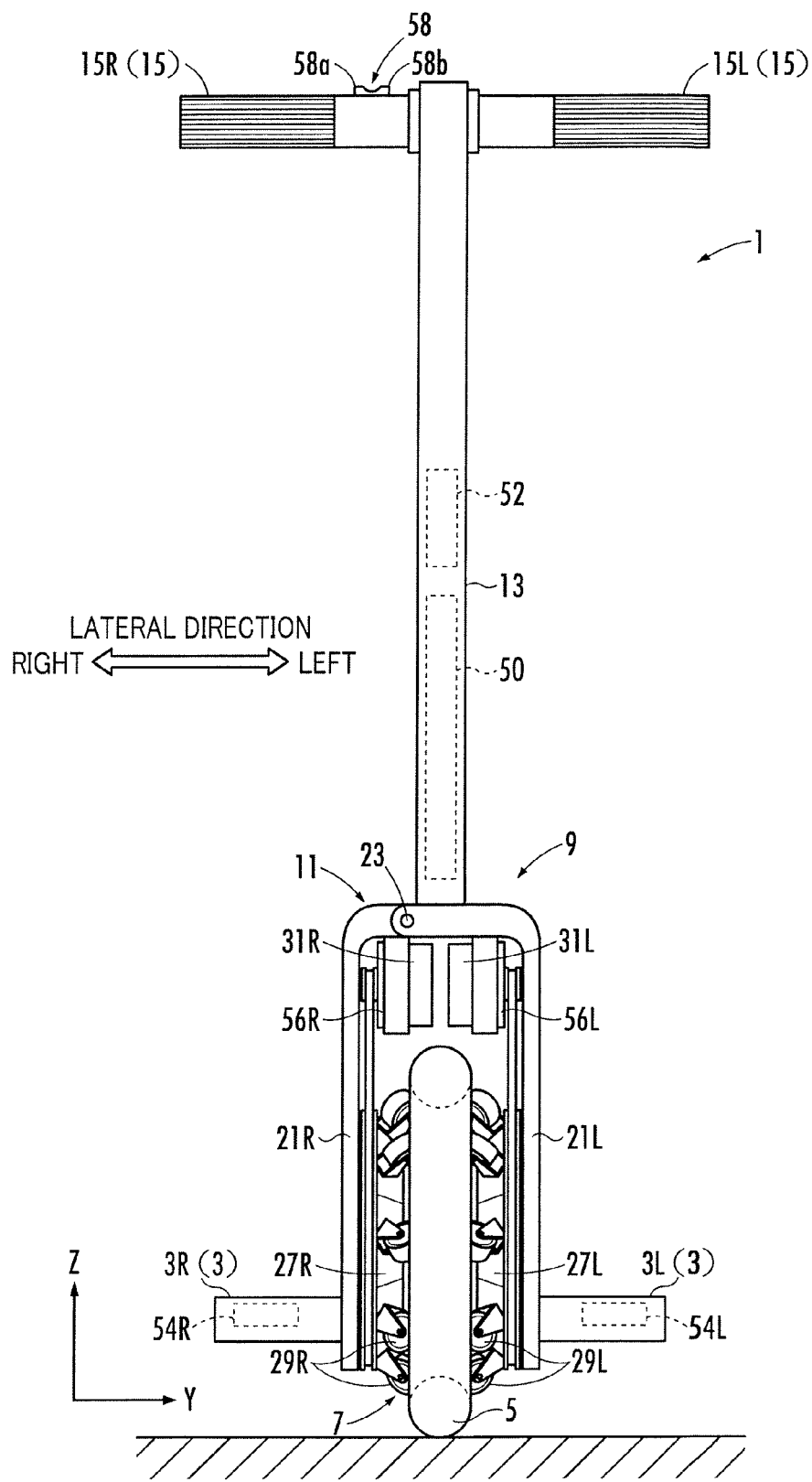
FIG. 1 is a front diagram of an inverted pendulum type vehicle according to an embodiment.
Figure 2:
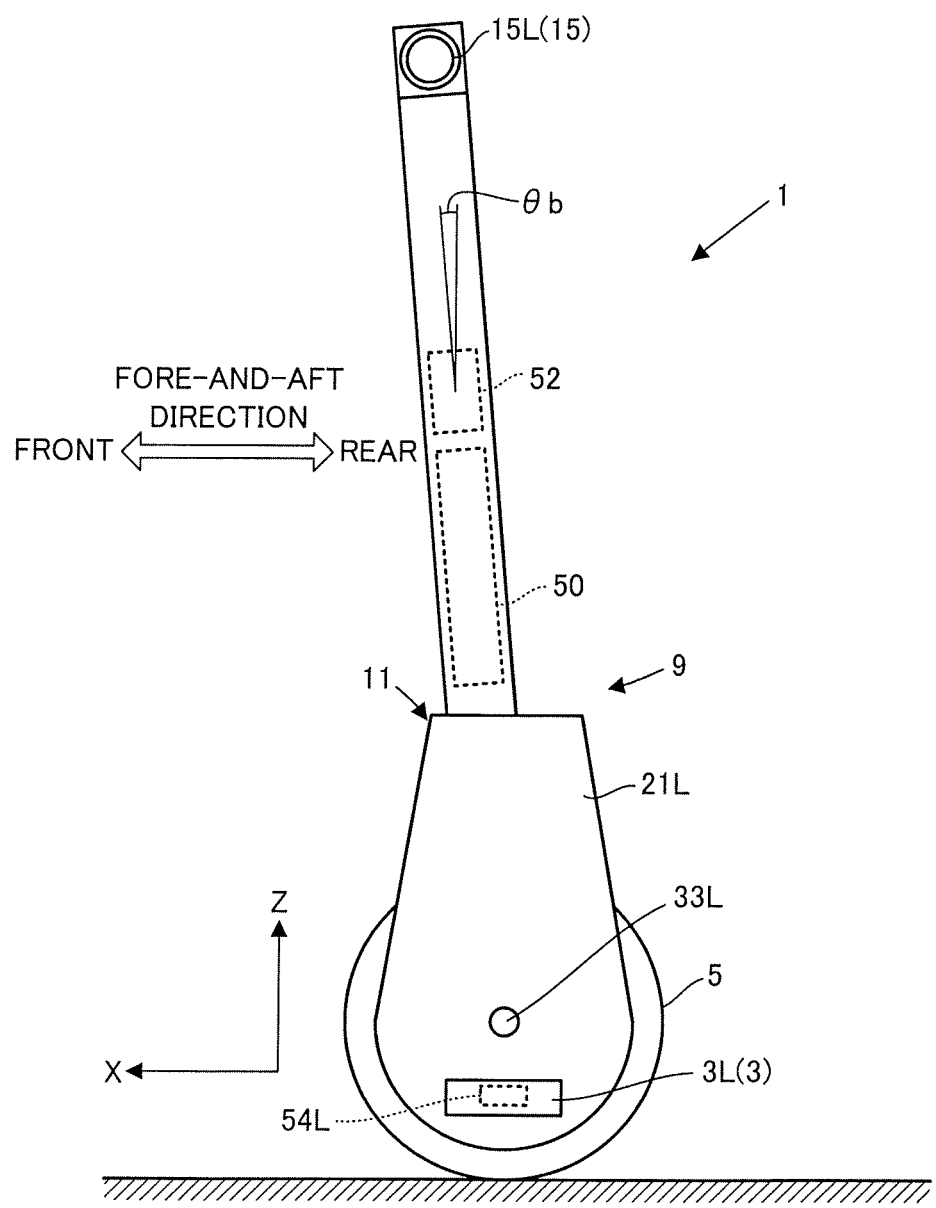
FIG. 2 is a side view of the inverted pendulum type vehicle according to the embodiment.

As illustrated in FIG. 1 and FIG. 2, an inverted pendulum type vehicle 1 in the present embodiment includes a payload supporting part 3 for an occupant (driver), a traveling motion unit 5 capable of traveling in all directions (two-dimensional all directions, including a fore-and-aft direction and a lateral direction) on a floor surface while being in contact with a floor surface, an actuator 7 which imparts, to the traveling motion unit 5, a motive power for driving the traveling motion unit 5, and a base body 9 on which the payload supporting part 3, the traveling motion unit 5, and the actuator 7 are mounted.

Here, in the description of the present embodiment, "the fore-and-aft direction" and "the lateral direction" mean the directions that coincide or substantially coincide with the fore-and-aft direction and the lateral direction, respectively, of the upper body of an occupant aboard the payload supporting part 3 in a normal posture. Incidentally, "the normal posture" is a posture envisaged in the design related to the payload supporting part 3, and it is a posture in which the trunk axis of the upper body of the occupant is oriented approximately in the vertical direction and the upper body is not twisted.

In this case, in FIG. 1, "the fore-and-aft direction" and "the lateral direction" are the direction perpendicular to the paper surface and the lateral direction of the paper surface, respectively. In FIG. 2, "the fore-and-aft direction" and "the lateral direction" are the lateral direction of the paper surface and the direction perpendicular to the paper surface, respectively. Further, in the description of the present embodiment, the suffixes "R" and "L" attached to reference numerals will be used to mean the correspondence to the right side and left side, respectively, of the vehicle 1.

The base body 9 is provided with a lower frame 11, to which the traveling motion unit 5 and the actuator 7 are installed, and a support frame 13 extendedly provided upward from the upper end of the lower frame 11.

The lower frame 11 is provided with a pair of cover members 21R and 21L disposed to face each other in a forked shape with a gap therebetween in the lateral direction. The upper end portions (the forked portions) of these cover members 21R and 21L are connected through a hinge shaft 23 having a longitudinal axial center, so that one of the cover members 21R and 21L is relatively swingable about the hinge shaft 23 with respect to the other. In this case, the cover members 21R and 21L are biased by springs, which are not shown, in the direction in which the bottom end portions (the distal ends of the forked portions) of the cover members 21R and 21L narrow.

The lower frame 11 is fixed with a foot mount unit as the payload supporting part 3 of the occupant. The foot mount unit 3 is configured from a pair of steps 3R, 3L, on which the right foot and left foot, respectively, of the occupant is mounted. The step 3R on the right side is provided such that the step extend out rightward from the outer surface portion of the cover member 21R, and the step 3L on the left side is provided such that the step extend out leftward from the outer surface portion of the cover member 21L. In the inverted pendulum type vehicle 1 of the present embodiment (hereinafter referred simply as the vehicle 1), the occupant boards the vehicle 1 in a standing posture, while mounting the both foot of the occupant on the steps 3R, 3L. In the boarding state, both feet of the occupant are spaced apart with a gap in the lateral direction of the occupant, so that the wheel assembly 5 exists between both feet.

Further, to the upper portion of the support frame 13, a grip 15 which the occupant standing on the foot mount unit 3 grips is fixed. The grip 15 is configured from a grip 15R which is provided such that the grip extend rightward from the upper portion of the support frame 13, and a grip 15L which is provided such that the grip extend leftward from the upper portion of the support frame 13.

The traveling motion unit 5 and the actuator 7 are disposed between the cover members 21R and 21L of the lower frame 11. The structures of the traveling motion unit 5 and the actuator 7 will be described with reference to FIG. 3 to FIG. 6.

The traveling motion unit 5 and the actuator 7 illustrated in the present embodiment have the same structures as those disclosed in, for example, FIG. 1 of patent document 2 mentioned above. Hence, in the description of the present embodiment, the aspects of the structures of the traveling motion unit 5 and the actuator 7 which are described in the aforesaid patent document 2 will be only briefly described.

In the present embodiment, the traveling motion unit 5 is a wheel assembly made of a rubber elastic material formed into an annular shape and has a substantially circular cross-sectional shape. This traveling motion unit 5 (hereinafter referred to as the wheel assembly 5) elastically deforms to be capable of rotating about a center C1 of the circular cross-section (more specifically, the circumferential line which passes the center C1 of the circular cross-section and which is concentric with the axial center of the wheel assembly 5), as indicated by an arrow Y1 in FIG. 5 and FIG. 6.

The wheel assembly 5 is disposed between the cover members 21R and 21L with an axial center C2 thereof (an axial center C2 orthogonal to the diametrical direction of the whole wheel assembly 5) oriented in the lateral direction, and comes in contact with a floor surface at the bottom end portion of the outer circumferential surface of the wheel assembly 5.

The wheel assembly 5 is capable of performing a motion of rotating about the axial center C2 of the wheel assembly 5 as indicated by an arrow Y2 in FIG. 5 (a motion of circumrotating on a floor surface) and a motion of rotating about the center C1 of the cross-section of the wheel assembly 5 by being driven by the actuator 7 (to be discussed in detail later). As a result, the wheel assembly 5 is capable of traveling in all directions on a floor surface by the motions combining the aforesaid rotating motions.

The actuator 7 is provided with a rotating member 27R and free rollers 29R interposed between the wheel assembly 5 and the right cover member 21R, a rotating member 27L and free rollers 29L interposed between the wheel assembly 5 and the left cover member 21L, an electric motor 31R serving as an actuator disposed above the rotating member 27R and the free rollers 29R, and an electric motor 31L serving as an actuator disposed above the rotating member 27L and the free rollers 29L.

The housings of the electric motors 31R and 31L are installed to the cover members 21R and 21L, respectively. Although not shown, the electric sources (batteries or capacitors) of the electric motors 31R and 31L are mounted on an appropriate place of the base body 9, such as the support frame 13 or the like.

The rotating member 27R is rotatively supported by the cover member 21R through the intermediary of a support axis 33R having a lateral axial center. Similarly, the rotating member 27L is rotatively supported by the cover member 21L through the intermediary of a support axis 33L having a lateral axial center. In this case, the rotational axial center of the rotating member 27R (the axial center of the support axis 33R) and the rotational axial center of the rotating member 27L (the axial center of the support axis 33L) are concentric with each other.

Figure 3:
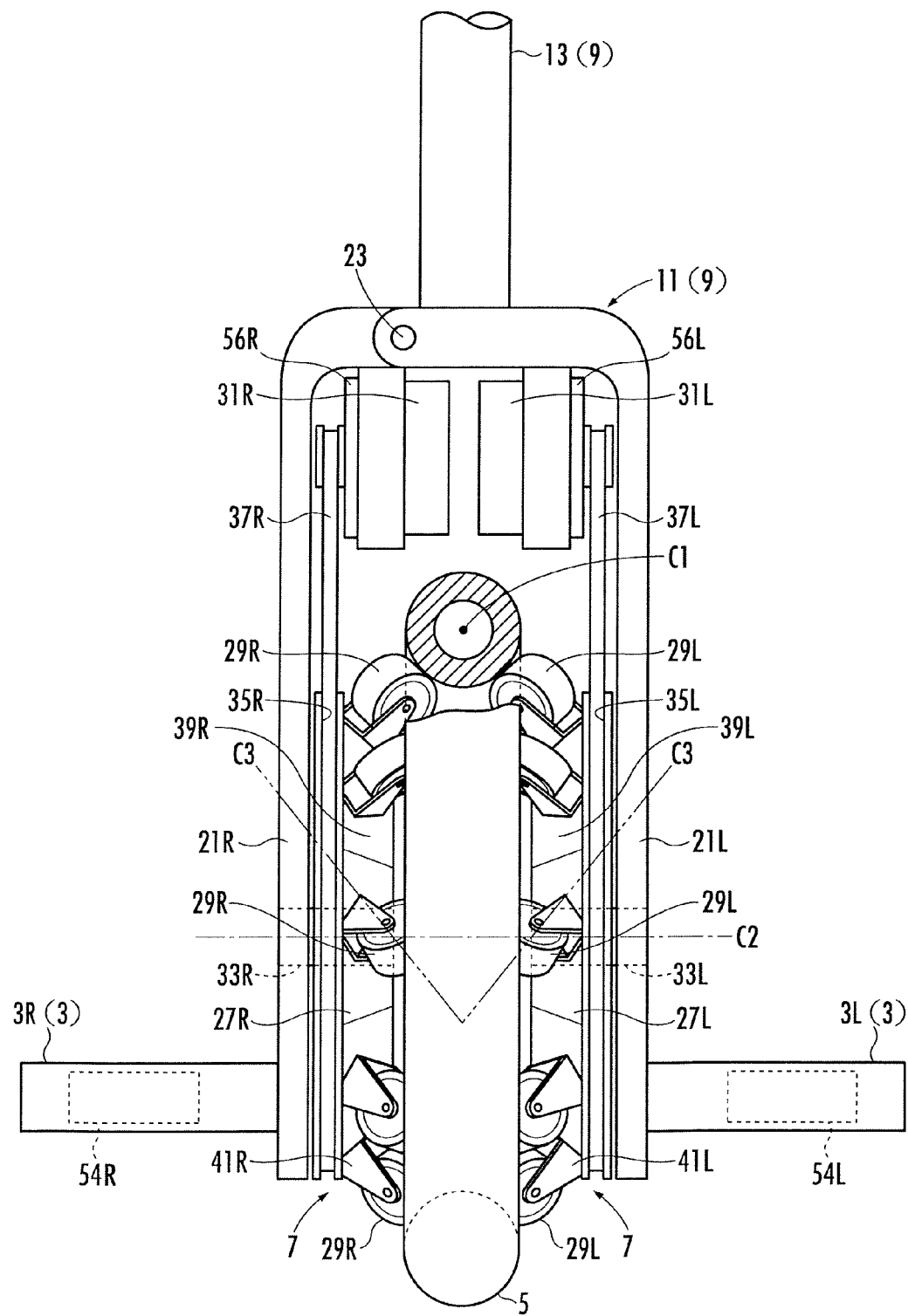
FIG. 3 is an enlarged view of a lower portion of the inveted pendulum type vehicle according to the embodiment.
Figure 4:
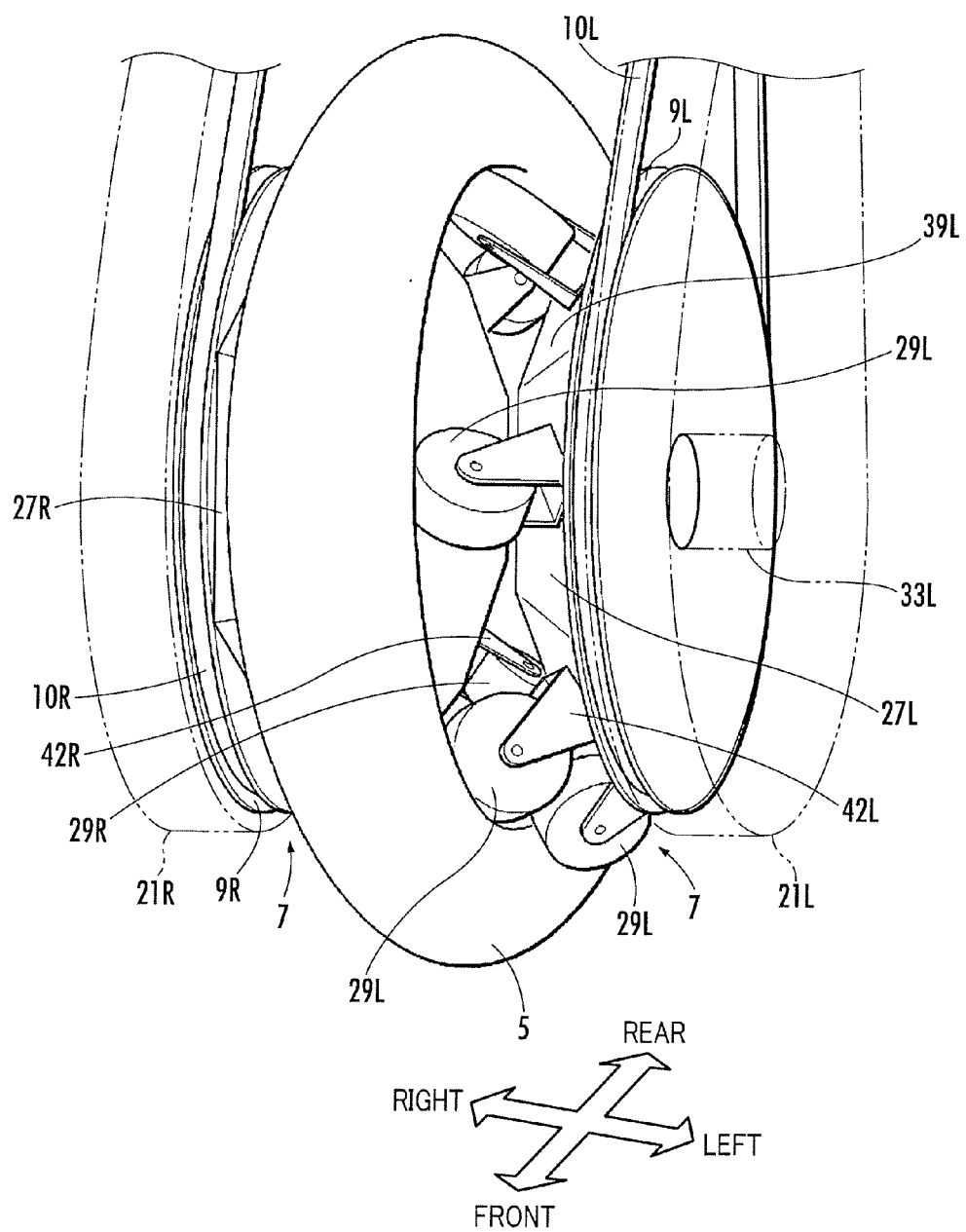
FIG. 4 is a perspective view of the lower portion of the inverted pendulum type vehicle according to the embodiment.

The rotating members 27R and 27L are connected to the output shafts of the electric motors 31R and 31L, respectively, through the intermediary of power transmission mechanisms, including functions as reducers, and rotatively driven by the motive power (torque) transmitted from the electric motors 31R and 31L, respectively. Each power transmission mechanisms are, for example, pulley and belt system. More specifically, as illustrated in FIG. 3, the rotating member 27R is connected to the output shaft of the electric motor 31R through the intermediary of a pulley 35R and a belt 37R. Similarly, the rotating member 27L is connected to the output shaft of the electric motor 31L through the intermediary of a pulley 35L and a belt 37L.

Incidentally, the aforesaid power transmission mechanism may be constructed of, for example, a sprocket and a link chain, or may be constructed of a plurality of gears. As another alternative, for example, the electric motors 31R and 31L may be constructed such that the output shafts thereof are arranged to oppose the rotating members 27R and 27L so as to arrange the output shafts to be concentric with the rotating members 27R and 27L, and the output shafts of the electric motors 31R and 31L may be connected to the rotating members 27R and 27L, respectively, through the intermediary of reducers (e.g., planetary gear devices).

The rotating members 27R and 27L are formed in the same shapes as circular truncated cones, the diameters of which reduce toward the wheel assembly 5, and the outer peripheral surfaces thereof form tapered outer peripheral surfaces 39R and 39L.

A plurality of the free rollers 29R are arrayed about the tapered outer peripheral surface 39R of the rotating member 27R such that the free rollers 29R are arranged at regular intervals on the circumference concentric with the rotating member 27R. Further, these free rollers 29R are installed to the tapered outer peripheral surface 39R through the intermediary of the brackets 41R and rotatively supported by the brackets 41R.

Similarly, a plurality of free rollers 29L (of the same quantity as that of the free rollers 29R) are arrayed about the tapered outer peripheral surface 39L of the rotary member 27L such that the free rollers 29L are arrayed at regular intervals on the circumference concentric with the rotating member 27L. Further, these free rollers 29L are installed to the tapered outer peripheral surface 39L through the intermediary of the brackets 41L and rotatively supported by the brackets 41L.

The wheel assembly 5 is disposed concentrically with the rotating members 27R and 27L, and held between the free rollers 29R adjacent to the rotating member 27R and the free rollers 29L adjacent to the rotating member 27L.

Figure 6:
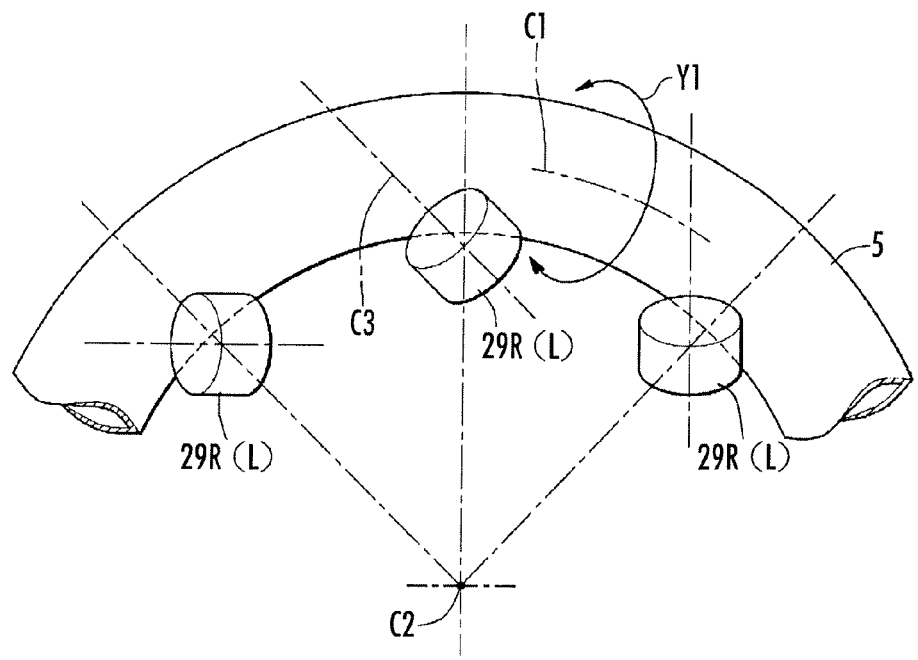
FIG. 6 is a diagram illustrating the placement relationship between the traveling motion unit (wheel unit) and free rollers of the inverted pendulum type vehicle according to the embodiment.

In this case, as illustrated in FIG. 1 and FIG. 6, the free rollers 29R and 29L are disposed in postures in which the axial centers C3 thereof are inclined against the axial center C2 of the wheel assembly 5 and also inclined against the diametrical direction of the wheel assembly 5 (the radial direction connecting the axial center C2 and the free rollers 29R and 29L when the wheel assembly 5 is observed in the direction of the axial center C2 thereof). Further, in the aforesaid postures, the outer peripheral surfaces of the free rollers 29R and 29L, respectively, are pressed into contact aslant with the inner peripheral surface of the wheel assembly 5.

More generally speaking, the right free rollers 29R are pressed into contact with the inner peripheral surface of the wheel assembly 5 in postures in which a frictional force component in the direction about the axial center C2 (a frictional force component in the tangential direction of the inner periphery of the wheel assembly 5) and a frictional force component in the direction about the center C1 of the cross-section of the wheel assembly (a frictional force component in the tangential direction of the circular cross section) can be applied to the wheel assembly 5 at a surface in contact with the wheel assembly 5 when the rotating member 27R is rotatively driven about the axial center C2. The same applies to the left free rollers 29L.

In this case, as described above, the cover members 21R and 21L are biased by the springs, which are not shown, in the direction for narrowing the bottom end portions (the distal ends of the forked portions) of the cover members 21R and 21L. Thus, the urging force holds the wheel assembly 5 between the right free rollers 29R and the left free rollers 29L, and the free rollers 29R and 29L are maintained in the press contact with the wheel assembly 5 (more specifically, the press contact state that enables a frictional force to act between the free rollers 29R and 29L and the wheel assembly 5).

In the vehicle 1 having the structure described above, when the rotating members 27R and 27L are rotatively driven at the same velocity in the same direction by the electric motors 31R and 31L, respectively, the wheel assembly 5 will rotate about the axial center C2 in the same direction as those of the rotating members 27R and 27L. This causes the wheel assembly 5 to circumrotate on a floor surface in the fore-and-aft direction and the whole vehicle 1 will travel in the fore-and-aft direction. In this case, the wheel assembly 5 does not rotate about the center C1 of the cross-section thereof.

Further, if, for example, the rotating members 27R and 27L are rotatively driven in opposite directions from each other at velocities of the same magnitude, then the wheel assembly 5 will rotate about the center C1 of the cross section thereof. This causes the wheel assembly 5 to travel in the direction of the axial center C2 thereof (i.e., in the lateral direction), thus causing the whole vehicle 1 to travel in the lateral direction. In this case, the wheel assembly 5 does not rotate about the axial center C2 thereof.

Further, if the rotating members 27R and 27L are rotatively driven in the same direction or opposite directions at velocities that are different from each other (velocities including directions), then the wheel assembly 5 will rotate about the axial center C2 and also rotate about the center C1 of the cross-section thereof.

At this time, motions combining the aforesaid rotational motions (combined motions) cause the wheel assembly 5 to travel in directions inclined relative to the fore-and-aft direction and the lateral direction, thus causing the whole vehicle 1 to travel in the same direction as that of the wheel assembly 5. The traveling direction of the wheel assembly 5 in this case will change, depending upon the difference between the rotational velocities, including the rotational directions, of the rotating members 27R and 27L (the rotational velocity vectors, the polarities of which are defined according to rotational directions).

The traveling motions of the wheel assembly 5 effected as described above. Therefore, by controlling the rotational velocities (including the rotational directions) of the electric motors 31R and 31L, and consequently by controlling the rotational velocities of the rotating members 27R and 27L, it becomes possible to control the traveling velocity and the traveling direction of the vehicle 1.

Incidentally, the foot mount unit 3 and the base body 9 are tiltable about the lateral axial center C2, the axial center C2 of the wheel assembly 5 being the supporting point, and also tiltable together with the wheel assembly 5 about the longitudinal axis, the ground contact surface (the lower end surface) of the wheel assembly 5 being the supporting point.

The construction for controlling the operation of the vehicle 1 according to the present embodiment will now be described. In the following description, assuming an XYZ coordinate system, in which the longitudinal horizontal axis is indicated by an X-axis, the lateral horizontal axis is indicated by a Y-axis, and the vertical direction is indicated by a Z-axis, as illustrated in FIG. 1 and FIG. 2, the fore-and-aft direction and the lateral direction may be referred to as the X-axis direction and the Y-axis direction, respectively.

First, the control of the operation of the vehicle 1 will be outlined. According to the present embodiment, basically, if the occupant, who is boarding the vehicle 1 in a standing state on the foot mount unit 3 (the steps 3R, 3L) while gripping the grips 15R, 15L, tilts his/her upper body (more specifically, if the upper body is tilted such that the position of the overall center-of-gravity point combining the occupant and the vehicle 1 (the position projected onto a horizontal plane) is moved), then the base body 9 is tilted together with the foot mount unit 3 toward the side to which the upper body has been tilted. At this time, the traveling motion of the wheel assembly 5 is controlled such that the vehicle 1 travels toward the side to which the base body 9 has tilted. For example, if the occupant tilts his/her upper body forward, causing the base body 9 to tilt forward together with the foot mount unit 3 then the traveling motion of the wheel assembly 5 is controlled to cause the vehicle 1 to travel forward.

In other words, according to the present embodiment, the operation in which the occupant moves his/her upper body, causing the foot mount unit 3 and the base body 9 to tilt provides one basic steering operation for the vehicle 1 (a motion request of the vehicle 1), and the traveling motion of the wheel assembly 5 is controlled through the actuator 7 according to the steering operation.

Here, in the vehicle 1 according to the present embodiment, the ground contact surface of the wheel assembly 5 as the ground contact surface of the whole vehicle 1 will be a single local region which is smaller than a region resulting from projecting all the vehicle 1 and the occupant thereon onto a floor surface, and a floor reaction force will act only on the single local region. For this reason, in order to prevent the base body 9 from falling due to tilting, the wheel assembly 5 must be moved such that the overall center-of-gravity point of the occupant and the vehicle 1 is positioned substantially right above the ground contact surface of the wheel assembly 5.

Therefore, according to the present embodiment, the posture of the base body 9 in a state wherein the overall center-of-gravity point of the occupant and the vehicle 1 is positioned substantially right above the central point of the wheel assembly 5 (the central point on the axial center C2) (more precisely, in a state wherein the center-of-gravity point is positioned substantially right above the ground contact surface of the wheel assembly 5) is defined as a desired posture, and basically, the traveling motion of the wheel assembly 5 is controlled such that the actual posture of the base body 9 is converged to the desired posture.

Further, in a state wherein no occupant is aboard the vehicle 1, the posture of the base body 9 in a state which the center-of-gravity point of the vehicle 1 alone is positioned substantially right above the central point of the wheel assembly 5 (the central point on the axial center C2) (more precisely, a state wherein the center-of-gravity point is positioned substantially right above the ground contact surface of the wheel assembly 5) is defined as a desired posture, and the actual posture of the base body 9 is converged to the desired posture. Thus, the traveling motion of the wheel assembly 5 is controlled such that the vehicle 1 supports itself without causing the base body 9 to fall from tilting.

Further, in either state of the state where the occupant is aboard the vehicle 1 and the state where the occupant is not aboard, the traveling motion of the wheel assembly 5 is controlled so that the traveling speed of the vehicle 1 becomes faster as the deviation of the actual posture of the base body 9 from the desired posture becomes larger, and that the traveling of the vehicle 1 stops in the state where the actual posture of the base body 9 coincides with the desired posture.

Further, when the occupant intend to board the vehicle 1, or intend to dismount from the vehicle 1, the traveling motion of the wheel assembly 5 is controlled so that the boarding action or the dismounting action may be performed easily by the occupant.

Supplementally, "the posture" means a spatial orientation. In the present embodiment, when the base body 9 tilts together with the foot mount unit 3, the postures of the base body 9 and the foot mount unit 3 change. Further, in the present embodiment, the base body 9 and the foot mount unit 3 integrally tilt, so that converging the posture of the base body 9 to the desired posture is equivalent to converging the posture of the foot mount unit 3 to a desired posture associated with the foot mount unit 3 (the posture of the foot mount unit 3 in a state wherein the posture of the base body 9 coincides with a desired posture of the base body 9).

According to the present embodiment, in order to control the operation of the vehicle 1 as described above, a control unit 50 constructed of an electronic circuit unit which mainly includes a microcomputer and a drive circuit unit for the electric motors 31R and 31L, a tilt sensor 52 for measuring a tilt angle $\theta b$ relative to the vertical direction (the gravitational direction) of a predetermined portion of the base body 9 and a changing velocity thereof ($=d\theta b/dt$) as the state amounts related to the posture of the base body 9 (or the posture of the foot mount unit 3), load sensors 54R, 54L for detecting whether or not an occupant is placing the foot on the steps 3R, 3L of the foot mount unit 3, and rotary encoders 56R and 56L serving as angle sensors for detecting the rotational angles and the rotational angular velocities of the output shafts of the electric motors 31R and 31L, a boarding/dismounting operator 58 for making the control unit 50 realize the fact that the occupant is intending to board the vehicle 1, or intend to dismount from the vehicle 1, respectively, are mounted at appropriate places of the vehicle 1, as illustrated in FIG. 1 and FIG. 2.

In this case, the control unit 50 and the tilt sensor 52 are installed to the support frame 13 by, for example, being accommodated in the support frame 13 of the base body 9. Further, the load sensors 54R, 54L are incorporated in the steps 3R, 3L, respectively. Further, the rotary encoders 56R and 56L are provided integrally with the electric motors 31R and 31L. The rotary encoders 56R and 56L may alternatively be attached to the rotating members 27R and 27L, respectively.

More specifically, the aforesaid tilt sensor 52 is constructed of an acceleration sensor and a rate sensor (angular velocity sensor), such as a gyro sensor, and outputs detection signals of these sensors to the control unit 50. Then, the control unit 50 carries out predetermined measurement arithmetic processing (this may be publicly known arithmetic processing) on the basis of the outputs of the acceleration sensor and the rate sensor of the tilt sensor 52 thereby to calculate the measured value of the tilt angle θb of the portion, to which the tilt sensor 52 is installed (the support frame 13 in the present embodiment), relative to the vertical direction and the measured value of the tilt angular velocity θbdot, which is a change rate (differential value) thereof.

In this case, to be more specific, the tilt angle θb to be measured (hereinafter referred to a base body tilt angle θb in some cases) is constituted of a component in the direction about the Y-axis (a pitch direction) θb_x and a component in the direction about the X-axis (a roll direction) θb_y. Similarly, the tilt angular velocity θbdot to be measured (hereinafter referred to a base body tilt angular velocity θbdot in some cases) is composed of a component in the direction about the Y-axis (the pitch direction) θbdot_x (=dθb_x/dt) and a component in the direction about the X-axis (the roll direction) θbdot_y (=dθb_y/dt).

Supplementally, according to the present embodiment, the steps 3R, 3L of the foot mount unit 3 tilt integrally with the support frame 13 of the base body 9, so that the base body tilt angle θb also has a meaning as the tilt angle of the foot mount unit 3.

In the description of the present embodiment, regarding variables, such as a motional state amount having components in directions of the X-axis and the Y-axis, such as the aforesaid base body tilt angle θb (or directions about each axes), or variables, such as coefficients related to the motional state amount, the reference characters of the variables will be accompanied by a suffix "_x" or "_y" to distinguishably denote the components.

In this case, for the variables related to translational motions, such as a translational velocity, a component in the X-axis direction thereof will be accompanied by the suffix "_x" and a component in the Y-axis direction thereof will be accompanied by the suffix "_y."

Meanwhile, regarding the variables related to rotational motions, such as angles, rotational velocities (angular velocities), and angular acceleration, for the purpose of convenience, a component in the direction about the Y-axis will be accompanied by the suffix "_x" and a component in the direction about the X-axis will be accompanied by the suffix "_y" in order to match the variables related to translational motions with suffixes.

Further, to denote a variable in the form of a pair of a component in the X-axis direction (or a component in the direction about the Y-axis) and a component in the Y-axis direction (or a component in the direction about the X-axis), the suffix "_xy" is added to the reference character of the variable. For example, to express the aforesaid base body tilt angle θb in the form of the pair of a component in the direction about the Y-axis θb_x and a component in the direction about the X-axis θb_y, the pair will be denoted by "the base body tilt angle θb_xy."

The load sensor 54R, out of the load sensors 54R, 54L, is incorporated in the step 3R so as to be subjected to a load from the right foot of the occupant to the step 3R when the occupant mounts his/her right foot on the step 3R, and outputs a detection signal based on the load to the control unit 50. Similarly, the load sensor 54L is incorporated in the step 3L so as to be subjected to a load from the left foot of the occupant to the step 3L when the occupant mounts his/her left foot on the step 3L, and outputs a detection signal based on the load to the control unit 50. Then, the control unit 50 determines whether or not the occupant is placing his/her feet on the steps 3R, 3L, on the basis of the measured value of the load indicated by the output of the load sensors 54R, 54L. In this case, the state where the occupant is placing his/her feet on both of the steps 3R, 3L, means the state where the occupant is boarding the vehicle 1.

In place of the load sensors 54R, 54L, a switch type sensor which, for example, turns on when an occupant places the foot in each steps 3R, 3L may be used.

The rotary encoder 56R generates a pulse signal each time the output shaft of the electric motor 31R rotates for a predetermined angle, and outputs the pulse signal to the control unit 50. Then, based on the pulse signal, the control unit 50 measures the rotational angle of the output shaft of the electric motor 53R and further measures the temporal change rate (differential value) of the measured value of the rotational angle as the rotational angular velocity of the electric motor 53R. The same applies to the rotary encoder 56L for the electric motor 31L.

The boarding/dismounting operator 58 is attached, in the present embodiment, to either one of the grips 15R, 15L, for example to the grip 15R. A boarding/dismounting operator 58 is, for example a switch which is capable of being operable by selectively pushing one end 58a and another end 58b, and a signal corresponding to the pushing operation (single trigger signal) is output to the control unit 50, when each end portions 58a, 58b is operated by pushing. In this case, in the present embodiment, one of the end portions 58a, 58b, for example the end portion 58a, is a portion to be performed with pushing operation when the occupant intends to board the vehicle 1 (more specifically, when the occupant intends to start the boarding action), and the other end portion 58b is a portion to be performed with pushing operation when the occupant intends to dismount from the vehicle 1 (more specifically, when the vehicle intends to start the dismounting action). Hereinafter, the end portions 58a, 58b of the boarding/dismounting operator 58 will be referred to as an operator for boarding 58a and an operator for dismounting 58b, respectively.

In the state where no pushing operation is performed to both the operator for boarding 58a and the operator for dismounting 58b, the boarding/dismounting operator 58 restores to a non-operated state (the state where no trigger signal is output).

The control unit 50 carries out predetermined arithmetic processing by using the aforesaid measured values and the trigger signal arbitrarily input from the boarding/dismounting operator 58 thereby to determine velocity commands, which are the desired values of the rotational angular velocities of the electric motors 31R and 31L, respectively, and carries out feedback control on the rotational angular velocity of each of the electric motors 31R and 31L according to the determined velocity commands.

Incidentally, the relationship between the rotational angular velocity of the output shaft of the electric motor 31R and the rotational angular velocity of the rotating member 27R will be a proportional relationship based on the speed reduction ratio of a fixed value between the output shaft and the rotating member 27R. Hence, for the sake of convenience, in the description of the present embodiment, the rotational angular velocity of the electric motor 31R will mean the rotational angular velocity of the rotating member 27R. Similarly, the rotational angular velocity of the electric motor 31L will mean the rotational angular velocity of the rotating member 27L.

The following will describe in more detail the control processing carried out by the control unit 50.

Figure 7:
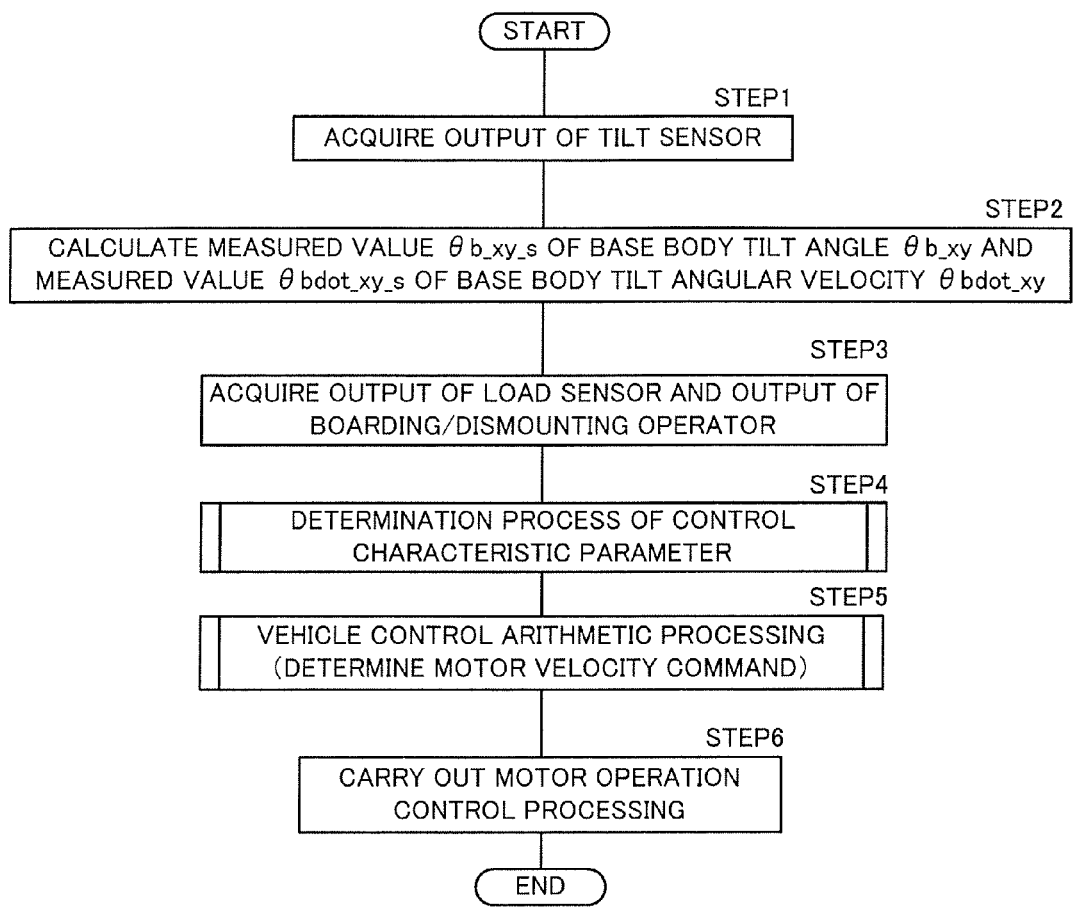
FIG. 7 is a flowchart illustrating the processing by a control unit of the inverted pendulum type vehicle according to the embodiment.

The control unit 50 executes the processing (main routine processing) illustrated by the flowchart of FIG. 7 at a predetermined control processing cycle.

First, in STEP1, the control unit 50 acquires an output of a tilt sensor 52.

Subsequently, the control unit 50 proceeds to STEP2 to calculate a measured value θb_xy_s of a base body tilt angle θb and a measured value θbdot_xy_s of a base body tilt angular velocity θbdot on the basis of the acquired output of the tilt sensor 52.

In the following description, to denote the observed value (the measured value or an estimated value) of an actual value of a variable (a state amount), such as the aforesaid measured value θb_xy_s, by a reference character, the reference character of the variable will have a suffix "_s".

Subsequently, in STEP3, the control unit 50 receives the output from the load sensors 54R, 54L, and the output from the boarding/dismounting operator 58, and carries out the processing in STEP4.

Here, in the present embodiment, as the operational mode of vehicle 1, there are a during-boarding mode which is the operational mode in the state where the occupant in on board the vehicle 1 (state during boarding), an autonomous mode in a state where the occupant is not boarding the vehicle 1 (non-during-boarding mode), a mode for boarding action which is the operational mode for the time when the occupant intends to board the vehicle 1 (during boarding action), and a mode for dismounting action which is the operational mode for the time when the occupant intends to dismount from the vehicle 1 (during dismounting action). And, the control unit 50 controls the traveling motion of the wheel assembly 5, in each operational mode, with a control characteristics suitable for each operational mode.

The processing in aforesaid STEP4 is a processing for determining the operational mode of the vehicle 1, on the bais of the out from the load sensors 54R, 54L, and the output from the boarding/dismounting operator 58, and for determining the control characteristics parameter which defines the control characteristics in the determined operational mode. Although the details of the processing will be explained later, in the present embodiment, the control characteristics parameter determined in the processiong of STEP4 includes desired base body tilt angle values θb_xy_obj which is a desired value of the tilt angle of the base body 9, and a second gain adjustment parameter Kr2 to be explained later.

In this case, the desired base body tilt angle values θb_xy_obj are basically determined as follows in each operational mode. That is, in the during-boarding mode, θb_xy_obj is determined such that a value (hereinafter sometimes referred to as a set value for the during-boarding mode θb_xy_during-boarding) preliminarily set so as to coincide with or almost coincide with the measured value θb_xy_s of the base body tilt angle θb measured on the basis of an output of the tilt sensor 52 in a posture of the base body 9 in which the overall center-of-gravity point of the vehicle 1 and the occupant aboard the vehicle (hereinafter referred to as the vehicle-occupant overall center-of-gravity point) is positioned substantially right above a ground contact surface of the wheel assembly 5.

Further, in the autonomous mode, θb_xy_obj is determined such that a value (hereinafter sometimes referred to as a set value for autonomous mode θb_xy_autonomous) preliminarily set so as to coincide with or almost coincide with the measured value θb_xy_s of the base body tilt angle θb measured on the basis of an output of the tilt sensor 52 in a posture of the base body 9 in which the center-of-gravity point of the vehicle 1 alone (hereinafter referred to as a vehicle-alone center-of-gravity point) is positioned substantially right above the ground contact surface of the wheel assembly 5.

Here, the vehicle 1 of the present embodiment is a vehicle with a laterally symmetric configuration, so that the component θb_y_during-boarding about the X-axis of θb_xy_during-boarding and the component θb_y_autonomous about the X-axis of θb_xy_autonomous is a same value.

Further, in the mode for boarding action and the mode for dismounting action, θb_xy_obj is determined such that the posture of the base body 9 in the state where the actual tilt angle of the base body 9 is made to coincide with θb_xy_obj takes a posture tilted about the X-axis in the right side or the left side, and that θb_xy_obj is prevented from changing abruptly.

Supplementally, in each operational mode, the desired value of a component θbdot_x in the direction about a Y-axis of the base body tilt angular velocity θbdot and the desired value of a component θbdot_y in the direction about an X-axis thereof are both 0. For this reason, it is unnecessary to carry out the processing for setting a desired value of the base body tilt angular velocity θbdot_xy.

Further, although the details will be explained later, the second gain adjustment parameter Kr2 is set to a value withint the range of from 0 to 1. In this case, in the during-boarding mode and the autonomous mode, the value of Kr2 is set to 0, and in the mode for boarding action and a dismounting action, the value of Kr2 is basically determined variably to a value larger than 0.

After determining the control characteristics parameter in STEP4, the control unit 50 subsequently carries out vehicle control arithmetic processing in STEP5 thereby to determine the speed commands for electric motors 31R and 31L, respectively. The vehicle control arithmetic processing will be discussed later in detail.

Subsequently, the control unit 50 proceeds to STEP6 to carry out the processing for controlling the operations of the electric motors 31R and 31L according to the speed commands determined in STEP5. In this operation control processing, based on the difference between the speed command for the electric motor 31R determined in STEP5 and the measured value of the rotational speed of the electric motor 31R measured on the basis of an output of a rotary encoder 56R, the control unit 50 determines a desired value (desired torque) of an output torque of the electric motor 31R such that the difference is converged to 0. Then, the control unit 50 controls the current supplied to the electric motor 31R such that the electric motor 31R outputs an output torque of the desired torque. The same applies to the operation control of the left electric motor 31L.

The above has described the general control processing carried out by the control unit 50.

Next, the processing in aforesaid STEP4 (determination processing of the control characteristics parameter) and the vehicle control arithmetic processing in STEP5, the explanations thereof having been postponed, will be explained in detail below.

First, for the sake of explanation, the details of the vehicle control arithmetic processing in STEP5 will be explained.

Here, in the following explanation, the overall center-of-gravity point of a group which acts a translational force by gravitational force downwardly in the perpendicular direction to the ground countact surface of the wheel assembly 5 will be called a vehicle system center-of-gravity point. In this case, the vehicle system center-of-gravity point coincides with the vehicle-occupant overall center-of-gravity in the case where the operational mode of the vehicle 1 is the during-boarding mode, and coincides with the vehicle-alone center-of-gravity point in the case where the same is the autonomous mode. Further, in the case where the operational mode of the vehicle 1 is the mode for boarding action or the mode for dismounting action, the position of the vehicle system center-of-gravity point is, for the sake of convenience, taken as existing at a predetermined position determined beforehand. The predetermined position may be a position coinciding with the position of the vehicle-occupant overall center-of-gravity point or the vehicle-alone center-of-gravity point.

Further, in the following description, regarding the values (updated values) determined at each control processing cycle by the control unit 50, a value determined at a current (latest) control processing cycle may be referred to as a current value, and a value determined at an immediately preceding control processing cycle may be referred to as a previous value. Further, a value will mean a current value unless otherwise specified as a current value or a previous value.

Further, regarding the velocity and acceleration in the X-axis direction, a forward-facing direction will be defined as a positive direction, and regarding the velocity and acceleration in the Y-axis direction, a left-facing direction will be defined as the positive direction.

Figure 8:
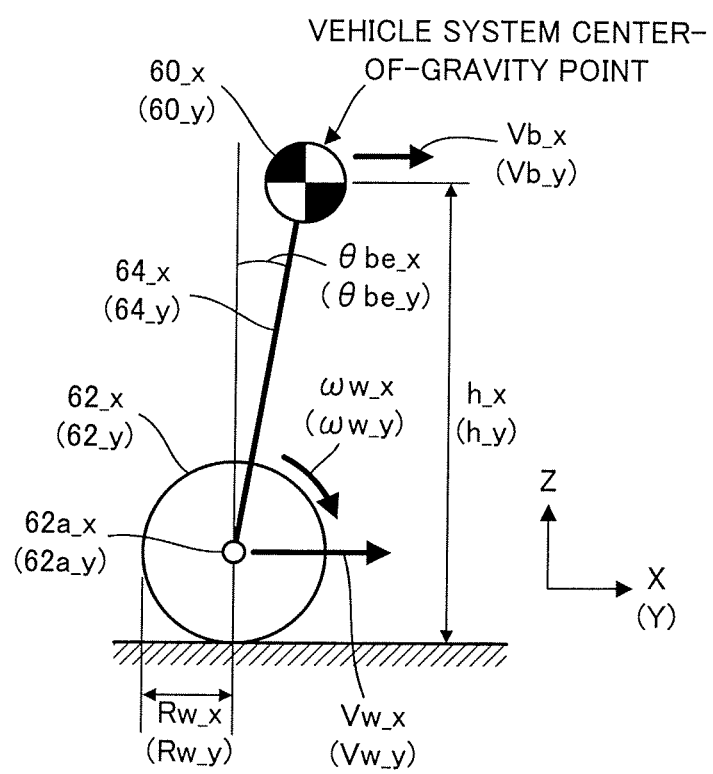
FIG. 8 is a diagram illustrating an inverted pendulum model expressing the dynamic behaviors of the inverted pendulum type vehicle according to the embodiment.

In the present embodiment, the vehicle control arithmetic processing in STEP5 is carried out, assuming that the dynamic behaviors of the vehicle system center-of-gravity point (more specifically, the behaviors observed by projecting the behaviors from the Y-axis direction onto a plane (XZ plane) which is orthogonal thereto, and the behaviors observed by projecting the behaviors from the X-axis direction onto a plane (YZ plane) which is orthogonal thereto) in the during-boarding mode or the autonomous mode are approximately expressed by the behaviors of an inverted pendulum model (dynamic behaviors of the inverted pendulum), as shown in FIG. 8.

In FIG. 8, unparenthesized reference numerals denote the reference numerals associated with the inverted pendulum model observed from the Y-axis direction, while the parenthesized reference numerals denote the reference numerals associated with the inverted pendulum model observed from the X-axis direction.

In this case, the inverted pendulum model expressing a behavior observed from the Y-axis direction is provided with a mass point 60_x positioned at the vehicle system center-of-gravity point and a imaginary wheel 62_x, which has a rotational axis 62a_x parallel to the Y-axis direction and which freely circumrotate on a floor surface (hereinafter referred to as the imaginary wheel 62_x). Further, the mass point 60_x is supported by a rotational shaft 62a_x of the imaginary wheel 62_x through the intermediary of a linear rod 64_x such that the mass point 60_x is swingable about the rotational shaft 62a_x, using the rotational shaft 62a_x as the supporting point.

In this inverted pendulum model, a motion of the mass point 60_x corresponds to a motion of the vehicle system center-of-gravity point observed from the Y-axis direction. Further, it is assumed that the tilt angle θbe_x of the rod 64_x relative to a vertical direction coincides with a difference θbe_x_s between a base body tilt angle measured value θb_x_s in the direction about the Y-axis and a base body tilt angle desired value θb_x_obj) determined as is explained later by the processing in STEP4 (=θb_x_s−θb_x_obj). It is also assumed that a changing velocity of the tilt angle θbe_x of the rod 64_x (=dθbe_x/dt) coincides with a base body tilt angular velocity measured value θbdot_x_s in the direction about the Y-axis. Further, it is assumed that a moving velocity Vw_x of the imaginary wheel 62_x (the translational moving velocity in the X-axis direction) coincides with the moving velocity of the wheel assembly 5 of the vehicle 1 in the X-axis direction.

Similarly, the inverted pendulum model expressing a behavior observed from the X-axis direction (refer to the parenthesized reference numerals in FIG. 8) is provided with a mass point 60_y positioned at the vehicle system center-of-gravity point and a imaginary wheel 62_y, which has a rotational axis 62a_y parallel to the X-axis direction and which freely circumrotate on a floor surface (hereinafter referred to as the imaginary wheel 62_y). Further, the mass point 60_y is supported by a rotational shaft 62a_y of the imaginary wheel 62_y through the intermediary of a linear rod 64_y such that the mass point 60_y is swingable about the rotational shaft 62a_y, using the rotational shaft 62a_y as the supporting point.

In this inverted pendulum model, a motion of the mass point 60_y corresponds to a motion of the vehicle system center-of-gravity point observed from the X-axis direction. Further, it is assumed that the tilt angle θbe_y of the rod 64_y relative to the vertical direction coincides with a difference θbe_y_s between a base body tilt angle measured value θb_y_s in the direction about the X-axis and a base body tilt angle desired value θb_y_obj to be determined as is explained later (=θb_y_s−θb_y_obj). It is also assumed that a changing velocity of the tilt angle θbe_y of the rod 64_y (=dθbe_y/dt) coincides with a base body tilt angular velocity measured value θbdot_y_s in the direction about the X-axis. Further, it is assumed that a moving velocity Vw_y of the imaginary wheel 62_y (the translational moving velocity in the Y-axis direction) coincides with the moving velocity of the wheel assembly 5 of the vehicle 1 in the Y-axis direction.

It is assumed that the imaginary wheels 62_x and 62_y have radii Rw_x and Rw_y of predetermined values, respectively.

It is assumed that relationships represented by expressions 01a and 01b given below hold between rotational angular velocities ωw_x and ωw_y of the imaginary wheels 62_x and 62_y, respectively, and rotational angular velocities ω_R and ω_L of the electric motors 31R and 31L, respectively (more accurately, the rotational angular velocities ω_R and ω_L of rotational members 27R and 27L, respectively).

$$\omega w\_x = (\omega\_R + \omega\_L)/2 \qquad \text{Expression 01a}$$

$$\omega w\_y = C \cdot (\omega\_R - \omega\_L)/2 \qquad \text{Expression 01b}$$

where "C" in expression 01b denotes a coefficient of a predetermined value that depends on a mechanical relationship or slippage between free rollers 29R and 29L and the wheel assembly 5. The positive directions of ωw_x, ω_R and ω_L are the directions in which the imaginary wheel 62_x rotates in the case where the imaginary wheel 62_x circumrotates forward. The positive direction of ωw_y is the direction in which the imaginary wheel 62_y rotates in the case where the imaginary wheel 62_y circumrotates leftwards.

Here, the dynamics of the inverted pendulum model shown in FIG. 8 is represented by expressions 03x and 03y given below. Expression 03x is an expression that represents the dynamics of the inverted pendulum model observed from the Y-axis direction, while expression 03y is an expression that represents the dynamics of the inverted pendulum model observed from the X-axis direction.

$$d^2\theta be\_x/dt^2 = \alpha\_x \cdot \theta be\_x + \beta\_x \cdot \omega \text{dot}\_x \qquad \text{Expression 03x}$$

$$d^2\theta be\_y/dt^2 = \alpha\_y \cdot \theta be\_y + \beta\_y \cdot \omega \text{dot}\_y \qquad \text{Expression 03y}$$

where ωdot_x in expression 03x denotes the rotational angular acceleration (first-order differential value of the rotational angular velocity ωw_x) of the imaginary wheel 62_x, α_x denotes a coefficient which depends on a mass or a height h_x of the mass point 60_x, and β_x denotes a coefficient which depends on an inertia (inertial moment) or the radius Rw_x of the imaginary wheel 62_x. The same applies to ωdot_y, α_y, and β_y in expression 03y.

As may be understood from these expressions 03x and 03y, the motions of the mass points 60_x and 60_y of the inverted pendulum (i.e., the motions of the vehicle system center-of-gravity point) are specified, depending on the rotational angular acceleration ωdot_x of the imaginary wheel 62_x and the rotational angular acceleration ωdot_y of the imaginary wheel 62_y, respectively.

In the present embodiment, therefore, the rotational angular acceleration ωdot_x of the imaginary wheel 62_x is used as the manipulated variable (control input) for controlling the motion of the vehicle system center-of-gravity point observed from the Y-axis direction, while the rotational angular acceleration ωdot_y of the imaginary wheel 62_y is used as the manipulated variable (control input) for controlling the motion of the vehicle system center-of-gravity point observed from the X-axis direction.

To briefly describe the vehicle control arithmetic processing in STEP9, the control unit 50 determines imaginary wheel rotational angular acceleration commands ωdot_x_cmd and ωdot_y_cmd, which are the command values (desired values) of the rotational angular accelerations ωdot_x and ωdot_y as the manipulated variables such that the motion of the mass point 60_x observed in the X-axis direction and the motion of the mass point 60_y observed in the Y-axis direction become the motions corresponding to desired motions of the vehicle system center-of-gravity point. Further, the control unit 50 determines the values obtained by integrating the imaginary wheel rotational angular acceleration commands ωdot_x_cmd and ωdot_y_cmd, respectively, as the imaginary wheel rotational angular velocity commands ωw_x_cmd and ωw_y_cmd, which are the command values (desired values) of the rotational angular velocities ωw_x and ωw_y of the imaginary wheels 62_x and 62_y, respectively.

Further, the control unit 50 defines the moving velocity of the imaginary wheel 62_x corresponding to the imaginary wheel rotational angular velocity command ωw_x_cmd (=Rw_x·ωw_x_cmd) and the moving velocity of the imaginary wheel 62_y corresponding to the imaginary wheel rotational angular velocity command ωw_y_cmd (=Rw_y·ωw_y_cmd) as the desired moving velocity of the wheel assembly 5 of the vehicle 1 in the X-axis direction and the desired moving velocity thereof in the Y-axis direction, respectively, and the control unit 50 determines velocity commands ω_R_cmd and ω_L_cmd of the electric motors 31R and 31L, respectively, so as to achieve the desired moving velocities.

In the present embodiment, the imaginary wheel rotational angular acceleration commands ωdot_x_cmd and ωdot_y_cmd as the manipulated variables (control inputs) are determined by adding up three manipulated variable components, as indicated by expressions 07x and 07y, which will be discussed later.

Supplementally, of the imaginary wheel rotational angular acceleration commands ωdot_x_cmd, ωdot_y_cmd as the manipulation variable (control input) in the present embodiment, ωdot_x_cmd is a rotational angular acceleration velocity of the virtual wheel 62_x traveling in the X-axis direction, so that the same functions as the manipulated variable for regulating the driving force to be applied to the wheel assembly 5 for moving the wheel assembly 5 in the X-axis direction. Further, ωdot_y_cmd is a rotational angular acceleration velocity of the virtual wheel 62_y traveling in the Y-axis direction, so that the same functions as the manipulated variable for regulating the driving force to be applied to the wheel assembly 5 for moving the wheel assembly 5 in the Y-axis direction.

Figure 9:
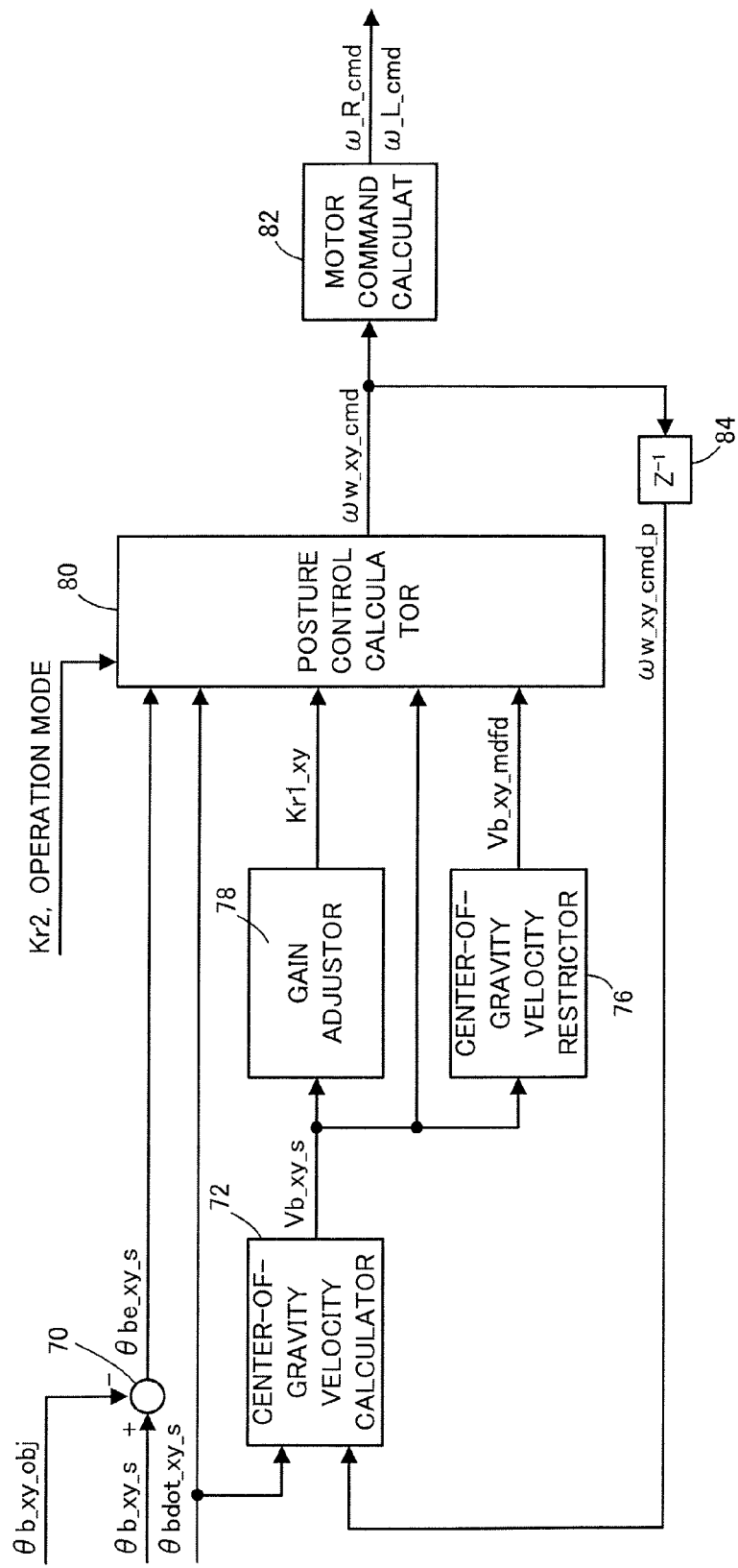
FIG. 9 is a block diagram illustrating a processing function related to the processing in STEP5 of FIG. 7.

The control unit 50 is provided with the functions illustrated in the block diagram of FIG. 9 as the functions for carrying out the vehicle control arithmetic processing in STEP5 as described above.

More specifically, the control unit 50 is provided with an error calculator 70 which calculates the base body tilt angle error measured value θbe_xy_s, which is the difference between the base body tilt angle measured value θb_xy_s and the base body tilt angle desired value θb_xy_obj, a center-of-gravity velocity calculator 72 which calculates an estimated center-of-gravity velocity value Vb_xy_s as an observed value of a center-of-gravity velocity Vb_xy, which is the moving velocity of the vehicle system center-of-gravity point, a center-of-gravity velocity restrictor 76 which determines a desired center-of-gravity velocity for control Vb_xy_mdfd as the desired value of the center-of-gravity velocity Vb_xy by taking into account a restriction based on a permissible range of the rotational angular velocities of the electric motors 31R and 31L, and a gain adjustor 78 which determines a first gain adjustment parameter Kr1_xy for adjusting the values of the gain coefficients of expressions 07x and 07y, which will be discussed later.

The control unit 50 is further provided with a posture control calculator 80 which calculates the imaginary wheel rotational angular velocity command ωw_xy_cmd, and a motor command calculator 82 which converts the imaginary wheel rotational angular velocity command ωw_xy_cmd into a pair of a velocity command ω_R_cmd (a command value of a rotational angular velocity) for the right electric motor 31R and a velocity command ω_L_cmd (a command value of a rotational angular velocity) for the left electric motor 31L.

Reference numeral 84 in FIG. 9 denotes a delay element which receives the imaginary wheel rotational angular velocity command ωw_xy_cmd calculated at each control processing cycle by the posture control calculator 80. The delay element 84 outputs a previous value ωw_xy_cmd_p of the imaginary wheel rotational angular velocity command ωw_xy_cmd at each control processing cycle.

In the vehicle control arithmetic processing in STEP5 described above, the processing by the aforesaid processing sections is carried out as described below.

The control unit 50 first carries out the processing by the error calculator 70 and the processing by the center-of-gravity velocity calculator 72.

The error calculator 70 receives the base body tilt angle measured values θb_xy_s (θb_x_s and θb_y_s) calculated in the aforesaid STEP2 and the base body tilt angle desired values θb_xy_obj (θb_x_obj and θb_y_obj) to be determined by STEP 4 as is explained later. Then, the error calculator 70 subtracts θb_x_obj from θb_x_s to calculate the base body tilt angle error measured value θbe_x_s (=θb_x_s−θb_x_obj) in the direction about the Y-axis, and also subtracts θb_y_obj from θb_y_s to calculate the base body tilt angle error measured value θbe_y_s (=θb_y_s−θb_y_obj) in the direction about the X-axis.

The processing by the error calculator 70 may be carried out in the aforesaid STEP4.

The center-of-gravity velocity calculator 72 receives the current value of the base body tilt angular velocity measured values θbdot_xy_s (θbdot_x_s and θbdot_y_s) calculated in the aforesaid STEP2 and also receives the previous value ωw_xy_cmd_p of the imaginary wheel velocity command ωw_xy_cmd (ωw_x_cmd_p and ωw_y_cmd_p) from the delay element 84. Then, the center-of-gravity velocity calculator 72 calculates an estimated center-of-gravity velocity value Vb_xy_s (Vb_x_s and Vb_y_s) from the above input values according to a predetermined arithmetic expression based on the aforesaid inverted pendulum model.

More specifically, the center-of-gravity velocity calculator 72 calculates Vb_x_s and Vb_y_s according to the following expression 05x and expression 05y, respectively.

$$Vb\_x\_s = Rw\_x \cdot \omega w\_x\_cmd\_p + h\_x \cdot \theta bdot\_x\_s \qquad 05x$$

$$Vb\_y\_s = Rw\_y \cdot \omega w\_y\_cmd\_p + h\_y \cdot \theta bdot\_y\_s \qquad 05y$$

In these expressions 05x and 05y, Rw_x and Rw_y denote the radii of the imaginary wheels 62_x and 62_y, respectively, as described above, and the values thereof are predetermined values set beforehand. Further, reference characters h_x and h_y denote the heights of the mass points 60_x and 60_y, respectively, of the inverted pendulum model. In this case, according to the present embodiment, the height of the vehicle system center-of-gravity point is maintained to be substantially constant in each operational mode of the vehicle 1. Thus, predetermined values set beforehand are used as the values of h_x and h_y, respectively, in each operational mode of the vehicle 1.

Here, the values of h_x, h_y may not necessarily not take a different value for each operational mode. For example, the values of h_x, h_y in the mode for boarding action or the mode for dismounting action may be set to a same value as that in the during-boarding mode.

The first term of the right side of expression 05x given above denotes the moving velocity of the imaginary wheel 62_x in the X-axis direction, which corresponds to the previous value ωw_x_cmd_p of the velocity command of the imaginary wheel 62_x. This moving velocity corresponds to the current value of an actual moving velocity of the wheel assembly 5 in the X-axis direction. Further, the second term of the right side of expression 05x corresponds to the current value of the moving velocity of the vehicle system center-of-gravity point in the X-axis direction attributable to the base body 9 tilting at a tilt angular velocity of θbdot_x_s in the direction about the Y-axis (relative moving velocity in relation to the wheel assembly 5). The same applies to expression 05y.

Alternatively, the pair of the measured values (the current values) of the rotational angular velocities of the electric motors 31R and 31L, respectively, which are measured on the basis of the outputs of the rotary encoders 56R and 56L, may be converted into the pair of the rotational angular velocities of the imaginary wheels 62_x and 62_y, respectively, then the rotational angular velocities may be used in place of ωw_x_cmd_p and ωw_y_cmd_p of expressions 05x and 05y. However, in order to eliminate the influences of noises contained in the measured values of the rotational angular velocities, it is advantageous to use ωw_x_cmd_p and ωw_y_cmd_p, which are desired values.

Subsequently, the control unit 50 carries out the processing by the center-of-gravity velocity restrictor 76 and the processing by the gain adjustor 78. In this case, the center-of-gravity velocity restrictor 76 and the gain adjustor 78 respectively receive the estimated center-of-gravity velocity values Vb_xy_s (Vb_x_s and Vb_y_s) calculated by the center-of-gravity velocity calculator 72 as described above.

Further, the gain adjustor 78 determines the first gain adjustment parameters Kr1_xy (Kr1_x and Kr1_y) on the basis of the input estimated center-of-gravity velocity values Vb_xy_s (Vb_x_s and Vb_y_s).

The processing by the gain adjustor 78 will be described below with reference to FIG. 10 and FIG. 11.

Figure 10:
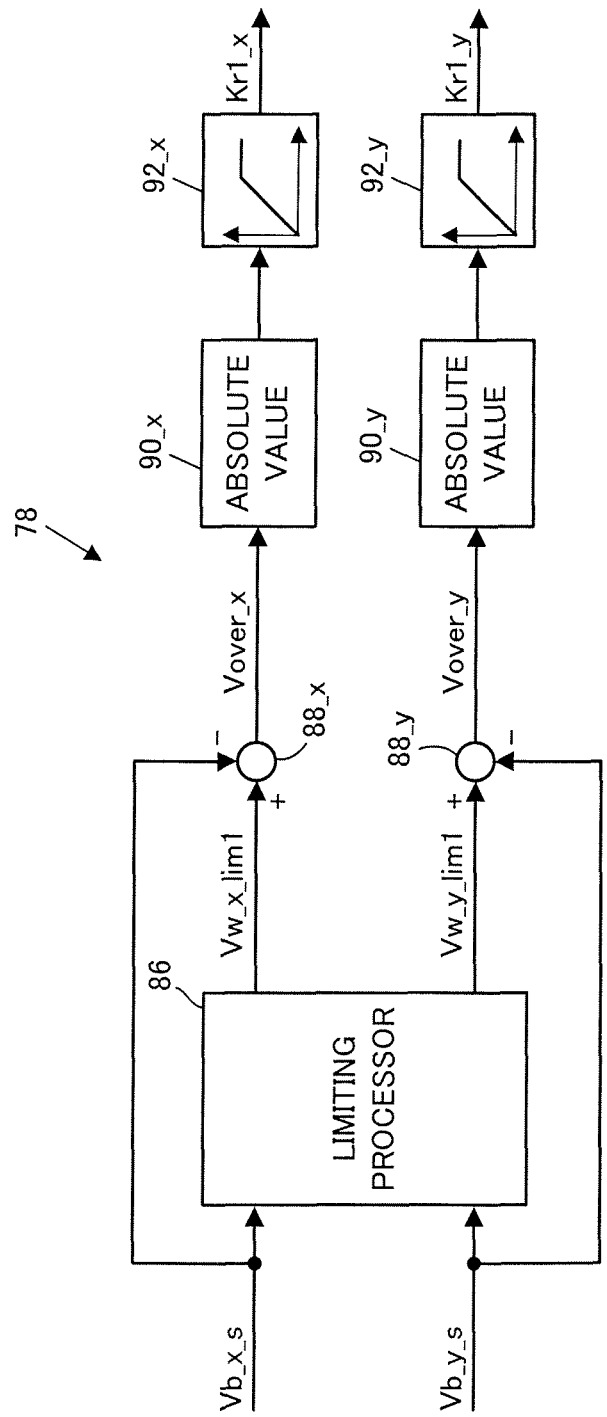
FIG. 10 is a block diagram illustrating a processing function of a gain adjusting element 78 shown in FIG. 9.
Figure 11:
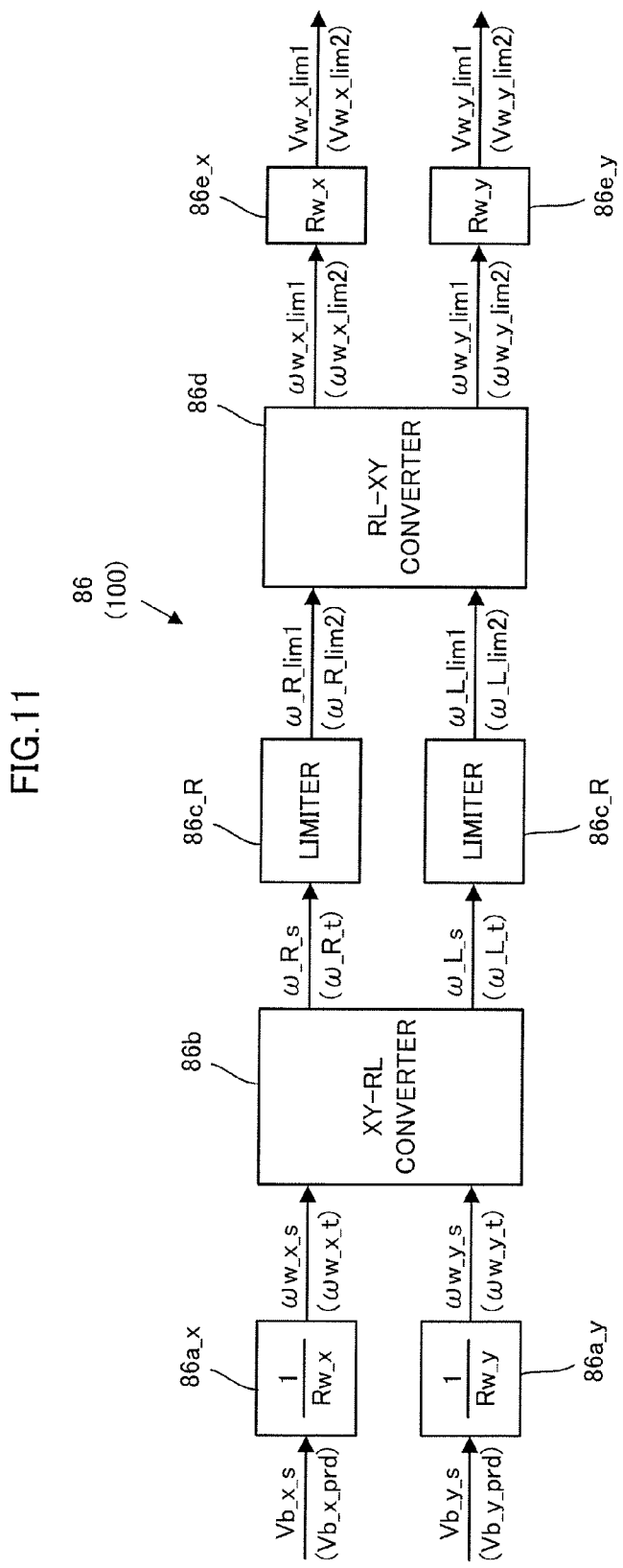
FIG. 11 is a block diagram illustrating a processing function of a limiting processor 86 shown in FIG. 10 (or a limiting processor 100 shown in FIG. 12)

As illustrated in FIG. 10, the gain adjustor 78 supplies the input estimated center-of-gravity velocity values Vb_x_s and Vb_y_s to a limiting processor 86. The limiting processor 86 adds, as appropriate, restrictions based on the permissible ranges of the rotational angular velocities of the electric motors 31R and 31L to the estimated center-of-gravity velocity values Vb_x_s and Vb_y_s, thereby generating output values Vw_x_lim1 and Vw_y_lim1. The output value Vw_x_lim1 means a value obtained after limiting the moving velocity Vw_x of the imaginary wheel 62_x in the X-axis direction and the output value Vw_y_lim1 means a value obtained after limiting the moving velocity Vw_y of the imaginary wheel 62_y in the Y-axis direction.

The processing by the limiting processor 86 will be described in further detail with reference to FIG. 11. The parenthesized reference characters in FIG. 11 denote the processing by a limiting processor 100 of the center-of-gravity velocity restrictor 76, which will be discussed later, and may be ignored in the description related to the processing by the limiting processor 86.

The limiting processor 86 first supplies the estimated center-of-gravity velocity values Vb_x_s and Vb_y_s to processors 86a_x and 86a_y, respectively. The processor 86a_x divides Vb_x_s by the radius Rw_x of the imaginary wheel 62_x to calculate the rotational angular velocity ωw_x_s of the imaginary wheel 62_x in the case where it is assumed that the moving velocity of the imaginary wheel 62_x in the X-axis direction coincides with Vb_x_s. Similarly, the processor 86a_y calculates the rotational angular velocity ωw_y_s of the imaginary wheel 62_y (=Vb_y_s/Rw_y) in the case where it is assumed that the moving velocity of the imaginary wheel 62_y in the Y-axis direction coincides with Vb_y_s.

Subsequently, the limiting processor 86 converts the pair of ωw_x_s and ωw_y_s into a pair of rotational angular velocity ω_R_s of the electric motor 31R and the rotational angular velocity ω_L_s of the electric motor 31L by an XY-RL converter 86b.

According to the present embodiment, the conversion is implemented by solving a simultaneous equation obtained by replacing ωw_x, ωw_y, ω_R and ω_L of the aforesaid expressions 01a and 01b by ωw_x_s, ωw_y_s, ω_R_s and ω_L_s, respectively, taking the ω_R_s and ω_L_s as unknowns.

Subsequently, the limiting processor 86 supplies the output values ω_R_s and ω_L_s of the XY-RL converter 86b to limiters 86c_R and 86c_L, respectively. At this time, the limiter 86c_R directly outputs the ω_R_s as an output value ω_R_lim1 if the ω_R_s falls within the permissible range for the right motor, which has an upper limit value (>0) and a lower limit value (<0) of predetermined values set beforehand. If the ω_R_s deviates from the permissible range for the right motor, then the limiter 86c_R outputs, as the output value ω_R_lim1, a boundary value of the upper limit value or the lower limit value of the permissible range for the right motor whichever is closer to the ω_R_s. Thus, the output value ω_R_lim1 of the limiter 86c_R is limited to a value within the permissible range for the right motor.

Similarly, the limiter 86c_L directly outputs the ω_L_s as an output value ω_L_lim1 if the ω_L_s falls within the permissible range for the left motor, which has an upper limit value (>0) and a lower limit value (<0) of predetermined values set beforehand. If the ω_L_s deviates from the permissible range for the left motor, then the limiter 86c_L outputs, as the output value ω_L_lim1, a boundary value of the upper limit value or the lower limit value of the permissible range for the left motor whichever is closer to the ω_L_s. Thus, the output value ω_L_lim1 of the limiter 86c_L is limited to a value within the permissible range for the left motor.

The permissible range for the right motor described above is a permissible range which has been set so as to prevent the rotational angular velocity (absolute value) of the right electric motor 31R from becoming excessively high thereby to prevent the maximum value of the torque that can be output by the electric motor 31R from decreasing. This applies also to the permissible range for the left motor.

Subsequently, the limiting processor 86 converts the pair of the output values ω_R_lim1 and ω_L_lim1 of the limiters 86c_R and 86c_L, respectively, into a pair of the rotational angular velocities ωw_x_lim1 and ωw_y_lim1 of the imaginary wheels 62_x and 62_y, respectively, by an RL-XY converter 86d.

The conversion is the processing of the inverse conversion of the processing of the conversion by the aforesaid XY-RL converter 86b. This processing is implemented by solving a simultaneous equation obtained by replacing ωw_x, ωw_y, ω_R and ω_L of the aforesaid expressions 01a and 01b by ωw_x_lim1, ωw_y_lim1, ω_R_lim1 and ω_L_lim1, respectively, taking the ωw_x_lim1 and ωw_y_lim1 as unknowns.

Subsequently, the limiting processor 86 supplies the output values ωw_x_lim1 and ωw_y_lim1 of the RL-XY converter 86d to processors 86e_x and 86e_y, respectively. The processor 86e_x multiplies ωw_x_lim1 by the radius Rw_x of the imaginary wheel 62_x to convert ωw_x_lim1 into the moving velocity Vw_x_lim1 of the imaginary wheel 62_x. In the same manner, the processor 86e_y converts ωw_y_lim1 into the moving velocity Vw_y_lim1 of the imaginary wheel 62_y (=ωw_y_lim1·Rw_y).

If it is assumed that the processing by the limiting processor 86 described above causes the moving velocity Vw_x of the imaginary wheel 62_x in the X-axis direction and the moving velocity Vw_y of the imaginary wheel 62_y in the Y-axis direction to agree with the estimated center-of-gravity velocity values Vb_x_s and Vb_y_s, respectively (in other words, if it is assumed that the moving velocity of the wheel assembly 5 in the X-axis direction and the moving velocity in the Y-axis direction are set to agree with Vb_x_s and Vb_y_s, respectively), then the pair of output values Vw_x_lim1 and Vw_y_lim1 coinciding with Vb_x_s and Vb_y_s, respectively, is output from the limiting processor 86 if the rotational angular velocities ω_R_s and ω_L_s of the electric motors 31R and 31L, respectively, which are required for achieving the moving velocities, both fall within permissible ranges.

Meanwhile, if both or one of the rotational angular velocities ω_R_s and ω_L_s of the electric motors 31R and 31L, respectively, deviates from the permissible range or ranges, then both or one of the rotational angular velocities is forcibly limited to be within the permissible range, and a pair of the moving velocities in the X-axis direction and the Y-axis direction Vw_x_lim1 and Vw_y_lim1 corresponding to a pair of the limited rotational angular velocities ω_R_lim1 and ω_L_lim1 of the electric motors 31R and 31L, respectively, is output from the limiting processor 86.

Hence, the limiting processor 86 generates a pair of output values Vw_x_lim1 and Vw_y_lim1 such that the output values Vw_x_lim1 and Vw_y_lim1 agree with Vb_x_s and Vb_y_s, respectively, as much as possible under an essential required condition that the rotational angular velocities of the electric motors 31R and 31L corresponding to the pair of the output values Vw_x_lim1 and Vw_y_lim1, respectively, do not deviate from the permissible ranges.

Referring back to the description of FIG. 10, the gain adjustor 78 then carries out the processing by calculators 88_x and 88_y. The calculator 88_x receives the estimated center-of-gravity velocity value in the X-axis direction Vb_x_s and the output value Vw_x_lim1 of the limiting processor 86. Then, the calculator 88_x calculates a value Vover_x obtained by subtracting Vb_x_s from Vw_x_lim1 and outputs the value Vover_x. Further, the calculator 88_y receives the estimated center-of-gravity velocity value in the Y-axis direction Vb_y_s and the output value Vw_y_lim1 of the limiting processor 86. Then, the calculator 88_y calculates a value Vover_y obtained by subtracting Vb_y_s from Vw_y_lim1 and outputs the value Vover_y.

In this case, if the output values Vw_x_lim1 and Vw_y_lim1 are not forcibly restricted by the limiting processor 86, then Vw_x_lim1=Vb_x_s and Vw_y_lim1=Vb_y_s. Therefore, the output values Vover_x and Vover_y of the calculators 88_x and 88_y, respectively, will be both 0.

Meanwhile, if the output values Vw_x_lim1 and Vw_y_lim1 of the limiting processor 86 are generated by forcibly restricting the input values Vb_x_s and Vb_y_s, then a corrected amount from Vb_x_s of Vw_x_lim1 (=Vw_x_lim1-Vb_x_s) and a corrected amount from Vb_y_s of Vw_y_lim1 (=Vw_y_lim1-Vb_y_s) will be output from the calculators 88_x and 88_y, respectively.

Subsequently, the gain adjustor 78 passes the output value Vover_x of the calculator 88_x through processors 90_x and 92_x in this order thereby to determine the first gain adjustment parameter Kr1_x. Further, the gain adjustor 78 passes the output value Vover_y of the calculator 88_y through processors 90_y and 92_y in this order thereby to determine the first gain adjustment parameter Kr1_y. The first gain adjustment parameters Kr1_x and Kr1_y both take values within the range from 0 to 1.

The processor 90_x calculates and outputs the absolute value of the input Vover_x. Further, the processor 92_x generates Kr1_x such that the output value Kr1_x monotonously increases relative to an input value |Vover_x| and has a saturation characteristic. The saturation characteristic is a characteristic in which a change amount of an output value relative to an increase in an input value becomes 0 or approaches to 0 when the input value increases to a certain level.

In this case, according to the present embodiment, if the input value |Vover_x| is a preset, predetermined value or less, then the processor 92_x outputs, as Kr1_x, a value obtained by multiplying the input value |Vover_x| by a proportionality coefficient of a predetermined value. Further, if the input value |Vover_x| is larger than the predetermined value, then the processor 92_x outputs 1 as Kr1_x. Incidentally, the proportionality coefficient is set such that the product of |Vover_x| and the proportionality coefficient becomes 1 when |Vover_x| agrees with a predetermined value.

The processing by processors 90_y and 92_y is the same as that carried out by the processors 90_x and 92_x, respectively, described above.

If the output values Vw_x_lim1 and Vw_y_lim1 in the limiting processor 86 are not forcibly restricted by the processing carried out by the gain adjustor 78 described above, that is, if the rotational angular velocities of the electric motors 31R and 31L fall within the permissible ranges even when the electric motors 31R and 31L are operated such that the moving velocities Vw_x and Vw_y of the wheel assembly 5 in the X-axis direction and the Y-axis direction, respectively, agree with the estimated center-of-gravity velocity values Vb_x_s and Vb_y_s, respectively, then the first gain adjustment parameters Kr1_x and Kr1_y are both determined to be 0. Therefore, generally, Kr1_x=Kr1_y=0.

Meanwhile, if the output values Vw_x_lim1 and Vw_y_lim1 of the limiting processor 86 are generated by forcibly restricting the input values Vb_x_s and Vb_y_s, that is, if the rotational angular velocity of one of the electric motors 31R and 31L deviates from the permissible range (if the absolute value of one of the rotational angular velocities becomes excessively high) when the electric motors 31R and 31L are operated such that the moving velocities Vw_x and Vw_y of the wheel assembly 5 in the X-axis direction and the Y-axis direction, respectively, agree with the estimated center-of-gravity velocity values Vb_x_s and Vb_y_s, then the values of the first gain adjustment parameters Kr1_x and Kr1_y are determined on the basis of the absolute values of the aforesaid corrected amounts Vover_x and Vover_y, respectively. In this case, Kr_x is determined to be a larger value as the absolute value of the corrected amount Vover_x increases, the upper limit value thereof being 1. The same applies to Kr1_y.

Figure 12:
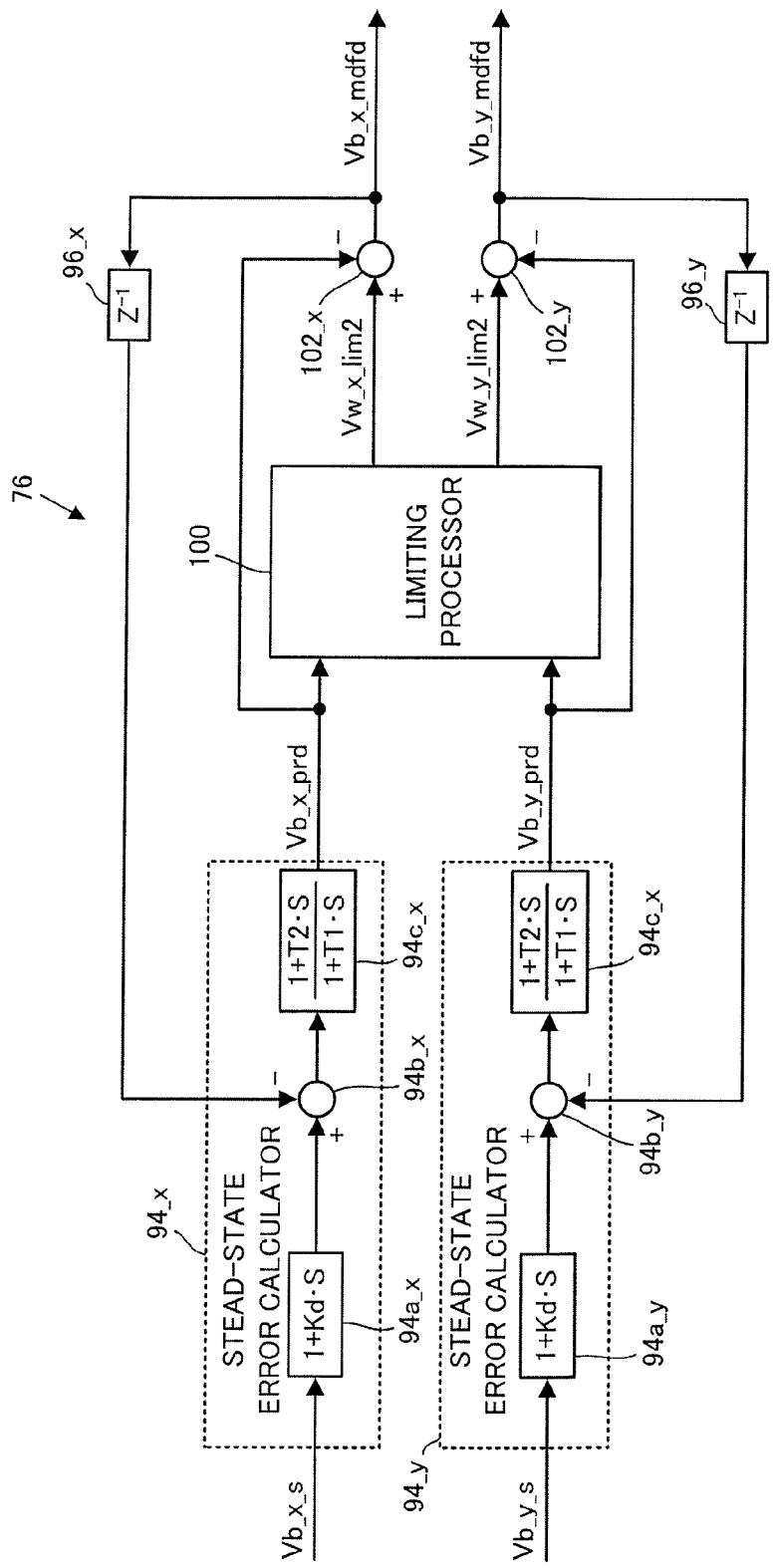
FIG. 12 is a block diagram illustrating a processing function of a center-of-gravity velocity restrictor 76 shown in FIG. 9.

The center-of-gravity velocity restrictor 76 carries out the processing illustrated by the block diagram of FIG. 12 by using the estimated center-of-gravity velocity values Vb_xy_s (Vb_x_s and Vb_y_s) input thereto so as to determine desired center-of-gravity velocities for control Vb_xy_mdfd (Vb_x_mdfd and Vb_y_mdfd).

To be more specific, the center-of-gravity velocity restrictor 76 first carries out the processing by stead-state error calculators 94_x and 94_y.

In this case, the stead-state error calculator 94_x receives the estimated center-of-gravity velocity value in the X-axis direction Vb_x_s and also receives the previous value Vb_x_mdfd_p of the desired center-of-gravity velocity for control in the X-axis direction Vb_x_mdfd through the intermediary of a delay element 96_x. Then, in the stead-state error calculator 94_x, first, the input Vb_x_s is supplied to a proportional-differential compensation component (PD compensation component) 94a_x. The proportional-differential compensation component 94a_x is a compensation component whose transfer function is denoted by 1+Kd·S, and adds the input Vb_x_s and the value obtained by multiplying the differential value thereof (temporal change rate) by a coefficient Kd of a predetermined value, and outputs the value resulting from the addition.

Subsequently, the stead-state error calculator 94_x calculates, by a calculator 94b_x, the value obtained by subtracting the input Vb_x_mdfd_p from the output value of the proportional-differential compensation component 94a_x, then supplies the output value of the calculator 94b_x to a low-pass filter 94c_x having a phase compensation function. The low-pass filter 94c_x is a filter whose transfer function is denoted by (1+T2·S)/(1+T1·S). Then, the stead-state error calculator 94_x outputs the output value Vb_x_prd of the low-pass filter 94c_x.

Further, the stead-state error calculator 94_y receives the estimated center-of-gravity velocity value in the Y-axis direction Vb_y_s and also receives the previous value Vb_y_mdfd_p of the desired center-of-gravity velocity for control in the Y-axis direction Vb_y_mdfd through the intermediary of a delay element 96_y.

Then, as with the stead-state error calculator 94_x described above, the stead-state error calculator 94_y carries out the processing by a proportional-differential compensation component 94a_y, a calculator 94b_y, and a low-pass filter 94c_y in order and outputs an output value Vb_y_prd of the low-pass filter 94c_y.

Here, the output value Vb_x_prd of the stead-state error calculator 94_x has a meaning as a stead-state error of a future estimated center-of-gravity velocity value in the X-axis direction presumed from a current motion state of the vehicle system center-of-gravity point observed from the Y-axis direction (in other words, the motion state of the mass point 60_x of the inverted pendulum model observed from the Y-axis direction) relative to the desired center-of-gravity velocity for control Vb_x_mdfd of an expected convergence value. Similarly, the output value Vb_y_prd of the stead-state error calculator 94_y has a meaning as a stead-state error of a future estimated center-of-gravity velocity value in the Y-axis direction presumed from a current motion state of the vehicle system center-of-gravity point observed from the X-axis direction (in other words, the motion state of the mass point 60_y of the inverted pendulum model observed from the X-axis direction) relative to the desired center-of-gravity velocity for control Vb_y_mdfd of an expected convergence value. Hereinafter, the output values Vb_x_prd and Vb_y_prd of the stead-state error calculators 94_x and 94_y, respectively, will be referred to as the expected center-of-gravity velocity stead-state error values.

After carrying out the processing by the stead-state error calculators 94_x and 94_y as described above, the center-of-gravity velocity restrictor 76 inputs the expected center-of-gravity velocity stead-state error values Vb_x_prd, Vb_y_prd, respectively, to a limiting processor 100. The processing by the limiting processor 100 is the same as the processing by the limiting processor 86 of the gain adjustor 78 described above. In this case, as indicated by the parenthesized reference characters in FIG. 11, only the input values and the output values of the individual processing sections of the limiting processor 100 are different from those of the limiting processor 86.

To be more specific, in the limiting processor 100, rotational angular velocities ωw_x_t and ωw_y_t of the imaginary wheels 62_x and 62_y in the case where it is assumed that the moving velocities Vw_x and Vw_y of the imaginary wheels 62_x and 62_y, respectively, coincide with Vb_x_prd and Vb_y_prd, respectively, are calculated by the processors 86a_x and 86a_y, respectively. Then, the pair of the rotational angular velocities ωw_x_t and ωw_y_t is converted into the pair of the rotational angular velocities ω_R_t and ω_L_t of the electric motors 31R and 31L by the XY-RL converter 86b.

Further, these rotational angular velocities ω_R_t and ω_L_t are limited to values within the permissible range for the right motor and the permissible range for the left motor, respectively, by limiters 86c_R and 86c_L. Then, the values ω_R_lim2 and ω_L_lim2, which have been subjected to the limitation processing, are converted by the RL-XY converter 86d into the rotational angular velocities ωw_x_lim2 and ωw_y_lim2 of the imaginary wheels 62_x and 62_y.

Subsequently, the moving velocities Vw_x_lim2 and Vw_y_lim2 of the imaginary wheels 62_x and 62_y corresponding to the rotational angular velocities ωw_x_lim2 and ωw_y_lim2 are calculated by the processors 86e_x and 86e_y, respectively, and these moving velocities Vw_x_lim2 and Vw_y_lim2 are output from the limiting processor 100.

By carrying out the processing by the limiting processor 100 described above, the limiting processor 100 generates a pair of output values Vw_x_lim2 and Vw_y_lim2 such that the output values Vw_x_lim2 and Vw_y_lim2 agree with Vb_x_t and Vb_y_t, respectively, as much as possible under an essential required condition that the rotational angular velocities of the electric motors 31R and 31L corresponding to the pair of the output values Vw_x_lim2 and Vw_y_lim2, respectively, do not deviate from the permissible ranges, as with the limiting processor 86.

Incidentally, the permissible ranges for the right motor and left motor in the limiting processor 100 do not have to be the same as the permissible ranges in the limiting processor 86, and may be set to be permissible ranges that are different from each other.

Referring back to the description of FIG. 12, the center-of-gravity velocity restrictor 76 then carries out the processing by calculators 102_x and 102_y to calculate the desired center-of-gravity velocities for control Vb_x_mdfd and Vb_y_mdfd, respectively. In this case, the calculator 102_x calculates a value, which is obtained by subtracting the expected center-of-gravity velocity stead-state error value in the X-axis direction Vb_x_prd from the output value Vw_x_lim2 of the limiting processor 100, as the desired center-of-gravity velocity for control in the X-axis direction Vb_x_mdfd. Similarly, the calculator 102_y calculates a value, which is obtained by subtracting the expected center-of-gravity velocity stead-state error value in the Y-axis direction Vb_y_prd from the output value Vw_y_lim2 of the limiting processor 100, as the desired center-of-gravity velocity for control in the Y-axis direction Vb_y_mdfd.

Regarding the desired center-of-gravity velocities for control Vb_x_mdfd and Vb_y_mdfd determined as described above, in the case where the output values Vw_x_lim2 and Vw_y_lim2 are not forcibly restricted by the limiting processor 100, that is, in the case where the rotational angular velocities of the electric motors 31R and 31L fall within the permissible ranges even when the electric motors 31R and 31L are operated such that the moving velocities of the wheel assembly 5 in the X-axis direction and the Y-axis direction, respectively, agree with the expected center-of-gravity velocity stead-state error values Vb_x_prd, Vb_y_prd, respectively, then the desired center-of-gravity velocities for control Vb_x_mdfd, Vb_y_mdfd are set to 0, respectively. Therefore, generally, Vb_x_mdfd=Vb_y_mdfd=0.

Meanwhile, if the output values Vw_x_lim2 and Vw_y_lim2 of the limiting processor 100 are generated by forcibly restricting the input values Vb_x_t and Vb_y_t, that is, if the rotational angular velocity of one of the electric motors 31R and 31L deviates from the permissible range (if the absolute value of one of the rotational angular velocities becomes excessively high) when the electric motors 31R and 31L are operated such that the moving velocities of the wheel assembly 5 in the X-axis direction and the Y-axis direction, respectively, agree with the expected center-of-gravity velocity stead-state error values Vb_x_prd, Vb_y_prd, respectively, then for the X-axis direction, a correction amount from the input value Vb_x_prd of the output value Vw_x_lim2 of the limiting processor 100 (=Vw_x_lim2−Vb_x_prd) is determined as the desired center-of-gravity velocity for control in the X-axis direction Vb_x_mdfd.

Further, regarding the Y-axis direction, a correction amount from the input value Vb_y_prd of the output value Vw_y_lim2 of the limiting processor 100 (=Vw_y_lim2−Vb_y_prd) is determined as the desired center-of-gravity velocity for control in the Y-axis direction Vb_y_mdfd.

In this case, for example, for the velocity in the X-axis direction, the desired center-of-gravity velocity for control Vb_x_mdfd becomes a velocity in the opposite direction from the expected center-of-gravity velocity stead-state error value in the X-axis direction Vb_x_prd output by the stead-state error calculator 94_x. The same applies to the velocity in the Y-axis direction.

The above has described the processing by the center-of-gravity velocity restrictor 76.

Returning to the description of FIG. 9, after carrying out the processing by the center-of-gravity velocity restrictor 76, the gain adjustor 78, and the error calculator 70 as described above, the control unit 50 carries out the processing by the posture control calculator 80.

Figure 13:
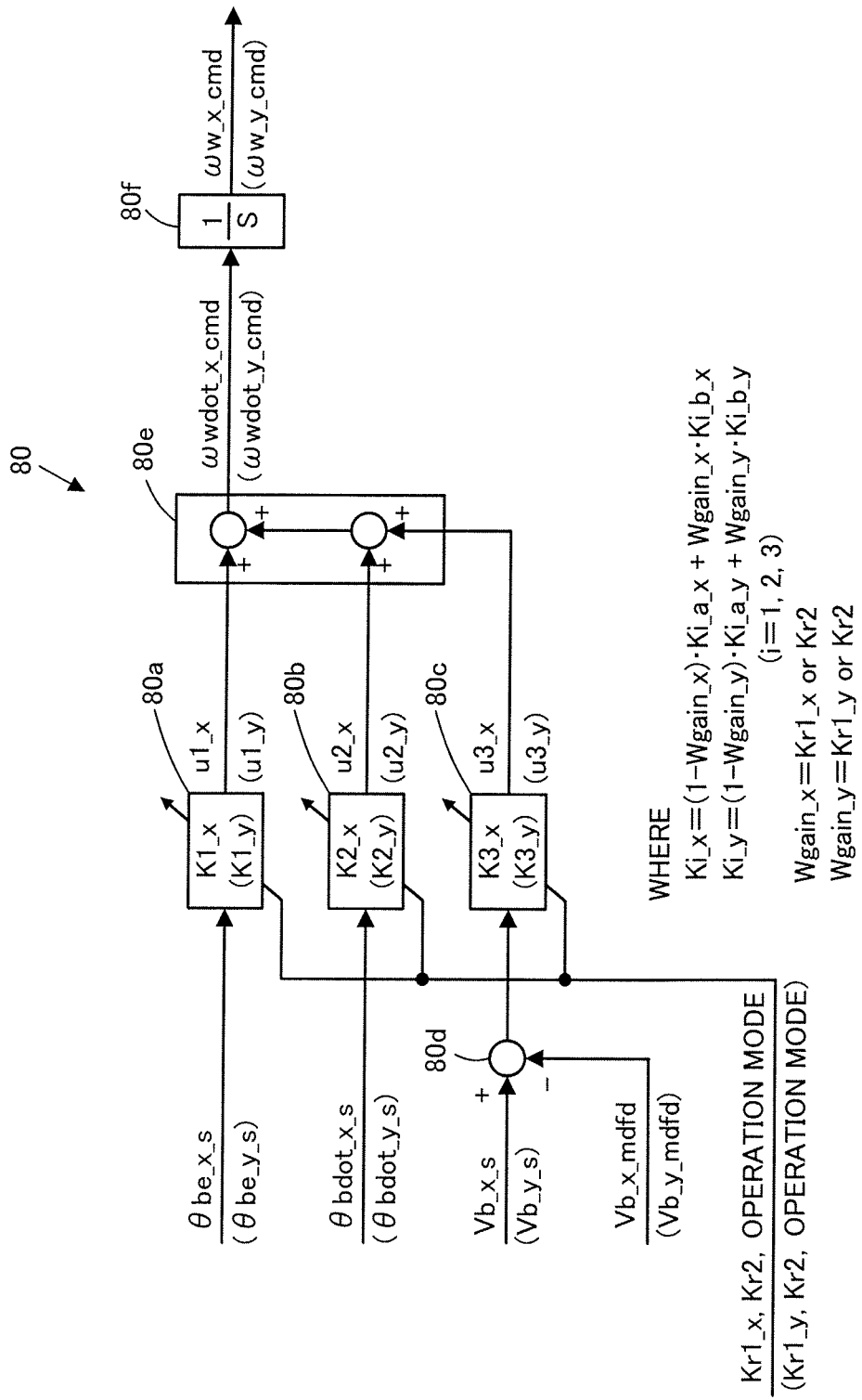
FIG. 13 is a block diagram illustrating a processing function of a posture control calculator 80 shown in FIG. 9.

The processing by the posture control calculator 80 will be described below by referring to FIG. 13. Incidentally, the unparenthesized reference characters in FIG. 13 are the reference characters related to the processing for determining the aforesaid imaginary wheel rotational angular velocity command ωw_x_cmd, which is the desired value of the rotational angular velocity of the imaginary wheel 62_x circumrotating in the X-axis direction. The parenthesized reference characters are the reference characters related to the processing for determining the aforesaid imaginary wheel rotational angular velocity command ωw_y_cmd, which is the desired value of the rotational angular velocity of the imaginary wheel 62_y circumrotating in the Y-axis direction.

The posture control calculator 80 receives the base body tilt angle error measured value θbe_xy_s calculated by the error calculator 70, the base body tilt angular velocity measured values θbdot_xy_s calculated in the aforesaid STEP2, the estimated center-of-gravity velocity values Vb_xy_s calculated by the center-of-gravity velocity calculator 72, the desired center-of-gravity velocities for control Vb_xy_mdfd calculated by the center-of-gravity velocity restrictor 76, the first gain adjustment parameters Kr1_xy calculated by the gain adjustor 78, and the second gain adjustment parameter Kr2 and the operational mode determined as will be explained later in STEP4.

Then, the posture control calculator 80 first calculates the imaginary wheel rotational angular acceleration commands ωwdot_xy_cmd according to the following expressions 07x and 07y by using the above received values.

$$\omega wdot\_x\_cmd = K1\_x \cdot \theta be\_x\_s + K2\_x \cdot \theta bdot\_x\_s + K3\_x \cdot (Vb\_x\_s - Vb\_x\_mdfd) \quad \text{Expression 07x}$$

$$\omega wdot\_y\_cmd = K1\_y \cdot \theta be\_y\_s + K2\_y \cdot \theta bdot\_y\_s + K3\_y \cdot (Vb\_y\_s - Vb\_y\_mdfd) \quad \text{Expression 07y}$$

Hence, according to the present embodiment, each imaginary wheel rotational angular acceleration command ωwdot_x_cmd denoting the manipulated variable (control input) for controlling the motion of the mass point 60_x of the inverted pendulum model observed from the Y-axis direction (i.e., the motion of the vehicle system center-of-gravity point observed from the Y-axis direction), and the imaginary wheel rotational angular acceleration command ωwdot_y_cmd denoting the manipulated variable (control input) for controlling the motion of the mass point 60_y of the inverted pendulum model observed from the X-axis direction (i.e., the motion of the vehicle system center-of-gravity point observed from the X-axis direction) are determined by adding up three manipulated variable components (the three terms of the right side of each of expressions 07x and 07y).

In this case, the gain coefficients K1_x, K2_x, and K3_x related to the manipulated variable components in expression 07x are variably set on the basis of the first gain adjustment parameter Kr1_x, the second gain adjustment parameter Kr2, and the operational mode, while the gain coefficients K1_y, K2_y, and K3_y related to the manipulated variable components in expression 07y are variably set on the basis of the gain adjustment parameter Kr1_y, the second gain adjustment parameter Kr2, and the operational mode. Hereinafter, the gain coefficients K1_x, K2_x, and K3_x in expression 07x may be referred to as the first gain coefficient K1_x, the second gain coefficient K2_x, and the third gain coefficient K3_x, respectively. The same applies to the gain coefficients K1_y, K2_y, and K3_y in expression 07y.

An i-th gain coefficient Ki_x (i=1, 2, or 3) in expression 07x and an i-th gain coefficient Ki_y (i=1, 2, or 3) in expression 07y are determined according to expressions 09x and 09y given below, as indicated in FIG. 13.

$$Ki\_x = (1 - Wgain\_x) \cdot Ki\_a\_x + Wgain\_x \cdot Ki\_b\_x \quad \text{Expression 09x}$$

(i=1, 2 or 3)

$$Ki\_y = (1 - Wgain\_y) \cdot Ki\_a\_y + Wgain\_y \cdot Ki\_b\_y \quad \text{Expression 09y}$$

(i=1, 2 or 3)

In this case, Wgain_x, Ki_a_x, Ki_b_x in expression 09x and Wgain_y, Ki_a_y, Ki_b_y in expression 09y are determined as is indicated by (1) through (4) below, in accordance with the current operational mode (the current operational mode determined in STEP4) of the vehicle 1.

(1) In the case where the current operational mode is the during-boarding mode
   Wgain_x=Kr1_x, Ki_a_x=Gi_x_during-boarding A (i=1, 2 or 3)
   Ki_b_x=Gi_x_during-boarding B (i=1, 2 or 3)
   Wgain_y=Kr1_y, Ki_a_y=Gi_y_during-boarding A (i=1, 2 or 3)
   Ki_b_y=Gi_y_during-boarding B (i=1, 2 or 3)

(2) In the case where the current operational mode is the autonomous mode
   Wgain_x=Kr1_x, Ki_a_x=Gi_x_autonomous A (i=1, 2 or 3)
   Ki_b_x=Gi_x_autonomous B (i=1, 2 or 3)
   Wgain_y=Kr1_y, Ki_a_y=Gi_y_autonomous A (i=1, 2 or 3)
   Ki_b_y=Gi_y_autonomous B (i=1, 2 or 3)

(3) In the case where the current operational mode is the mode for boarding action
   Wgain_x=Kr2, Ki_a_x=Gi_x_during-boarding A (i=1, 2 or 3)
   Ki_b_x=Gi_x_boarding action (i=1, 2 or 3)
   Wgain_y=Kr2, Ki_a_y=Gi_y_during-boarding A (i=1, 2 or 3)
   Ki_b_y=Gi_y_boarding action (i=1, 2 or 3)

(4) In the case where the current operational mode is the mode for dismounting action
   Wgain_x=Kr2, Ki_a_x=Gi_x_during-boarding A (i=1, 2 or 3)
   Ki_b_x=Gi_x_dismounting action (i=1, 2 or 3)
   Wgain_y=Kr2, Ki_a_y=Gi_y_during-boarding A (i=1, 2 or 3)
   Ki_b_y=Gi_y_dismounting action (i=1, 2 or 3)

Here, Gi_x_during-boarding A, Gi_x_during-boarding B, Gi_y_during-boarding A, and Gi_y_during-boarding B are predetermined values (constant values) set beforehand for the boarding mode, Gi_x_autonomous A, Gi_x_autonomous B, Gi_y_autonomous A, and Gi_y_autonomous B are predetermined values (constant values) set beforehand for the autonomous mode, Gi_x_boarding action and Gi_y_boarding action are predetermined values (constant values) set beforehand for the mode for boarding action, and Gi_x_dismounting action and Gi_y_dismounting action are predetermined values (constant values) set beforehand for the mode for dismounting action.

In this case, in the present embodiment, |Gi_x_during-boarding A|<|Gi_x_during-boarding B|, |Gi_y_during-boarding A|<|Gi_y_during-boarding B|, |Gi_x_autonomous A|<|Gi_x_autonomous B|, |Gi_y_autonomous A|<|Gi_y_autonomous B|, |Gi_x_boarding action|<|Gi_x_during-boarding A|, |Gi_y_boarding action|<|Gi_y_during-boarding A|, |Gi_x_dismounting action|<|Gi_x_during-boarding A|, |Gi_y_dismounting action|<|Gi_y_during-boarding A| holds. Further, |Gi_x_autonomous A|<|Gi_x_during-boarding A|, |Gi_y_autonomous A|<|Gi_y_during-boarding A| holds.

Here, in the present embodiment, Gi_x_boarding action=Gi_x_dismounting action, Gi_y_boarding action=Gi_y_dismounting action holds. However, Gi_x_boarding action≠Gi_x_dismounting action, or, Gi_y_boarding actionGi_y_dismounting action may hold.

In the case where the operational mode is the during-boarding mode, each i-th gain coefficient Ki_x (i=1, 2 or 3) used in the calculation of expression 07x is determined as a weighted mean value of the two constant values Gi_x_during-boarding A and Gi_x_during-boarding B corresponding thereto. Further, in this case, the weight (1−Wgain), Wgain applied to Ki_a_x(=Gi_x_during-boarding A), Ki_b_x(=Gi_x_during-boarding B) is changed according to the first gain adjustment parameter Kr1_x. Specifically, in the case where Kr1_x=0, then Ki_x=Gi_x_during-boarding A, and where Kr1_x=1, then Ki_x=Gi_x_during-boarding B. As Kr1_x approaches 1 from 0, the i-th gain coefficient Ki_x approaches Gi_x_during-boarding B from Ki_x=Gi_x_during-boarding A (the absolute value of Ki_x increases). In the during-boarding mode, the same applies to each i-th gain coefficient Ki_y (i=1, 2 or 3) used in the calculation of expression 07y.

Further, in the case where the operational mode is the autonomous mode, each i-th gain coefficient Ki_x (i=1, 2 or 3) used in the calculation of expression 07x is determined as a weighted mean value of the two constant values Gi_x_autonomous A, Gi_x_autonomous B corresponding thereto. Further, in this case, the weight (1−Wgain), Wgain applied to Ki_a_x(=Gi_x_ autonomous A), Ki_b_x(=Gi_x_ autonomous B) is changed according to the first gain adjustment parameter Kr1_x. Specifically, in the case where Kr1_x=0, then Ki_x=Gi_x_autonomous A, and where Kr1_x=1, then Ki_x=Gi_x_autonomous B. As Kr1_x approaches 1 from 0, the i-th gain coefficient Ki_x approaches Gi_x_autonomous B from Ki_x=Gi_x_autonomous A (the absolute value of Ki_x increases). In the autonomous mode, the same applies to each i-th gain coefficient Ki_y (i=1, 2 or 3) used in the calculation of expression 07y.

As explained earlier, the first gain adjustment parameters Kr1_x, Kr1_y are generally (more specifically, in the case where the output values Vw_x_lim1, Vw_y_lim1 at the limiting processor 86 of the gain adjustor 78 are not forcibly restricted), 0. Therefore, the i-th gain coefficients Ki_x, Ki_y (i=1, 2 or 3) in the during-boarding mode and the autonomous mode generally become Ki_x=Ki_a_x(=Gi_x_during-boarding A or Gi_x_autonomous A), Ki_y=Ki_a_y(=Gi_y_during-boarding A or Gi_y_autonomous A), respectively. Therefore, Gi_x_during-boarding A, Gi_y_during-boarding A are constant values set beforehand as the appropriate values of the i-th gain coefficients Ki_x, Ki_y (i=1, 2 or 3) in the general operating state of the vehicle 1 in the during-boarding mode. Similarly, Gi_x_autonomous A, Gi_y_autonomous A are constant values set beforehand as the appropriate values of the i-th gain coefficients Ki_x, Ki_y (i=1, 2 or 3) in the general operating state of the vehicle 1 in the autonomous mode.

On the other hand, in the case where the operational mode is the mode for boarding action, each i-th gain coefficient Ki_x (i=1, 2 or 3) used in the calculation of expression 07x is determined as a weighted mean value of the two constant values Gi_x_during-boarding A and Gi_x_boarding action corresponding thereto. Further, in this case, the weight (1−Wgain), Wgain applied to Ki_a_x(=Gi_x_during-boarding A), Ki_b_x(=Gi_x_boarding action) is changed according to the second gain adjustment parameter Kr2. Specifically, in the case where Kr2=0, then Ki_x=Gi_x_during-boarding A, and where Kr2=1, then Ki_x=Gi_x_boarding action. As Kr2 approaches 1 from 0, the i-th gain coefficient Ki_x approaches Gi_x_during-boarding A from Ki_x=Gi_x_boarding action. Consequently, the absolute value of Ki_x increases. In this case, |Gi_x_boarding action|<|Gi_x_during-boarding A| holds, so that the absolute value of each i-th gain coefficient Ki_x (i=1, 2 or 3) in the mode for boarding action becomes smaller value than that in the during-boarding mode, unless in the case where Kr2=0. In the mode for boarding action, the same applies to each i-th gain coefficient Ki_y (i=1, 2 or 3) used in the calculation of expression 07y.

Further, in the case where the operational mode is the mode for dismounting action, each i-th gain coefficient Ki_x (i=1, 2 or 3) used in the calculation of expression 07x is determined as a weighted mean value of the two constant values Gi_x_during-boarding A, Gi_x_dismounting action B corresponding thereto. Further, in this case, the weight (1−Wgain), Wgain applied to Ki_a_x(=Gi_x_during-boarding A), Ki_b_x(=Gi_x_dismounting action) is changed according to the second gain adjustment parameter Kr2. Specifically, in the case where Kr2=0, then Ki_x=Gi_x_during-boarding A, where Kr2=1, then Ki_x=Gi_x_dismounting action. As Kr2 approaches 0 from 1, the i-th gain coefficient Ki_x approaches Gi_x_during-boarding A from Ki_x=Gi_x_dismounting action. Consequently, the absolute value of Ki_x increases. In this case, |Gi_x_dismounting action|<|Gi_x_during-boarding A| holds, so that the absolute value of each i-th gain coefficient Ki_x (i=1, 2 or 3) in the mode for boarding action becomes smaller value than that in the during-boarding mode, unless in the case where Kr2=0. In the mode for dismounting action, the same applies to each i-th gain coefficient Ki_y (i=1, 2 or 3) used in the calculation of expression 07y.

The posture control calculator 80 uses the first to the third gain coefficients K1_x, K2_x, and K3_x determined as described above to perform the calculation of the above expression 07x, thereby calculating the imaginary wheel rotational angular acceleration command ωwdot_x_cmd related to the imaginary wheel 62_x circumrotating in the X-axis direction.

More detailedly, referring to FIG. 13, the posture control calculator 80 calculates a manipulated variable component u1_x obtained by multiplying the base body tilt angle error measured value θbe_x_s by the first gain coefficient K1_x and a manipulated variable component u2_x obtained by multiplying the base body tilt angular velocity measured value θbdot_x_s by the second gain coefficient K2_x by processors 80a and 80b, respectively. Further, the posture control calculator 80 calculates the difference between the estimated center-of-gravity velocity value Vb_x_s and the desired center-of-gravity velocity for control Vb_x_mdfd (=Vb_x_s−Vb_x_mdfd) by a calculator 80d, and calculates, by a processor 80c, a manipulated variable component u3_x obtained by multiplying the calculated difference by the third gain coefficient K3_x. Then, the posture control calculator 80 adds up these manipulated variable components u1_x, u2_x, and u3_x by a calculator 80e so as to calculate the imaginary wheel rotational angular acceleration command ωwdot_x_cmd.

Similarly, the posture control calculator 80 carries out the calculation of the above expression 07y by using the first to the third gain coefficients K1_y, K2_y, and K3_y determined as described above, thereby calculating the imaginary wheel rotational angular acceleration command ωwdot_y_cmd related to the imaginary wheel 62_y circumrotating in the Y-axis direction.

In this case, the posture control calculator 80 calculates a manipulated variable component u1_y obtained by multiplying the base body tilt angle error measured value θbe_y_s by the first gain coefficient K1_y and a manipulated variable component u2_y obtained by multiplying the base body tilt angular velocity measured value θbdot_y_s by the second gain coefficient K2_y by the processors 80a and 80b, respectively. Further, the posture control calculator 80 calculates the difference between the estimated center-of-gravity velocity value Vb_y_s and the desired center-of-gravity velocity for control Vb_y_mdfd (=Vb_y_s−Vb_y_mdfd) by the calculator 80d, and calculates, by the processor 80c, a manipulated variable component u3_y obtained by multiplying the calculated difference by the third gain coefficient K3_y. Then, the posture control calculator 80 adds up these manipulated variable components u1_y, u2_y, and u3_y by the calculator 80e so as to calculate the imaginary wheel rotational angular acceleration command ωwdot_x_cmd.

Here, the first term (=the first manipulated variable component u1_x) and the second term (=the second manipulated variable component u2_x) of the right side of expression 07x mean the feedback manipulated variable components for converging the base body tilt angle error measured value θbe_x_s in the direction about the X-axis to 0 (converging the base body tilt angle measured value θb_x_s to the desired value θb_x_obj) by the PD law (proportional-differential law) serving as the feedback control law.

Further, the third term (=the third manipulated variable component u3_x) of the right side of expression 07x means a feedback manipulated variable component for converging the difference between the estimated center-of-gravity velocity value Vb_x_s and the desired center-of-gravity velocity for control Vb_x_mdfd to 0 (converging Vb_x_s to Vb_x_mdfd) by a proportional law serving as the feedback control law.

The same applies to the first to the third terms (the first to the third manipulated variable components u1_y, u2_y, and u3_y) of the right side of expression 07y.

As is explained earlier, the desired center-of-gravity velocities for control Vb_x_mdfd, Vb_y_mdfd are generally (more specifically, in the case where the output values Vw_x_lim2, Vw_y_lim2 at the limiting processor 100 of the center-of-gravity velocity restrictor 76 are not forcibly restricted), 0. Further, in the gereral case where Vb_x_mdfd=Vb_y_mdfd=0, the third manipulated variable components u3_x, u3_y coincide with the value obtained by multiplying the estimated center-of-gravity velocity values Vb_x_s, Vb_y_s with the third gain coefficients K3_x, K3_y, respectively.

After calculating the imaginary wheel rotational angular acceleration commands ωwdot_x_cmd and ωwdot_y_cmd as described above, the posture control calculator 80 integrates each of the ωwdot_x_cmd and ωwdot_y_cmd by an integrator 80f thereby to determine the aforesaid imaginary wheel rotational velocity commands ωw_x_cmd and ωw_y_cmd.

The above has described the details of the processing by the posture control calculator 80.

Supplementally, the imaginary wheel rotational angular acceleration command ωwdot_x_cmd may alternatively be calculated by an expression wherein the third term of the right side of expression 07x is separated into the manipulated variable component based on Vb_x_s (=K3_x·Vb_x_s) and the manipulated variable component based on Vb_x_mdfd (=−K3_x·Vb_x_mdfd). Similarly, the imaginary wheel rotational angular acceleration command ωwdot_y_cmd may alternatively be calculated by an expression wherein the third term of the right side of expression 07y is separated into the manipulated variable component based on Vb_y_s (=K3_y·Vb_y_s) and the manipulated variable component based on Vb_y_mdfd (=−K3_y·Vb_y_mdfd).

Further, in the present embodiment, the rotational angular acceleration commands ωw_x_cmd and ωw_y_cmd of the imaginary wheels 62_x and 62_y have been used as the manipulated variables (control inputs) for controlling the behaviors of the vehicle system center-of-gravity point. However, for example, the drive torques of the imaginary wheels 62_x and 62_y or the translational forces obtained by dividing the driving torques by the radii Rw_x and Rw_y of each imaginary wheels 62_x and 62_y (i.e., the frictional forces between the imaginary wheels 62_x, 62_y and a floor surface) may be used as the manipulated variables.

Returning to the description of FIG. 9, the control unit 50 then supplies the imaginary wheel rotational velocity commands ωw_x_cmd and ωw_y_cmd determined as described above by the posture control calculator 80 to the motor command calculator 82, and carries out the processing by the motor command calculator 82 so as to determine a velocity command ω_R_cmd of the electric motor 31R and a velocity command ω_L_cmd of the electric motor 31L. The processing by the motor command calculator 82 is the same as the processing by the XY-RL converter 86b of the aforesaid limiting processor 86 (refer to FIG. 11).

To be more specific, the motor command calculator 82 determines the velocity commands ω_R_cmd and ω_L_cmd of the electric motors 31R and 31L by a simultaneous equation obtained by replacing ωw_x, ωw_y, ω_R and ω_L of the aforesaid expressions 01a and 01b by ωw_x_cmd, ωw_y_cmd, ω_R_cmd and ω_L_cmd, respectively, taking the ω_R_cmd and ω_L_cmd as unknowns.

Thus, the vehicle control arithmetic processing in the aforesaid STEP9 is completed.

Next, the processing of STEP4 (the determination processing of the control characteristics parameter), the explanation thereof has been postponed, will be explained in detail with reference to FIG. 14 through FIG. 19.

Figure 14:
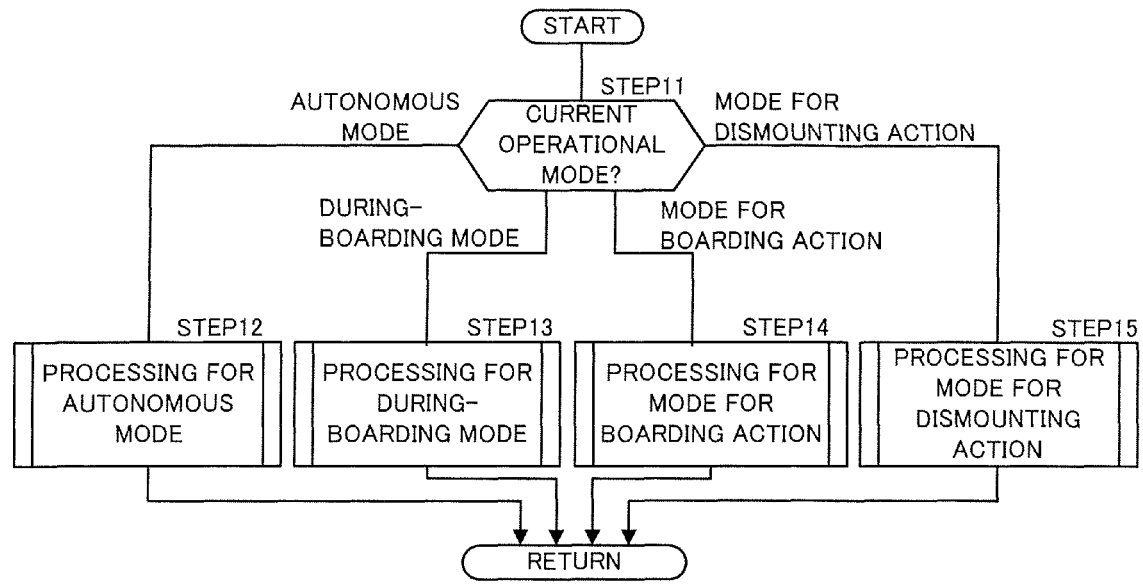
FIG. 14 is a flowchart illustrating the subroutine processing in STEP4 of FIG. 7.

The processing of STEP4 is carried out as is shown by the flowchart in FIG. 14.

Specifically, first, the control unit 50 determines in STEP11 which operational mode the current operational mode (in the current control processing cycle) is.

Here, in the present embodiment, at the time of starting-up the control unit 50, the control unit 50 sets the autonomous mode as the initial operational mode of the vehicle 1. Thereafter, in each control processing cycle, the control unit 50 determines the operational mode for the next control processing cycle. Therefore, the operational mode determined in STEP11 is basically the operational mode determined in the previous control processing cycle.

In STEP11, in the case where the current operational mode is the autonomous mode, the during-boarding mode, the mode for boarding action, and the mode for dismounting action, the control unit 50 respectively carries out the processing of STEP12, 13, 14, and 15, and determines the next operational mode and the current values of the control characteristics parameter. By doing so, the processing in FIG. 14 is terminated.

Figure 15:
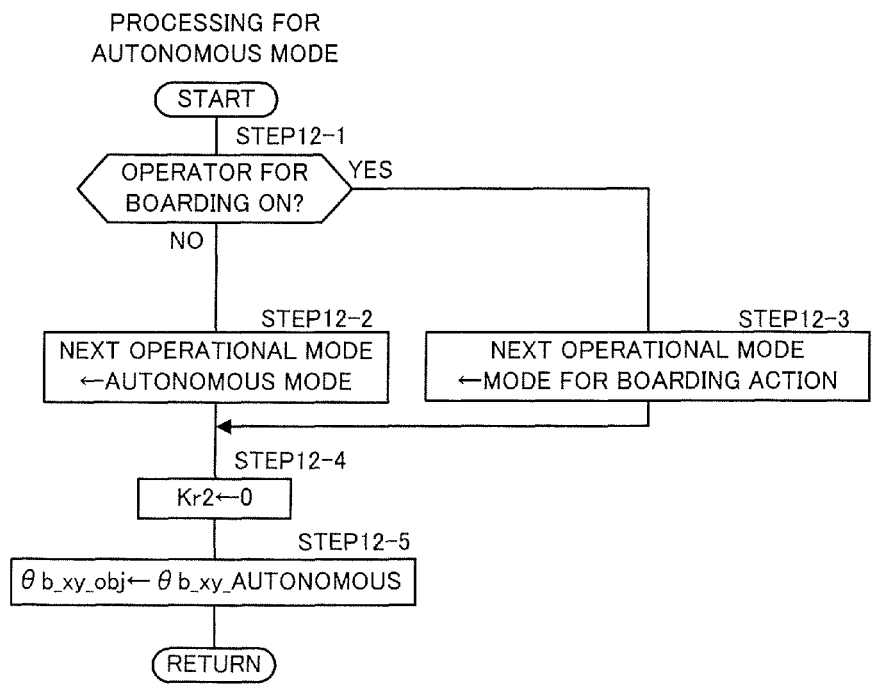
FIG. 15 is a flowchart illustrating the subroutine processing in STEP12 of FIG. 14.

The processing of STEP12 corresponding to the case where the current operational mode is the autonomous mode is carried out by the subroutine processing shown by the flowchart in FIG. 15.

In this processing, the control unit 50 first determines in STEP12-1 whether or not an ON operation (pushing operation) of the operator for boarding 58a of the boarding/dismounting operator 58 is performed, on the basis of the output of the operator 58 obtained in aforesaid STEP3.

In the case where the determination result is negative, the control unit 50 proceeds to STEP12-2 and holds the next operational mode to the current operational mode (=autonomous mode). Further, in the case where the determination result in STEP12-1 is affirmative (in the case where the occupant intends to board the vehicle 1 and performs ON operation of the operator for boarding 58a), the control unit 50 changes the next operational mode to the mode for boarding action.

Subsequently, the control unit 50 sets the value of the second gain adjustment parameter Kr2 to 0 (initializes) in STEP12-4. Further, the control unit sets the set value for autonomous mode θb_x_autonomous as the desired base body tilt angle values θb_x_obj, θb_y_obj in STEP12-5. By doing so, the processing in FIG. 15 is terminated.

With the processing explained above, in the case where the current operational mode determined in STEP11 is set to the autonomous mode, the set value for the autonomous mode θb_x_autonomous is set as the desired base body tilt angle value θb_x_obj, θb_y_obj. Thereafter, in the case where the operator for boarding 58a of the boarding/dismounting operator 58 is performed with ON operation, the operational mode in the next control processing cycle is changed to the mode for boarding action.

Figure 16:
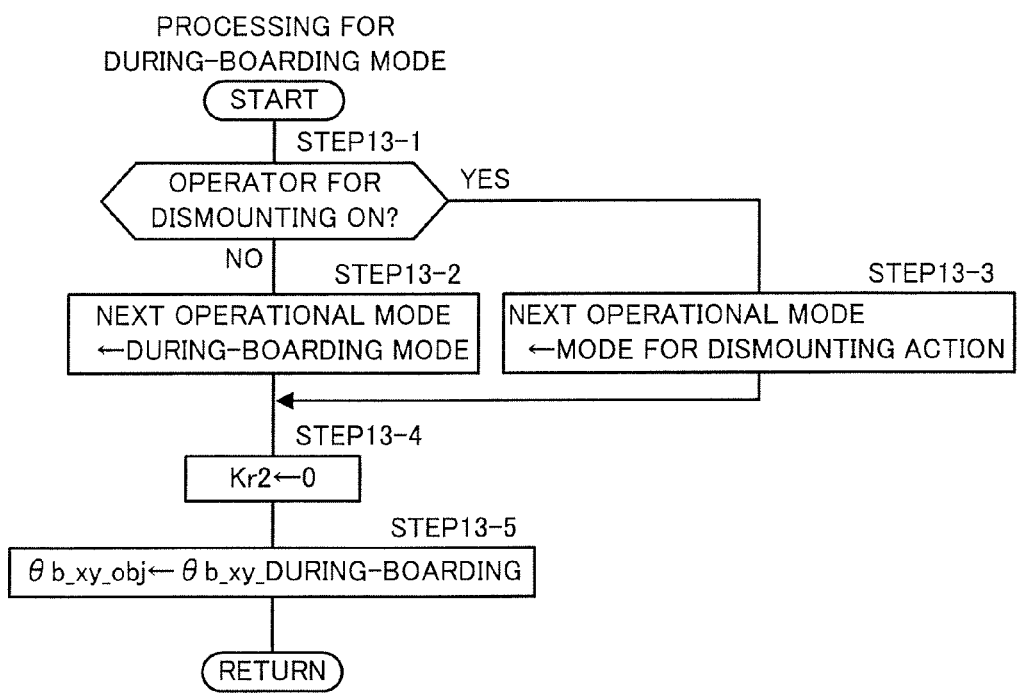
FIG. 16 is a flowchart illustrating the subroutine processing in STEP13 of FIG. 14.

Next, the processing of STEP13 corresponding to the case where the current operational mode is the during-boarding mode is carried out by the subroutine processing shown by the flowchart in FIG. 16.

In the processing, the control unit 50 first determines in STEP13-1 whether or not the operator for dismounting 58b of the boarding/dismounting operator 58 is performed with ON operation (pushing operation), on the basis of the output of the operator 58 obtained in aforesaid STEP3.

In the case where the determination result is negative, the control unit 50 proceeds to STEP13-2 and holds the next operational mode to the current operational mode (=autonomous mode). Further, in the case where the determination result in STEP13-1 is affirmative (in the case where the occupant intends to dismount from vehicle 1 and performs ON operation of the operator for dismounting 58b), the control unit 50 changes the next operational mode to the mode for dismounting action.

Subsequently, the control unit 50 sets the value of the second gain adjustment parameter Kr2 to 0 (initializes) in STEP13-4. Further, the control unit 50 sets the set value for during-boarding mode θb_x_during-boarding as the desired base body tilt angle values θb_x_obj, θb_y_obj in STEP13-5. By doing so, the processing in FIG. 16 is terminated.

With the processing explained above, in the case where the current operational mode determined in STEP11 is set to the during-boarding mode, the set value for the during-operation mode θb_x_during-operation is set as the desired base body tilt angle value θb_x_obj, θb_y_obj. Thereafter, in the case where the operator for dismounting 58b of the boarding/dismounting operator 58 is performed with ON operation, the operational mode in the next control processing cycle is changed to the mode for dismounting action.

Figure 17:
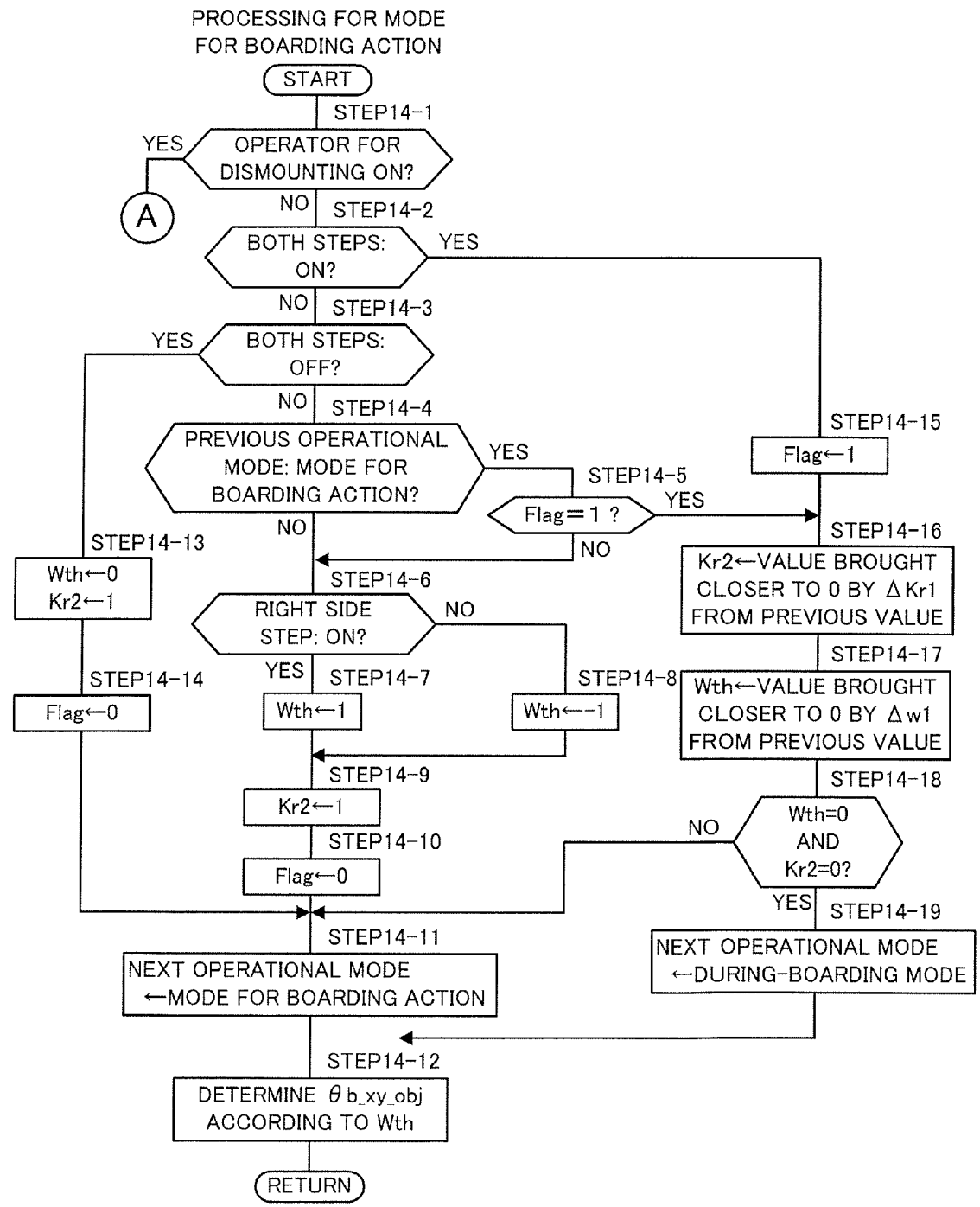
FIG. 17 is a flowchart illustrating the subroutine processing in STEP14 of FIG. 14.
Figure 18:
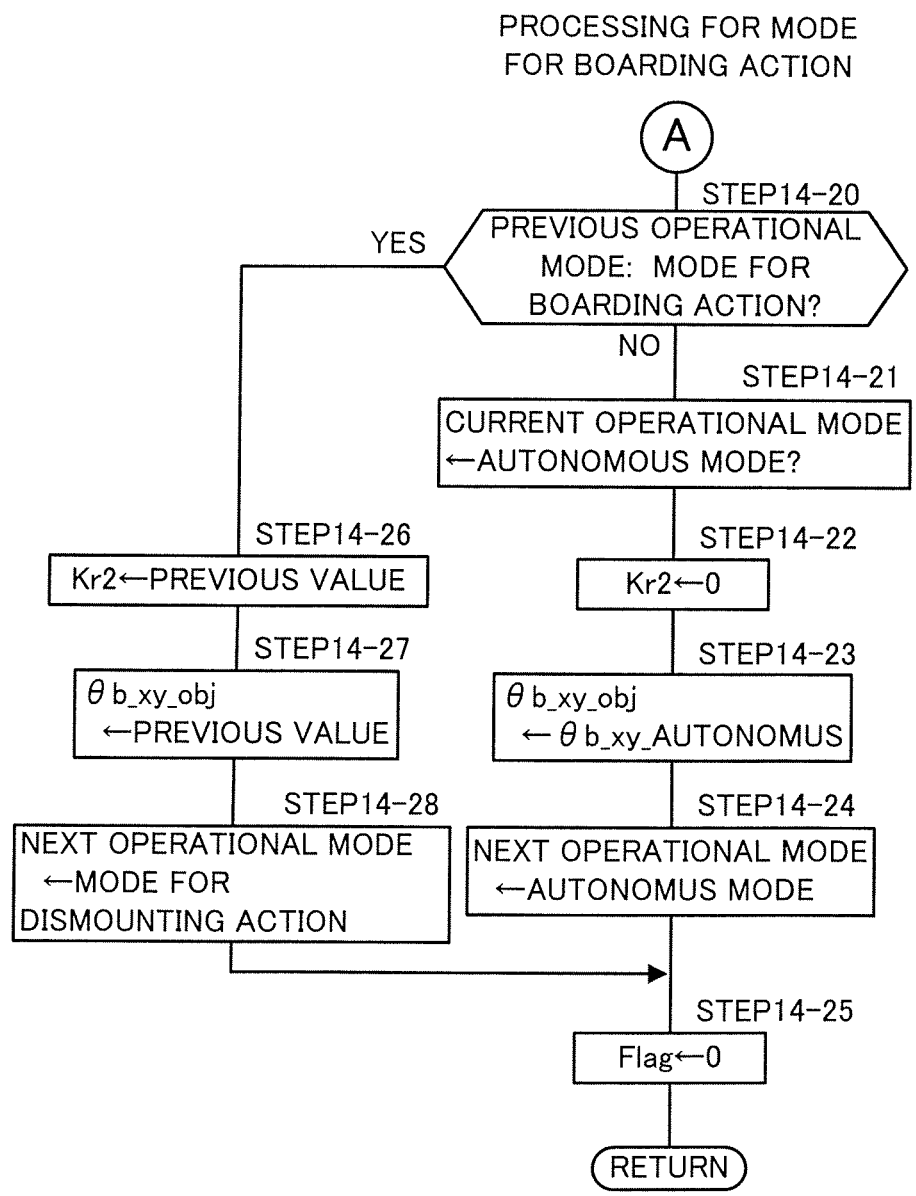
FIG. 18 is a flowchart illustrating the subroutine processing in STEP14 of FIG. 14.

Next, the processing of STEP14 corresponding to the case where the current operational mode is the mode for boarding action is carried out by the subroutine processing shown by the flowchart in FIG. 17 and FIG. 18.

In the processing, the control unit 50 first determines in STEP13-1 whether or not the operator for dismounting 58b of the boarding/dismounting operator 58 is performed with ON operation (pushing operation), on the basis of the output of the operator 58 obtained in aforesaid STEP3. Thereafter, in the case where the determination result is affirmative, the control unit 50 carries out the processing of FIG. 18.

Specifically, the control unit 50 determines in STEP14-20 whether or not the previous operational mode is the mode for boarding action.

The case where the determination result become negative is the state such as where the previous operational mode is the autonomous mode, and the occupant mistakenly performed the operator for boarding 58a of the boarding/dismounting operator 58 during the autonomous mode. In this case, the control unit 50 forcibly changes the current operational mode from the mode for boarding action to the autonomous mode in STEP14-21.

Thereafter, the control unit 50 carries out in STEP14-22, 14-23, and 14-24 to respectively set the value of the second gain adjustment parameter Kr2 to 0, sets the set value for autonomous mode θb_xy_autonomous as the desired base body tilt angle values θb_xy_obj, and set the next operational mode to the autonomous mode.

Further, the case where the determination result in STEP14-20 becomes affirmative is the state where the occupant cancels the boarding action during the mode for boarding action and intends to dismount from vehicle. In this case, the control unit 50 carries out in STEP14-26, 14-27, 14-28 to hold the value of the second gain adjustment parameter Kr2 to the previous value, to hold a desired base body tilt angle basic values θb_xy_obj to the previous value, and sets the mode for dismounting action as the next operational mode. Here, in this case, the current operational mode is held to the mode for boarding action.

After carrying out the processing in STEP14-24 or STEP14-28 as is explained above, the control unit 50 subsequently sets a value of a flag Flag, to be explained later, to 0 in STEP14-25. By doing so, the processing in FIG. 17 and FIG. 18 is terminated.

Returning to the explanation of FIG. 17, in the case where the determination result in STEP14-1 is negative, the control unit 50 subsequently determines in STEP14-2 whether or not the both right and left steps 3R, 3L are in an ON state, on the basis of the output of the load sensors 54R, 54L acquired in STEP3.

Here, the fact that the right side step 3R is in an ON state, in the present embodiment, means that a load detected value indicated by the output of the load sensor 54R of the step 3R exceeds a predetermined value, and this state is, stated otherwise, the state where the foot of the occupant is mounted on the step 3R. And, the fact that the step 3R is in an OFF state means the state where substantially no foot is mounted on the step 3R (no body weight of the occupant is exerted to the step 3R). The same applies to the ON state and OFF state of the left step 3L.

The case where the determination result in STEP14-2 is negative is the sate where the occupant is going to start the actual boarding action in the mode for boarding action but the state where none of the foot of the occupant is mounted on either of the steps 3R, 3L yet, or is in the state during actual boarding action and the occupant is placing either one foot on the step 3R or 3L.

In this case, the control unit 50 determines in STEP14-3 whether or not the both steps 3R, 3L are in the OFF state, that is, whether it is in the state where none of the foot of the occupant is mounted on either of the steps 3R, 3L.

Thereafter, in the case where the determination result is affirmative, the control unit 50 sets the value of a weight coefficient Wth for adjusting the desired base body tilt angle value θb_xy_obj to 0 in STEP 14-13, and sets the value of the second gain adjustment parameter Kr2 to 1. Further, the control unit 50 sets the value of flag Flag, which will be explained later, to 0 in STEP14-14. In the present embodiment, the weight coefficient Wth is a value determined arbitrarily within the range of from −1 to 1, in the mode for boarding action or the mode for dismounting action.

Subsequently, in STEP14-11, the control unit 50 holds the current operational mode (=the mode for boarding action) in the next operational mode. Further, in STEP14-12, the control unit 50 determines the desired base body tilt angle value θb_xy_obj in accordance with the weight coefficient Wth, and terminates the processing in FIG. 17. The details of the processing of STEP14-12 will be explained later.

The case where the determination result in aforesaid STEP14-3 is negative, is the state where the occupant is mounting one foot on either one of the steps 3R, 3L, at the starting time of the boarding action or immediately thereafter. In this case, the control unit 50 determines whether or not the previous operational mode is the mode for boarding action in STEP14-4.

The case where the determination result becomes negative is the case where the aforesaid operational mode is the autonomous mode, and is the state where the occupant first places one foot on either one of the steps 3R, 3L immediately after transiting from the autonomous mode to the mode for boarding action. In this case, the control unit 50 subsequently determines in STEP14-6 whether or not the right step 3R is in the ON state, that is, whether or not the foot (right foot) of the occupant is mounted on only the right step 3R out of the steps 3R, 3L. Then, in the case where the determination result is affirmative, the control unit 50 sets the value of the weight coefficient Wth to 1 in STEP14-7. Further, in the case where the determination result in STEP14-6 is negative (in the case where the foot (left foot) of the occupant is mounted on only the left step 3L), the control unit 50 sets the value of the weight coefficient Wth to −1 in STEP14-7.

Supplementarily, in the vehicle 1 of the present embodiment, the occupant, during the boarding action, basically first mounts one foot on either one of 3R or 3L of the steps 3R, 3L, and in this state lifts the other foot rapidly from the floor and mounts the same onto the other one of steps 3L or 3R. At this time, for example, the base body 9 is tilted to the right side of the occupant, in the state where the right foot of the occupant is mounted on the step 3R, the base body 9 is tilted further to the right by the load the step 3R receives from the occupant at the instance the left foot is lifted from the floor, so that smooth boarding is made difficult. Therefore, in the case where the occupant board the vehicle 1 from the state where the right foot of the occupant is mounted on the step 3R, the occupant basically first tilts the base body 9 to some extent to the left side while placing the right foot on the step 3R. Thereafter, the occupant lifts the left foot from the floor and mounts the left foot on the step 3L in this state. Such boarding action is the same in the case where the occupant boards the vehicle 1 from the state where the left foot of the occupant is mounted on the step 3L.

Here, during the dismounting action, from the same reasons as stated above, it is preferable for the occupant to tilt the base body 9 to the same side as the leg to be dismounted, when dismounting the leg from the step 3L or 3R while the occupant is placing the one of the foot on step 3R or 3L.

As such, in the present embodiment, the control unit 50 sets, as the desired base body tilt angle value θb_y_obj in the direction about the X-axis during boarding action or during dismounting action, an angle value in a posture of the base body 9 tilted to either one side of the right side and the left side of the occupant than the posture corresponding to the desired base body tilt angle value θb_y_obj (=θb_y_during-boarding) of the during-boarding mode. Thereafter, in the present embodiment, the polarity of the weight coefficient Wth in the case where the base body 9 is tilted to the left side is set to the positive polarity, and the weight coefficient Wth in the case where the base body 9 is tilted to the right side is set to the negative polarity.

Therefore, in the case where the determination result in STEP14-6 is affirmative (in the case where the foot of the occupant (right foot) is mounted only on the right step 3R), the weight coefficient Wth is determined to a value of the positive polarity in STEP14-7 in order to tilt the base body 9 to the left side. Further, in the case where the determination result in STEP14-6 is negative (in the case where the foot of the occupant (left foot) is mounted only on the left step 3L), the weight coefficient Wth is determined to a value of the negative polarity in STEP14-8 in order to tilt the base body 9 to the right side.

Supplementarily, in the vehicle 1 of the structure of the present embodiment, by tilting the base body 9 to the left side from the posture of the base body 9 in which the parallel direction of the steps 3R, 3L becomes the horizontal direction, the horizontal distance (distance in the X-axis direction) of the right side step 3R (more specifically, the contact position of the step 3R and the right foot) and the ground contact position of the wheel assembly 5 (tilt center of the foot mount unit 3 and the base body 9 about the X-axis) becomes smaller than the horizontal distance in the state where the parallel direction of the steps 3R, 3L becomes the horizontal direction. Further, by tilting the base body 9 to the right side from the posture of the base body 9 in which the parallel direction of the steps 3R, 3L becomes the horizontal direction, the horizontal distance between the left side step 3L (more specifically, the contact position of the step 3L and the left foot) and the ground contact position of the wheel assembly 5 (tilt center of the foot mounting portion 3 and the base body 9 about the X-axis) becomes smaller than the horizontal distance in the state where the parallel direction of the steps 3R, 3L becomes the horizontal direction.

After determining the weight coefficient Wth in STEP14-7 or 14-8 as is explained above, the control unit 50 sets the value of the second gain adjustment parameter Kr2 to 1 in STEP14-9. Further, after setting the value of the flag Flag to 0 in STEP14-10, the control unit 50 carries out the processing in aforesaid STEP14-11, 14-12, and terminates the processing in FIG. 7.

The case where the determination result in aforesaid STEP14-4 is affirmative, is the case where, after starting of the mode for boarding action, and in each control processing cycle before the current control processing cycle, the determination results in STEP14-1, 14-2, 13-3 became negative, negative, affirmative, or is the case where, after starting of the mode for boarding action, and in either one or more control processing cycles before the current control processing cycle, the determination result in STEP14-2 once becomes affirmative and the processing in STEP14-16, 14-17 to be explained later has already been carried out.

In this case, the control unit 50 determines in STEP14-5 whether or not the value of the flag Flag is 1. The flag Flag is a flag indicating whether or not the processing of STEP14-16, 14-17 has already been carried out, by a value 1 and 0, respectively. Thereafter, in STEP14-5, in the case where Flag=0 (this is a state in the case where the determination result in STEP14-2 has not yet been affirmative after starting of the mode for boarding action, and the state where the occupant is mounting one foot on the step 3R or 3L), the control unit 50 carries out the above-mentioned processing from STEP14-6, and terminates the processing in FIG. 17.

Further, in the case where Flag=1 in STEP14-5, the control unit 50 carries out the processing from STEP14-16 to be explained later.

In the boarding action, the occupant ultimately places both feet on the steps 3R, 3L. At this time, the determination result in STEP14-2 becomes affirmative.

In this case, the control unit 50 carries out the processing from STEP14-15. That is, in STEP14-15, the control unit 50 sets the value of the flag Flag to 1. Subsequently, the control unit 50 carries out the processing in STEP14-16, 14-17, and changes the current value of the second gain adjustment parameter Kr2 and the current value of the weight coefficient Wth from the previous values.

Specifically, in STEP14-16, the control unit 50 determines the current value of Kr2 to a value which is brought closer to 0 than the previous value by a predetermined value Δkr1 (0<Δkr1<1) which is set beforehand (=previous value of Kr2−Δkr1) In this case, in the case where the previous value of Kr2−ΔΔkr1<0 holds, then the current value of Kr2 is set to 0.

Further, in STEP14-17, the control unit 50 sets the current value of Wth to a value which is brought closer to 0 than the previous value by a predetermined valueΔw1 (0<Δw1<1) which is set beforehand. More specifically, in the case where the pervious value of Wth≧0, then the current value of Wth is determined to a value obtained by subtracting Δw1 from the previous value of Wth (however, in the case where the previous value of Wth −Δw1<0, then 0) Further, in the case where the previous value of Wth<0, then the current value of Wth is determined to a value obtained by adding Δw1 to the previous value of Wth (however, in the case where the previous value of Wth+Aw1<0, then 0).

Here, Δkr1, Δw1 has a meaning of values defining a rate of change of Kr2, Wth (change amount per one control processing cycle), respectively. These Δkr1, Δw1 does not have to be the same value, and may be set to a mutually different value (for example, so that ΔKr1<Δw1 holds).

Supplementarily, even after the occupant mounts both feet on the steps 3R, 3L, there may be cases where one foot of the occupant temporarily leaves the step 3R or 3L, for reasons such as keeping balance of the posture of the base body 9. In such cases, the determination result in aforesaid STEP14-5 becomes affirmative, and the processing in aforesaid STEP14-16, 14-17 is carried out.

After carrying out the processing in STEP14-16, 14-17 as is explained above, the control unit 50 subsequently determines whether or not the current value of Wth and the current value of Kr2, that are determine as is explained above, are both 0 in STEP14-18. Then, in the case where the determination result is negative, the control unit 50 carries out the process from STEP14-11 and terminates the process of FIG. 17. Further, in the case where the determination result in STEP14-18 is affirmative, then the control unit 50 changes the next operational mode from the mode for boarding action to the during-boarding mode in STEP14-19. Thereafter, the control unit 50 determines, in STEP14-12, the desired base body tilt angle values θb_xy_obj.

In the present embodiment, the desired base body tilt angle values θb_xy_obj are determined in STEP14-12 by following expressions 11x, 11y.

$$\theta b\_x\_obj = (1-|Wth|)\cdot\theta b\_x\_during\text{-}boarding + |Wth|\cdot\theta b\_x\_board\text{-}dismount \quad \text{expression 11x}$$

$$\theta b\_y\_obj = (1-|wth|)\cdot\theta b\_y\_during\text{-}boarding + |Wth|\cdot(sgn(wth)\cdot\theta b\_y\_board\text{-}dismount) \quad \text{expression 11y}$$

Here, sgn(Wth) is a signum function of Wth, and in the case where Wth>0, then sgn(Wth)=+1, in the case where Wth<0, then sgn(Wth)=−1, and in the case where Wth=0, then sgn (Wth)=0 holds. Therefore, with respect to the second term on the right side of expression 11y, |Wth|·(sgn(Wth)·θb_y_board-dismount)=Wth·θb_y_board-dismount.

Here, θb_x_board-dismount in expression 11x and sgn (Wth)·θb_y_board-dismount in expression 11y are tilt angles of a predetermined value set beforehand as the tilt angle of the base body 9 suitable for the boarding action and the dismounting action. In this case, in the present embodiment, θb_x_board-dismount in the direction about the Y-axis direction is set to the same value in the case where the polarity of Wth is the positive polarity and the negative polarity.

On the other hand, θb_y_board-dismount in the direction about the X-axis is set as the tilt angle of the base body 9 in the direction about the X-axis suitable for the boarding action and the dismounting action, in the case where the polarity of Wth is the positive polarity (in the case where sgn(Wth)=+1). In this case, θb_y_board-dismount is a tilt angle in which the base body 9 tilts to the left side, and θb_y_board-dismount≠θb_y_during-boarding. And, in the present embodiment, the angle in which the sign of θb_y_board-dismount is reversed (=−θb_y_board-dismount), that is, the tilt angle in which the base body 9 tilts to the right side by the same magnitude as θb_y_board-dismount, is set as the tilt angle of the base body 9 in the direction about the X-axis suitable for the boarding action and the dismounting action, in the case where the polarity of Wth is the negative polarity (in the case where sgn(Wth)=−1).

Therefore, in STEP14-12, the desired base body tilt angle value θb_x_obj in the direction about the Y-axis is determined as a weighted mean value of θb_x_during-boarding and θb_x_board-dismount, using (1−|Wth|), |Wth| as the weight. In this case, in the case where Wth=+1 or −1, then θb_x_obj=θb_x_board-dismount holds, and in the case where Wth=0, then θb_x_obj=ηb_x_during-boarding holds. Thereafter, as |Wth| approaches 0 from 1, θb_x_obj approaches θb_x_during-boarding from θb_x_board-dismount.

Here, θb_x_board-dismount may coincide with, for example, θb_x_during-boarding. In this case, θb_x_obj determined by expression 11x always coincide with θb_x_during-boarding, without depending on the value of Wth.

Also, the desired base body tilt angle value θb_y_obj in the direction about the X-axis in the mode for boarding action is determined to a weighted mean value of θb_x_during-boarding and (sgn(Wth)·θb_y_board-dismount). In this case, in the case where Wth=+1 or −1, then θb_y_obj=±θb_y_board-dismount or −θb_y_board-dismount holds, and in the case where Wth=0, then θb_y_obj=θb_y_during-boarding holds. Thereafter, as |Wth| approaches 0 from 1, θb_y_obj approaches θb_y_during-boarding from θb_y_board-dismount.

Supplementarily, in the present embodiment, θb_y_board-dismount is set so that, in the state where the actual base body tilt angle θb_y coincides with +θb_y_board-dismount the position of the right side step 3R viewed in the X-axis direction is positioned immediately above (positioned upward in the vertical direction) of the ground contact portion of the wheel assembly 5 (the tilt center of the foot mount unit 3 and the base body 9 about the X-axis), or to a position close thereto, and at the same time, in the state where the actual base body tilt angle θb_y coincides with −θb_y_board-dismount the position of the left step 3L viewed in the X-axis direction is positioned immediately above of the ground contact portion of the wheel assembly 5 or to a position close therto.

The above is the details of the processing in STEP14 in the mode for boarding action.

In the case where the current operational mode determined in STEP11 as is explained above is set to the mode for boarding action, basically, the second gain adjustment parameter Kr2 and the desired base body tilt angle values θb_xy_obj are determined as is explained below.

That is, when the occupant places one foot on the step 3R or 3L in order to start the boarding action, the second gain adjustment parameter Kr2 is set to 1. In this state, the i-th gain coefficients Ki_x, Ki_y (i=1, 2 or 3) determined by aforesaid expressions 09x, 09y, respectively, become Ki_b_x(=Gi_x_boarding action), Ki_b_y(=Gi_y_boarding action), respectively. Therefore, the absolute value of each of Ki_x, Ki_y becomes a value smaller than that in the during-boarding mode.

Further, in this state, the weight coefficient Wth is set to 1 or −1. Therefore, the component about the Y-axis θb_x_obj out of the desired base body tilt angle values θb_xy_obj that are determined by aforesaid expressions 11x, 11y, is set to θb_x_board-dismount, and as well as the component about the X-axis θb_y_obj is set to +θb_y_board-dismount or −θb_y_board-dismount, that are angles of the base body 9 tilting to the left or the right. More specifically, in the case where the right foot of the occupant is mounted on the step 3R, the leftward tilting +θb_y_board-dismount is set as θb_y_obj, and in the case where the left foot of the occupant is mounted on the step 3L, the rightward tilting −θb_y_board-dismount is set as θb_y_obj.

Here, Kr2 and θb_xy_obj are maintained constant, in the state where only one foot of the occupant is mounted on the step 3R or 3L.

Subsequently, in the state where only one foot of the occupant is mounted on the Step 3R or 3L, if the occupant mounts the remaining foot (landed foot) onto the step 3L or 3R in order to complete the boarding action, the value of Kr2 is determined so as to gradually approach 0 from 1 thereafter. Here, the time required for the value of Kr2 to reach 0 is defined by the predetermined value $\Delta kr1$.

In this state, the i-th gain coefficient $Ki\_x$ (i=1, 2 or 3) determined by aforesaid expression 09x approaches $Gi\_x\_during-boarding$ from $Gi\_x\_boarding$ action while gradually increasing the absolute value thereof. Similarly, the i-th gain coefficient $Ki\_y$ (i=1, 2 or 3) determined by aforesaid expression 09y approaches $Gi\_y\_during-boarding$ from $Gi\_y\_boarding$ action while increasing the absolute value thereof. In this case, until $Ki\_x$, $Ki\_y$ reach $Gi\_x\_during-boarding$, $Gi\_y\_during-boarding$, respectively, the absolute value of each $Ki\_x$, $Ki\_y$ is maintained to a smaller value than that in the during-boarding mode.

Further, in this state, the weight coefficient Wth is determined so as to approach 0 from 1 or $-1$. Therefore, the desired base body tilt angle value $\theta b\_x\_obj$ in the direction about the Y-axis determined by the aforesaid expression 11x is determined so as to gradually approach the set value for during-boarding mode $\theta b\_x\_during-boarding$ from $\theta b\_x\_board-dismount$. Further, the desired base body tilt angle value $\theta b\_y\_obj$ in the direction about the X-axis determined by the aforesaid expression 11y is determined so as to gradually approach the set value for during-boarding mode $\theta b\_y\_during-boarding$ from $+\theta b\_y\_board-dismount$ or $-\theta b\_y\_board-dismount$. Here, the time necessary for $\theta b\_x\_obj$, $\theta b\_y\_obj$ to respectively reach $\theta b\_x\_during-boarding$, $\theta b\_y\_during-boarding$ is defined by the predetermined value $\Delta w1$.

Supplementarily, in the case where $\theta b\_x\_board-dismount=\theta b\_x\_during-boarding$, $\theta b\_x\_obj$ does not change and is maintained at $\theta b\_x\_during-boarding$.

Further, during the boarding action, the occupant basically grips at least either one of the grips 15R, 15L.

Subsequently, when Kr2 finally changes to 0 and Wth changes to 0 (and consequently $\theta b\_xy\_obj$ changes to $\theta b\_xy\_during-boarding$), the operational mode in the next control processing cycle is changed to the during-boarding mode. Therefore, even when the occupant mounts both feet on the steps 3R, 3L in order to complete the boarding action, the operational mode is maintained to the mode for boarding action unless Kr2 becomes 0, and $\theta b\_xy\_obj$ becomes $\theta b\_xy\_during-boarding$.

In the state where, after starting the mode for boarding action, the occupant has not yet mounted the foot on the step 3R or 3L (in the case where the determination result in STEP14-3 becomes affirmative), the second gain adjustment parameter Kr2 is set to 1. Therefore, the i-th gain coefficients $Ki\_x$, $Ki\_y$ (i=1, 2 or 3) determined in aforesaid expressions 09x, 09y, respectively, becomes $Ki\_b\_x(=Gi\_x\_boarding$ action), $Ki\_b\_y(=Gi\_y\_boarding$ action), respectively. On the other hand, in this state, the weight coefficient Wth is provisionally set to 0, so that the desired base body tilt angle value $\theta b\_xy\_obj$ is provisionally set to the same value as the during-boarding mode ($=\theta b\_xy\_during-boarding$). Here, the desired base body tilt angle value $\theta b\_xy\_obj$ in this state may be set to the same value as the autonomous mode ($=\theta b\_xy\_autonomous$).

Further, in the case where, in the mode for boarding action, the occupant performs ON operation of the operator for dismounting 58*b* of the boarding/dismounting operator 58, the current operational mode is forcibly changed to the autonomous mode in the case where the operational mode in the previous control processing cycle (latest operational mode) is the autonomous mode, and the i-th gain coefficients $Ki\_x$, $Ki\_y$ (i=1, 2 or 3) and the desired base body tilt angle value $\theta b\_xy\_obj$ are respectively set to the same value as in the autonomous mode. Thereafter, the operational mode in the next control processing cycle is changed to the autonomous mode.

Further, in the case where the operational mode in the previous control processing cycle (latest operational mode) is not the autonomous mode (in the case where the same is the mode for boarding action), Kr2 is maintained to the same value as the previous value. Consequently, the i-th gain coefficients $Ki\_x$, $Ki\_y$ (i=1, 2 or 3) are maintained to the same value as the previous value. Further, the desired base body tilt angle values $\theta b\_xy\_obj$ are maintained to the same value as the previous value. Thereafter, the operational mode in the next control processing cycle is changed to the mode for dismounting action.

Next, the processing of STEP15, which is a processing in the case where the current operational mode is the mode for dismounting action is carried out by a subroutine processing shown in the flowchart of FIG. 19.

In the processing, the control unit 50 first carries out the same determination processing as STEP14-2 in STEP15-1 on the basis of the outputs from the load sensors 54R, 54L obtained in STEP3, and determine whether or not the both right and left steps 3R, 3L are in the ON state.

Then, in the case where the determination result is affirmative, that is, in the case where both feet of the occupant are mounted on the steps 3R, 3L, and the specific dismounting action is yet to be started, the control unit 50 sets a desired value Wthaim of the weight coefficient Wth in dismounting action and a desired value Kr2aim of the second gain adjustment parameter Kr2 to 0 in STEP15-10. Thereafter, the control unit 50 carries out the processing from STEP15-7 to be explained below.

In the case where the determination result in STEP15-1 is negative, the control unit 50 carries out the same determination processing as STEP14-3 in STEP15-2, and determine whether or not both steps 3R, 3L are both in the OFF state.

The case where the determination result becomes affirmative is the state where the occupant releases both feet from the steps 3R, 3L, and the dismounting action has substantially finished. In this case, the control unit 50 forcibly changes the current operational mode to the autonomous mode.

Further, the control unit 50 carries out the same processing as STEP14-22 through 14-24 in STEP15-12 through 15-14, and terminates the processing in FIG. 19. That is, the control unit 50 carries out setting the value of the second gain adjustment parameter Kr2 to 0, setting the set value for autonomous mode $\theta b\_xy\_autonomous$ as the desired base body tilt angle value $\theta b\_xy\_obj$, and set the next operational mode to the autonomous mode, respectively, in STEP15-12 through 15-14.

The case where the determination result in STEP15-2 becomes negative is the state in mid-course of the dismounting action (more specifically, the state where the occupant is mounting one foot on the step 3R or 3L). In this case, the control unit 50 subsequently determines whether or not the right step 3R is in the ON state, that is, whether the foot (right foot) of the occupant is mounted only on the step 3R on the right side out of the steps 3R, 3L, in STEP15-3. In the case where the determination result is affirmative, the control unit 50 sets the desired value Wthaim of the weight coefficient Wth to 1 in STEP15-4. Further, in the case where the determination result in STEP15-3 is negative (in the case where the foot (left foot) of the occupant is mounted only on the step 3L on the left side), the control unit 50 sets the desired value Wthaim of the weight coefficient Wth to $-1$ in STEP15-5.

After determining the desired value Wthaim of the weight coefficient Wth as is explained above, the control unit 50 sets the desired value Kr2aim of the second gain adjustment parameter Kr2 to 1 in STEP15-6.

After carrying out the processing of STEP15-6, or the processing of STEP15-10 as is explained above, the control unit 50 subsequently carries out the processing of STEP15-7, and determine the current value of the second gain adjustment parameter Kr2 and the current value of the weight coefficient Wth.

Specifically, the control unit 50 determines the current value of Kr2 to a value closer to the desired value Kr2aim (=0 or 1) by a predetermined value Δkr2 (0<Δkr2<1) determined beforehand than the previous value. More specifically, in the case where the previous value of Kr2≧Kr2aim, the current value of Kr2 is determined to a value obtained by subtracting Δkr2 from the previous value of Kr2 (except in the case where the value of the subtraction result becomes smaller than Kr2aim, then Kr2aim). Further, in the case where the previous value of Kr2<Kr2aim, the current value of Kr2 is determined to a value obtained by adding Δkr2 to the previous value of Kr2 (except in the case where the value of the addition result becomes larger than kr2aim, then Kr2aim).

Further, the control unit 50 determines the current value of Wth to a value closer to the desired value Wthaim (=0 or 1 or −1) by a predetermined value Δw2 (0<Δw2<1) determined beforehand than the previous value. More specifically, in the case where the previous value of Wth≧Wthaim, the current value of Wth is determined to a value obtained by subtracting Δw2 from the previous value of Wth (except in the case where the value of the subtraction result becomes smaller than Wthaim, then Wthaim) Further, in the case where the previous value of Wth<Wthaim, then the current value of Wth is determined to a value obtained by adding Δw2 to the previous value of Wth (except in the case where the value of the addition result becomes larger than Wthaim, then Wthaim).

Here, Δkr2 and Δw2 does not have to be the same value, and may be set to values different from each other. Further, Δkr2 and Δw2, respectively, may not be the same value as Δkr1 used in STEP14-16 and Δw1 used in STEP14-17 in the mode for boarding action.

Subsequently, the control unit 50 determines the desired base body tilt angle values θb_xy_obj by carrying out the same processing as STEP14-12 in STEP15-8. That is, θb_x_obj and θb_y_obj are determined by the aforesaid expressions 11x, 11y according to the weight coefficient Wth.

Subsequently, the control unit 50 maintains the next operational mode to the current operational mode (=the mode for dismounting action) in STEP15-9, and terminates the processing in FIG. 19.

The above is the details of the processing of STEP15 in the mode for dismounting action.

In the case where the current operational mode determined in STEP11 by the above-explained processing is set to the mode for dismounting action, basically the second gain adjustment parameter Kr2 and the desired base body tilt angle values θb_xy_obj are determined as follows.

That is, after starting of the mode for dismounting action, in the state where the occupant keeps mounting both feet on the steps 3R, 3L, the desired value Kr2aim of the second gain adjustment parameter Kr2 is set to 0, and at the same time the desired value Wthaim of the weight coefficient Wth is set to 0.

In this state, Kr2 is basically maintained at 0. Therefore, the i-th gain coefficients Ki_x, Ki_y (i=1, 2 or 3) respectively determined by aforesaid expressions 09x, 09y, become the same value as those of the during-boarding mode (Gi_x_during-boarding, Gi_y_during-boarding).

Further, in this stae, Wth is also basically maintained at 0. Therefore, the desired base body tilt angle values θb_xy_obj determined by the aforesaid expressions 11x, 11y basically become the same value in the during-boarding mode θb_xy_during-boarding. Therefore, the control situation of the vehicle 1 in this state is practically equivalent to the during-boarding mode.

Subsequently, when the occupant releases one foot from the step 3R or 3L in order to start dismounting operation, the desired value Kr2aim of Kr2 is set to 1. Thereafter, the value of Kr2 is determined so as to approach Kr2aim (=1). Therefore, in this state, the i-th gain coefficients Ki_x (i=1, 2 or 3) determined by aforesaid expression 09x approaches Gi_x_dismounting action (this coincides with Gi_x_boarding action in the present embodiment) while gradually decreasing the absolute value thereof. Similarly, the i-th gain coefficients Ki_y (i=1, 2 or 3) gradually approaches Gi_y_dismounting action (this coincides with Gi_y_boarding action in the present embodiment) while gradually decreasing the absolute value thereof. In this case, the absolute values of Ki_x, Ki_y, respectively, are maintained to a value smaller than the uring-boarding mode.

Here, the rate of change of Kr2 in this state (change amount per one control processing cycle), and consequently the rate of change of each i-th gain coefficients Ki_x, Ki_y are defined by the predetermined value Δkr2.

Further, in this state, the desired value Wthaim of Wth is set to +1 or −1. Thereafter, the value of Wth is determined so as to approach Wthaim (+1 or −1). Therefore, the desired base body tilt angle value θb_x_obj in the direction about the Y-axis determined by aforesaid expression 11x is determined so as to gradually approach θb_x_board-dismount. Further, the desired base body tilt angle value θb_y_obj in the direction about the X-axis determined by aforesaid expression 11y is determined so as to gradually approach +θb_y_board-dismount or −θb_y_board-dismount. More specifically, in the case where the right foot of the occupant is mounted on the step 3R, θb_y_obj is set so as to approach +θb_y_board-dismount of the leftward tilt, and in the case where the left foot of the occupant is mounted on the step 3L, θb_y_obj is set so as to approach −θb_y_board-dismount of the rightward tilt. Here, the rate of change (change amount per one control processing cycle) of θb_x_obj, θb_y_obj, respectively, is determined by the predetermined value Δw2.

Supplementarily, in the case where θb_x_board-dismount=θb_x_during-boarding, θb_x_obj does not change and is maintained at θb_x_during-boarding.

Subsequently, when the occupant releases the foot mounted on the step 3R or 3L in order to complete the dismounting action, the current operational mode is forcibly changed to the autonomous mode, the i-th gain coefficients Ki_x, Ki_y (i=1, 2 or 3) and the desired base body tilt angle values θb_xy_obj, respectively, are set to the same value as that in the autonomous mode. Thereafter, the operational mode in the next control processing cycle is changed to the autonomous mode.

In the present embodiment, in the mode for dismounting action, for example when the operator for boarding 58a of the boarding/dismounting operator 58 is performed with ON operation, processing according to the operation will not be carried out. Therefore, in the present embodiment, in the mode for dismounting action, unless the occupant releases both feet from the steps 3R, 3L and completes the substantive dismounting action (unless the determination result in STEP15-2 becomes affirmative), the operational mode in the next control processing cycle is not changed from the mode for dismounting action to the autonomous mode.

Supplementarily, during the dismounting action, the occupant at least grips either one of the grips 15R, 15L, similar to that of during the boarding action.

The above is the details of the processing of STEP4.

Subsequently, the operation of the vehicle 1 of the present embodiment will be explained.

First, the operation in the case where the operational mode of the vehicle 1 is the during-boarding mode or the autonomous mode will be explained.

In either operational mode of the boarding mode and the autonomous mode, the imaginary wheel rotational angular acceleration commands ωwdot_xy_cmd denoting the manipulated variables (control inputs) are determined such that, basically, the posture of the base body 9 is maintained at a posture in which the aforesaid base body tilt angle error measured values θbe_x_s and θbe_y_s are both 0 (hereinafter, this posture will be referred to as the basic posture), i.e., the position of the vehicle system center-of-gravity point (the vehicle-occupant overall center-of-gravity point or the vehicle-alone center-of-gravity point) is maintained to be substantially right above the ground contact surface of the wheel assembly 5. More detailedly, the imaginary wheel rotational angular acceleration command ωwdot_xy_cmd is determined such that the estimated center-of-gravity velocity values Vb_xy_s as the estimated values of the moving velocities of the vehicle system center-of-gravity point is converged to the desired center-of-gravity velocities for control Vb_xy_mdfd while maintaining the posture of the base body 9 at the aforesaid basic posture. As is explained before, the desired center-of-gravity velocities for control Vb_xy_mdfd are normally 0. In this case, the imaginary wheel rotational angular acceleration command ωwdot_xy_cmd will be determined such that the vehicle system center-of-gravity point is substantially stationary while maintaining the posture of the base body 9 at the aforesaid basic posture.

Then, the rotational angular velocities of the electric motors 31R and 31L, respectively, obtained by converting the imaginary wheel rotational angular velocity commands ωw_xy_cmd, which is obtained by integrating each component of ωwdot_xy_cmd, are determined as the velocity commands ω_R_cmd and ω_L_cmd of the electric motors 31R and 31L. Further, the rotational velocities of the electric motors 31R and 31L are controlled according to the velocity commands ω_R_cmd and ω_L_cmd. Thus, the moving velocities of the wheel assembly 5 in the X-axis direction and the Y-axis direction, respectively, are controlled so as to agree with the moving velocity of the imaginary wheel 62_x corresponding to ωw_x_cmd and the moving velocity of the imaginary wheel 62_y corresponding to ωw_y_cmd, respectively.

With this arrangement, if, for example, the actual base body tilt angle θb_x deviates from the desired value θb_x_obj in the direction about the Y-axis by leaning forward, then the wheel assembly 5 moves forward to eliminate the deviation (to converge θbe_x_s to 0). Similarly, if the actual θb_x deviates from the desired value θb_x_obj by leaning backward, then the wheel assembly 5 moves backward to eliminate the deviation (to converge θbe_x_s to 0).

Further, for example, if the actual base body tilt angle θb_y deviates from the desired value θb_y_obj in the direction about the X-axis by leaning rightward, then the wheel assembly 5 moves rightward to eliminate the deviation (to converge θbe_y_s to 0). Similarly, if the actual θb_y deviates from the desired value θb_y_obj by leaning leftward, then the wheel assembly 5 moves leftward to eliminate the deviation (to converge θbe_y_s to 0).

Further, if both the actual base body tilt angles θb_x and θb_y deviate from the desired values θb_x_obj and θb_y_obj, respectively, then the moving operation of the wheel assembly 5 in the fore-and-aft direction to eliminate the deviation of θb_x and the moving operation of the wheel assembly 5 in the lateral direction to eliminate the deviation of θb_y are combined, so that the wheel assembly 5 will move in a direction combining the X-axis direction and the Y-axis direction (a direction at an angle to both the X-axis direction and the Y-axis direction).

Thus, if the base body 9 tilts from the basic posture, then the wheel assembly 5 moves toward the tilting side. Hence, if, for example, the occupant intentionally inclines his/her upper body in the aforesaid during-boarding mode, then the wheel assembly 5 will move to the tilting side.

When the posture of the base body 9 converges to the basic posture, the movement of the wheel assembly 5 substantially comes to a halt. Further, if, for example, the tilt angle θb_x of the base body 9 in the direction about the Y-axis is maintained at a certain angle tilted from the basic posture, then the moving velocity of the wheel assembly 5 in the X-axis direction converges to a certain moving velocity corresponding to the angle (a moving velocity having a certain stead-state deviation from the desired center-of-gravity velocity for control Vb_x_mdfd). The same applies to the case where the tilt angle θb_y of the base body 9 in the direction about the X-axis is maintained at a certain angle tilted from the basic posture.

Further, for example, if the amount of the tilt of the base body 9 from the aforesaid basic posture (the base body tilt angle error measured values θbe_x_s and θbe_y_s) becomes relatively large, and the moving velocity or velocities of the wheel assembly 5 in one or both of the X-axis direction and the Y-axis direction for eliminating the tilt amount or for maintaining the tilt amount (these moving velocities corresponding to the aforesaid expected center-of-gravity velocity stead-state error values Vb_x_prd and Vb_y_prd, respectively, shown in FIG. 12) are an excessively large moving velocity or velocities that would cause the rotational angular velocity or velocities of one or both of the electric motors 31R and 31L to deviate from the permissible range or ranges thereof, then a velocity in the opposite direction from the moving velocity of the wheel assembly 5 (more detailedly, Vw_x_lim2-Vb_x_prd and Vw_y_lim2-Vb_y_prd) will be determined as the desired center-of-gravity velocities for control Vb_x_mdfd and Vb_y_mdfd. Then, the manipulated variable components u3_x and u3_y among the manipulated variable components constituting a control input are determined such that the estimated center-of-gravity velocity values Vb_x_s and Vb_y_s will be converged to the desired center-of-gravity velocities for control Vb_x_mdfd and Vb_y_mdfd, respectively. This prevents the amount of a tilt of the base body 9 from the aforesaid basic posture from becoming excessively large, thus preventing the rotational angular velocity or velocities of one or both of the electric motors 31R and 31L from becoming excessively high.

Further, in the aforesaid gain adjustor 78, in the situation wherein one or both of the estimated center-of-gravity velocity values Vb_x_s and Vb_y_s become large, and the moving velocity or velocities of the wheel assembly 5 in one or both of the X-axis direction and the Y-axis direction required to eliminate the tilt of the base body 9 from the aforesaid basic posture or to maintain the tilt amount may become an excessively large moving velocity that would cause the rotational angular velocity or velocities of one or both of the electric motors 31R and 31L to deviate from the permissible range or ranges thereof, as the deviation becomes more notable (more specifically, as the absolute values of Vover_x and Vover_y shown in FIG. 10 increase), one or both of the aforesaid first gain adjustment parameters Kr1_x and Kr1_y are brought closer to 1 from 0.

In this case, each i-th gain coefficient Ki_x (i=1, 2 or 3) calculated according to the aforesaid expression 09x increases as Kr_x approaches to 1. The same applies to each i-th gain coefficient Ki_y (i=1, 2 or 3) calculated according to the aforesaid expression 09y.

As the absolute values of the aforesaid gain coefficients increase, the sensitivities of the manipulated variables (the imaginary wheel rotational angular acceleration commands ωwdot_x_cmd and ωwdot_y_cmd) in response to a change in the tilt of the base body 9 increase. Hence, the moment the amount of a tilt of the base body 9 from the basic posture indicates an increase, the moving velocity of the wheel assembly 5 will be controlled to immediately eliminate the tilt amount. This intensely restrains the base body 9 from considerably tilting from the basic posture, thus making it possible to prevent the moving velocity or velocities of the wheel assembly 5 in one or both of the X-axis direction and the Y-axis direction from becoming an excessively high moving velocity that causes the rotational angular velocity or velocities of one or both of the electric motors 31R and 31L to deviate from the permissible range or ranges thereof.

Next, explanation will be given to the operation in the case where the operational mode of the vehicle 1 is the mode for boarding action or the mode for dismounting action.

In the mode for boarding action and the mode for dismounting action, basically, in the state where the occupant is mounting one foot on the step 3R or 3L, the i-th gain coefficients Ki_x, Ki_y (i=1, 2 or 3) used in aforesaid expressions 07x, 07y are set so that the absolute values thereof becomes smaller values than that in the during-boarding mode.

In this state, even when the actual tilt angle of the base body 9 and the foot mount unit 3 (payload supporting part) changes, the change of the imaginary wheel rotational angular acceleration commands ωwdot_xy_cmd as manipulated variables for control for controlling the traveling motion of the wheel assembly 5 becomes minute compared to that in the during-boarding mode. Consequently, sensitivity of change of the traveling acceleration of the wheel assembly 5 with respect to the change of the actual tilt angle of the base body 3 and the foot mount unit 3 becomes smaller than that in the during-boarding mode. As such, even in the state where the base body 9 and the foot mount unit 3 are tilted from the basic posture, traveling of the wheel assembly 5 does not occur or is difficult to occur.

Therefore, in the state where the occupant is mounting one foot on the step 3R or 3L in the mode for boarding action and in the mode for dismounting action, it becomes possible to tilt the base body 9 and the foot mount unit 3 to a posture suitable for the boarding action or the dismounting action, while maintaining the state where the wheel assembly 5 does not move or is difficult to move.

In addition, in the present embodiment, in the state where the occupant is mounting one foot on the step 3R on the right side, the desired base body tilt angle value θb_y_obj is set to an angle in which the base body 9 tilts to the left side (+θb_y_board-dismount in the mode for boarding action, and an angle tilted towards the +θb_y_board-dismount side than θb_y_during-boarding in the mode for dismounting action). Stated otherwise, in this state, the desired base body tilt angle value θb_y_obj is set to an angle in which the step 3R on the right side approaches a position immediately above the ground contact portion of the wheel assembly 5 when seen in the X-axis direction. Further, in the state where the occupant is mounting one foot on the step 3L on the left side, the desired base body tilt angle value θb_y_obj is set to an angle in which the base body 9 tilts to the right side (−θb_y_board-dismount in the mode for boarding action, and an angle tilted towards the −θb_y_board-dismount side than θb_y_during-boarding in the mode for dismounting action). Stated otherwise, in this state, the desired base body tilt angle value θb_y_obj is set to an angle in which the step 3L on the left side approaches a position immediately above the ground contact portion of the wheel assembly 5. Therefore, it becomes possible to easily maintain the posture of the base body 9 and the foot mount unit 3 to a posture suitable for the boarding action and the dismounting action.

As a result, it becomes easy to perform the boarding action or the dismounting action, while maintaining the state where the wheel assembly 5 does not move or is difficult to move.

Here, the correspondence relationship between the vehicle 1 of the present embodiment and the present invention will be supplementally described.

In the present embodiment, the fore-and-aft direction (the X-axis direction) and the lateral direction (the Y-axis direction) of the occupant aboard the vehicle 1 correspond to the first direction and the second direction, respectively, in the present invention.

And, the traveling motion unit controlling element of the present invention is realized by the processing in FIG. 7 carried out by the control unit 50. Further, the mode for boarding action and the mode for dismounting action correspond to the mode for transition period in the present invention.

Further, the set value of the base body tilt angle for the during-boarding mode θb_xy_during-boarding corresponds to the first desired tilt angle of the present invention, and the set value of the base body tilt angle used in the mode for boarding action or the mode for dismounting action θb_xy_board-dismount corresponds to the desired tilt angle for transition period of the present invention.

Further, the load sensors 54R, 54L correspond to the foot mount detecting element of the present invention, and the boarding/dismounting operator 58 corresponds to the operator of the present invention.

Some modifications related to the embodiments described above will now be described.

In the above-mentioned embodiment, |Gi_x_boarding action|<|Gi_x_during-boarding A|, |Gi_y_boarding action|<|Gi_y_during-boarding A| stands, and each i-th gain coefficients Ki_x (i=1, 2 or 3) with respect to the X-axis direction and each i-th gain coefficients Ki_y (i=1, 2 or 3) with respect to the Y-axis direction in the mode for boarding action and the mode for dismounting action is set so that the absolute values thereof becomes smaller than those in the during-boarding mode.

However, for example with respect to the Y-axis direction, it may be set to |Gi_y_boarding action|<|Gi_y_during-boarding A|, and on the other hand, with respect to the X-axis direction, Gi_x_boarding action may be made to coincide or approximately coincide with Gi_x_during-boarding A, and in the mode for boarding action each i-th gain coefficients Ki_x (i=1, 2 or 3) with respect to X-axis direction may be made to coincide or approximately coincide with the during-boarding mode. Similarly, with respect to the Y-axis direction, it may be set to |Gi_y_dismounting action|<|Gi_y_during-boarding A|, and on the other hand, with respect to X-axis direction, Gi_x_dismounting action may be made to coincide or approximately coincide with Gi_x_during-boarding A, and in the mode for dismounting action, each i-th gain coefficients Ki_x (i=1, 2 or 3) with respect to the X-axis direction may be made to coincide or approximately coincide with the during-boarding mode.

That is, as is in the present embodiment, in the vehicle 1 boarding on the foot mount unit 3 (the steps 3R, 3L), it is preferable to make the base body 9 and the foot mount unit 3 easier to tilt especially in the direction about the X-axis in order to perform the boarding action and the dismounting action easily, but the tilting in the direction about the Y-axis generally may be set to a similar level to the desired base body tilt angle value θb_x_obj in the during-boarding mode. Therefore, as mentioned above, in the mode for boarding action or in the mode for dismounting action, each i-th gain coefficients Ki_x (i=1, 2 or 3) with respect to the X-axis direction may be made to coincide with or approximately coincide with the during-boarding mode.

Further, in the above-mentioned embodiment, in the mode for boarding action and the mode for dismounting action, each i-th gain coefficients Ki_x, Ki_y (i=1, 2 or 3) is set so that the absolute values thereof become smaller than that in the during-boarding mode. However, it may be set as follows. That is, for example in the mode for boarding action or the mode for dismounting action, with respect to the gain coefficient Ki_y (i=1, 2 or 3) in the Y-axis direction, it may be set that the third gain coefficient K3_y coincide or approximately coincide with the value in the during-boarding mode, and the absolute value of the first gain coefficient K1_y and the second gain coefficient K2_y become smaller than those in the during-boarding mode. For example, K1_y and K2_y in the mode for boarding action or the mode for dismounting action may be set to 0 or to a value close thereto. Setting the gain coefficient Ki_y (i=1, 2 or 3) this way may be realized by setting Gi_y_boarding action in the mode for boarding action so that |G1_y_boarding action|<|G1_y_during-boarding A|, |G2_y_boarding action|<|G2_y_during-boarding A|, |G3_y_boarding action|≈|G3_y_during-boarding A| in the above-mentioned embodiment holds. Further, in the mode for dismounting action, G1_y_dismounting action in the above-mentioned embodiment may be set similarly to Gi_y_boarding action.

By doing so, in the mode for boarding action or the mode for dismounting action, it becomes possible to make the sensitivity of the change of the traveling velocity of the wheel assembly 5 with respect to the change in the in the tilt angle of the base body 9 and the foot mount unit 3 about the X-axis small.

Here, making the sensitivity of the change of the traveling velocity of the wheel assembly 5 with respect to the change of the tilt angle of the base body 9 and the foot mount unit 3 about the X-axis small may be basically realized by making a ratio of the absolute value of the first gain coefficient K1_y with respect to the absolute value of the third gain coefficient K3_y, |K1_x|/|K3_x|, small.

Further, in the mode for boarding action or the mode for dismounting action, with respect to the gain coefficient Ki_x (i=1, 2 or 3) in the X-axis direction, similarly to above, the third gain coefficient K3_x may be made to coincide or approximately coincide with the value in the during-boarding mode, and the absolute values of the first gain coefficient K1_x and the second gain coefficient K2_x may be made to be smaller than those in the during-boarding mode. By doing so, in the mode for boarding action or the mode for dismounting action, it becomes possible to make the sensitivity of the change of the traveling velocity of the wheel assembly 5 with respect to the change in the tilt angle of the base body 9 and the foot mount unit 3 about the Y-axis small.

Further, as is in the above-mentioned embodiment, instead of making the value of the gain coefficient differ in the mode for boarding action and the mode for dismounting action from the during-boarding mode, it may be set as follows. That is, in the mode for boarding action or the mode for dismounting action, in the state where the occupant is at least mounting only one foot on the step 3R or 3L, the electric motors 31R, 31L may be controlled so that the electric motors 31R, 31L are maintained to a rotation stopped state, and consequently the wheel assembly 5 is maintained to a traveling stopped state.

Alternatively, for example, in the mode for boarding action or the mode for dismounting action, the permissible range of the rotational angular velocity of each electric motors 31R, 31L in the limit processor 100 in the center-of-gravity velocity restrictor 76 may be set to 0, so that the output value of the limit processor 100 is maintained to 0. In this case, in the mode for boarding action or the mode for dismounting action, the traveling motion of the wheel assembly 5 is controlled so as to converge the estimated center-of-gravity velocity values Vb_x_s, Vb_y_s to 0, without relying on the base body tilt angle. Therefore, it becomes possible to converge the traveling velocity of the wheel assembly 5 in the mode for boarding action or the mode for dismounting action to 0, and to make the wheel assembly 5 immovable without relying on the base body tilt angle.

Further, in the above-mentioned embodiment, the imaginary wheel rotational angular acceleration commands ωwdot_x_cmd, ωwdot_y_cmd as the manipulated variables for control are calculated by the aforesaid expressions 07x, 07y. However, ωwdot_x_cmd, ωwdot_y_cmd may be calculated by expressions in which the second term in the right side of expressions 07x, 07y are omitted.

Further, in each of the aforesaid embodiments, the vehicle 1 having the structure illustrated in FIG. 1 and FIG. 2 has been exemplified. However, the inverted pendulum type vehicle 1 in the present invention is not limited to the vehicle 1 exemplified in the present embodiments.

To be more specific, the wheel assembly 5 serving as the traveling motion unit of the vehicle 1 in the present embodiments has the one-piece construction. Alternatively, however, the wheel assembly 5 may have a construction shown in, for example, FIG. 10 of the aforesaid patent document 3. More specifically, the wheel assembly may be constructed to have a rigid annular shaft member and a plurality of rollers rotatively and externally inserted into the rigid annular shaft member such that the axial centers thereof are oriented in the tangential direction of the shaft member, the plurality of these rollers being arranged in the circumferential direction along the shaft member.

Further, the traveling motion unit may have a crawler-shaped structure, as shown in, for example, FIG. 3 of patent document 2.

Figure 5:
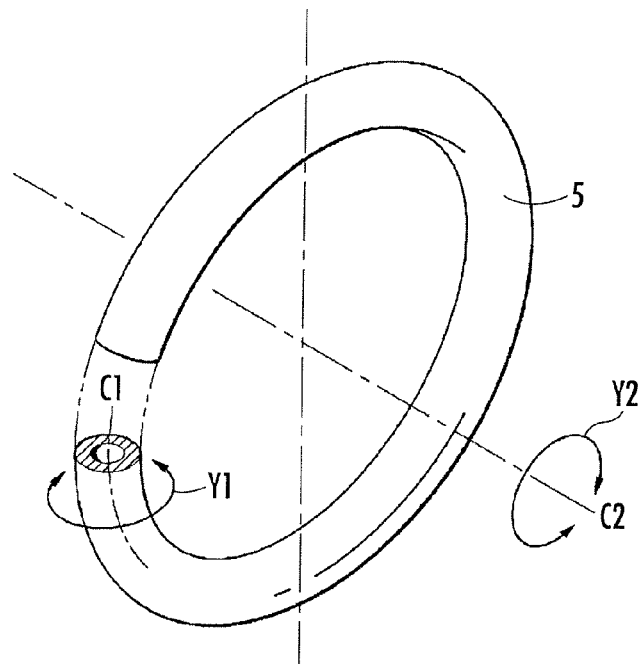
FIG. 5 is a perspective view of a traveling motion unit (wheel unit) of the inverted pendulum type vehicle according to the embodiment.

Alternatively, as shown in, for example, FIG. 5 of the aforesaid patent document 2, FIG. 7 of patent document 3, or FIG. 1 of patent document 1, the traveling motion unit may be constructed of a spherical member, and the vehicle may be constructed such that the spherical member is rotatively driven in a direction about the X-axis and a direction about the Y-axis by an actuator (e.g., an actuator having the aforesaid wheel assembly 5).

Thus, the present invention can be applied to inverted pendulum type vehicles of various constructions, as illustrated in the aforesaid patent documents 1 to 3 and the like.

Further, the inverted pendulum type vehicle in accordance with the present invention may be provided with a plurality of traveling motion units (e.g., two in the lateral direction, or two in the fore-and-aft direction, or three or more).

Further, it is not necessary for the traveling motion unit to be movable in all of the directions, and it may be movable only in one direction. In this case, a payload supporting part (the foot mount unit) may be fixed to the base body so as to be tiltable about one axis only. For example, in stead of the wheel assembly 5 in the above-mentioned embodiments, a traveling motion unit capable of moving in the X-axis direction (the fore-and-aft direction of the occupant) and is not capable of tilting (or is difficult to tilt) in the direction about the X-axis direction (for example, a traveling motion unit in which a plurality of wheels rotatable about the axis in the Y-axis direction are coaxially arranged in parallel in the Y-axis direction to one another may be provided to the vehicle 1. And, in this case, a boarding unit may be made tiltable about the axis in the Y-axis direction, and the traveling motion unit may move in the X-axis direction in accordance with the tilting.

Further, in the inverted pendulum type vehicle in accordance with the present invention, it is not necessary for the base body to tilt together with the boarding unit of the occupant. For example, in the case where the vehicle includes a plurality of the traveling motion units, the base body to which the traveling motion units are assembled may be made so that the base body does not tilt with respect to the floor surface, and the boarding unit may be assembled to the base body so as to be freely tiltable.

DESCRIPTION OF REFERENCE NUMERALS

1 . . . inverted pendulum type vehicle; 3 . . . foot mount unit (payload supporting part): 5 . . . wheel assembly (traveling motion unit); 7 . . . actuator; 9 . . . base body; 50 . . . control unit (traveling motion unit controlling element); 54R, 54L . . . load sensor (foot mount detecting element)

The invention claimed is:

1. A control device of an inverted pendulum type vehicle having a traveling motion unit capable of moving on a floor surface, an actuator which drives the traveling motion unit, a base body on which the traveling motion unit and the actuator are mounted, and a payload supporting part of an occupant which is attached to the base body so as to be tiltable with respect to vertical direction at least about an axis in one direction, comprising:

a traveling motion unit controlling element which includes as operational modes of the vehicle for controlling the traveling motion unit, a mode for transition period comprising at least one mode of a mode for boarding action which is a transitory operational mode at a time the occupant intends to board the payload supporting part and a mode for dismounting action which is a transitory operational mode at a time the occupant intends to dismount from the payload supporting part, and a during-boarding mode which is the operational mode in a state where the occupant is aboard the payload supporting part, and which controls the traveling motion of the traveling motion unit in each operational mode via the actuator;

wherein the traveling motion unit controlling element controls, in the during-boarding mode, the traveling motion of the traveling motion unit so as to bring at least an actual tilt angle of the payload supporting part close to a predetermined first desired tilt angle, and controls, in the mode for transition period, at least in a part of a period in the period from start until end of the mode for transition period, the traveling motion of the traveling motion unit so that a sensitivity of change of traveling velocity of the traveling motion unit or a sensitivity of change of traveling acceleration of the traveling motion unit with respect to change of at least the tilt angle about the axis in the one direction out of the actual tilt angle of the payload supporting part in the mode for transition period to be smaller than that in the during-boarding mode.

2. The control device of the inverted pendulum type vehicle according to claim 1, wherein the traveling motion unit is configured to be movable in all directions including a first direction and a second direction which are orthogonal to each other on a floor surface, the payload supporting part is assembled fixed to the base body so as to be tiltable with respect to vertical direction about two axes, about the axis in the first direction and about the axis in the second direction, the traveling motion unit controlling element controls, in the during-boarding mode, the traveling motion of the traveling motion unit so as to bring at least the actual tilt angle of the payload supporting part about the two axes close to the predetermined first desired tilt angle, and controls, in the at least a part of the period in the mode for transition period, the traveling motion of the traveling motion unit so that the sensitivity with respect to change in at least the tilt angle about the axis in one direction out of the first direction and the second direction becomes smaller than that in the during-boarding mode.

3. The control device of the inverted pendulum type vehicle according to claim 2, wherein the payload supporting part includes a foot mount unit for mounting both feet of the occupant so that both feet are aligned spaced apart with a gap in the lateral direction of the occupant, and is configured so that the occupant is capable of boarding on the foot mount unit in a standing posture with the fore-and-aft direction and the lateral direction of the occupant facing the first direction and the second direction, respectively, and the traveling motion unit controlling element controls, in the at least a part of the period in the mode for transition period, the traveling motion of the traveling motion unit so that the sensitivity with respect to at least the change in the tilt angle about the axis in the first direction to be smaller than that in the during-boarding mode.

4. The control device of the inverted pendulum type vehicle according to claim 3, wherein the vehicle is equipped with a foot mount detecting element which generates an output according to at least whether or not each foot of the occupant is mounted on the foot mount unit, and the at least a part of the period includes a period in the mode for transition period in which the output of the foot mount detecting element becomes an output indicating only one foot of the occupant is mounted on the foot mount unit.

5. The control device of the inverted pendulum type vehicle according to claim 3, wherein the base body is assembled with a grip, which the occupant landing at least one foot on the floor is capable of gripping, so as to be tillable with the payload supporting unit, and the traveling motion unit controlling element controls, in the at least a part of the period in the mode for transition period, the traveling motion of the traveling motion unit so as to make the sensitivity with respect to the change of the tilt angle about the axis in the first direction smaller than that in the during-boarding mode, and also to bring at least the tilt angle about the axis in the first direction closer to a desired tilt angle for transition period, which is a predetermined angle having a larger degree of tilt with respect to the vertical direction than a component about the axis in the first direction out of the first desired tilt angle.

6. The control device of the inverted pendulum type vehicle according to claim 5,
wherein the grip is provided with an operator for instructing a change of the operational mode to the traveling motion unit controlling element.

* * * * *